(12) United States Patent
Lehmann et al.

(10) Patent No.: US 6,849,315 B2
(45) Date of Patent: Feb. 1, 2005

(54) FAST-WRITABLE AND PRECISION-WRITABLE HIGH-CAPACITY OPTICAL STORAGE MEDIA

(75) Inventors: Urs Lehmann, Basel (CH); Peter Aeschlimann, Allschwil (CH); Peter Sutter, Muttenz (CH); Beat Schmidhalter, Bubendorf (CH); Jean-Luc Budry, Rossemaison (CH); Heinz Spahni, Frenkendorf (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/483,130

(22) PCT Filed: Jul. 4, 2002

(86) PCT No.: PCT/EP02/07434

§ 371 (c)(1),
(2), (4) Date: Jan. 8, 2004

(87) PCT Pub. No.: WO03/007296

PCT Pub. Date: Jan. 23, 2003

(65) Prior Publication Data

US 2004/0142137 A1 Jul. 22, 2004

(30) Foreign Application Priority Data

Jul. 13, 2001 (CH) .............................................. 1297/01
Aug. 17, 2001 (CH) .............................................. 1516/01

(51) Int. Cl.$^7$ .............................................. B32B 3/02
(52) U.S. Cl. .................... 428/64.1; 428/64.4; 428/64.8; 430/270.14
(58) Field of Search ............................. 428/64.1, 64.4, 428/64.8, 913; 430/270.14, 495.1, 945

(56) References Cited

U.S. PATENT DOCUMENTS

| | | | |
|---|---|---|---|
| 3,781,711 A | 12/1973 | Drexhage et al. | .......... 331/94.5 |
| 5,301,145 A | 4/1994 | Inoue et al. | ................. 365/106 |
| 5,846,682 A | 12/1998 | Murofushi et al. | ......... 430/106 |
| 5,851,621 A | 12/1998 | Wolleb et al. | ............. 428/64.1 |

FOREIGN PATENT DOCUMENTS

| | | |
|---|---|---|
| DE | 3322945 | 1/1985 |
| DE | 19919119 | 11/2000 |
| EP | 0295145 | 12/1988 |

OTHER PUBLICATIONS

Patent Abstracts of Japan vol. 1998, No. 1, JP 09226250 (1997).
Chem. Abstract 102:115142 for DE 3322945 (1985).

*Primary Examiner*—Elizabeth Mulvaney
(74) *Attorney, Agent, or Firm*—Kevin T. Mansfield

(57) ABSTRACT

The invention relates to an optical recording medium, comprising a substrate and a recording layer, wherein the recording layer comprises a compound of formula (I), wherein $R_1$, $R_2$, $R_3$, $R_4$, $R_5$, $R_6$, $R_7$, $R_8$, $R_9$, $R_{10}$, $R_{11}$, $R_{12}$ and $R_{13}$ are each independently of the others hydrogen, $G_1$ or $C_1$–$C_{24}$alkyl, $C_2$–$C_{24}$alkenyl, $C_2$–$C_{24}$alkynyl, $C_3$–$C_{24}$cycloalkyl, $C_3$–$C_{24}$cycloalkenyl, $C_7$–$C_{24}$aralkyl, $C_6$–$C_{24}$aryl, $C_4$–$C_{12}$heteroaryl or $C_1$–$C_{12}$heterocycloalkyl, each unsubstituted or substituted by one or more identical or different substituents $G_1$, wherein $R_1$ and $R_2$, $R_1$ and $R_{13}$, $R_2$ and $R_3$, $R_3$ and $R_4$, $R_4$ and $R_5$, $R_5$ and $R_6$, $R_6$ and $R_7$, $R_7$ and $R_8$, $R_8$ and $R_9$, $R_9$ and $R_{10}$, $R_{10}$ and R11, $R_{11}$ and $R_{12}$ and/or $R_{12}$ and $R_{13}$ can independently of one another be bonded to one another in pairs separately or, when they contain substitutable sites, via a direct bond or via a —$CH_2$—, —O—, —S—, —NH— or —$NC_1$–$C_{24}$alkyl-bridge in such a manner that, together with the atoms and bonds indicated in formula (I), five- or six-membered, saturated, unsaturated or aromatic, unsubstituted or $G_1$-substituted rings are formed, $G_1$ is any desired substituent,? $_x$m-¿ is an inorganic, organic organometallic anion, $Y^{n+}$ is a proton or a metal, ammonium or phosphonium cation, and m and n are each independently of the other a number from 1 to 5, and p and q are each independently of the other 0 or a number from 0.2 to 6, the ratio of p and q to one another, depending upon m and n and, as applicable, the number of charged $G_1$, being such that in formula (I) there is no excess positive or negative charge. Generally the optical recording medium according to the invention additionally comprises a reflecting layer. The recording media according to the invention exhibit high sensitivity and good playback characteristics, especially at high recording and playback speeds. The light stability is also excellent.

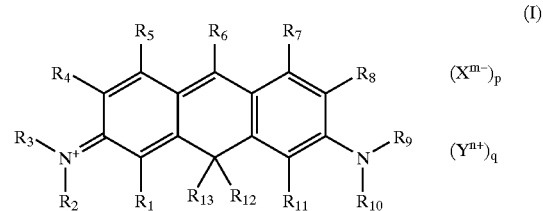

22 Claims, No Drawings

FAST-WRITABLE AND PRECISION-WRITABLE HIGH-CAPACITY OPTICAL STORAGE MEDIA

The field of the invention is the optical storage of information on write-once storage media, the information pits being differentiated by the different optical properties of a colorant at written and unwritten sites. This technology is usually termed "WORM" (for example "CD-R" or "DVD-R"); those terms have been retained herein.

Compact discs that are writable at a wavelength of from 770 to 830 nm are known from "Optical Data Storage 1989", Technical Digest Series, Vol. 1, 45 (1989). They are read at a reduced readout power. According to the Orange Book Standard, at the recording wavelength the medium must have a base reflectivity of 65% or more. As recording media it is possible to use, for example, cyanine dyes (JP-58/125246), phthalocyanines (EP-A-676 751, EP-A-712 904), azo dyes (U.S. Pat. No. 5,441,844), double salts (U.S. Pat. No. 4,626,496), dithioethene metal complexes (JP-A-63/288785, JP-A-63/288786), azo metal complexes (U.S. Pat. No. 5,272,047, U.S. Pat. No. 5,294,471, EP-A-649 133, EP-A-649 880) or mixtures thereof (EP-A-649 884).

By using more recent compact high-performance red diode lasers that emit in the range of from 600 to 700 nm it is possible in principle to achieve a 6- to 8-fold improvement in data packing density, in that the track spacing (distance between two turns of the information track) and the size of the pits as well as the redundancy can each be reduced to approximately half the value in comparison with conventional CDs.

This imposes extraordinarily high demands on the recording layer to be used, however, such as high refractive index, high light stability in daylight and under laser radiation of low power density (readout) with, at the same time, high sensitivity under laser radiation of high power density (writing), uniformity of script width at different length pulse durations and also high contrast. The known recording layers still do not possess these properties to an entirely satisfactory extent.

EP-A-0 805 441 describes an optical recording medium comprising xanthene dyes, which can be both recorded and read at from 600 to 700 nm. In the Examples, good results are achieved with a 10 mW laser diode of wavelength 635 nm. It has been found, however, that under practical conditions the results for the dyes disclosed in EP-A-0 805 441 are not able fully to satisfy the demands (which have increased in the interim) in respect of sensitivity, recording speed and mark accuracy and reproducibility, especially in the range from 640 to 680 nm.

U.S. Pat. No. 3,781,711 discloses laser dye compositions comprising dyes having a rigid structure, including 9,9-dimethyl-2-dimethylamino-7H,9H-anthracene-7-dimethyliminium nitrate. Such compounds are used in high dilution.

WO-A-00/64986 describes carbopyronine fluorescent dyes and their use as marker groups in diagnostics. The absorption maxima and the fluorescent yield are not appreciably altered by coupling such compounds to carriers and biomolecules.

The aim of the invention is to provide an optical recording medium, the recording layer of which has high storage capacity combined with excellent other properties. The recording medium should be both writable and readable, with a minimum of errors, at the same wavelength in the range of from 600 to 700 nm (preferably from 630 to 690 nm) at high speed.

Very surprisingly, by the use of certain carbopyronine dyes as recording layer it has been possible to provide an optical recording medium having properties that are astonishingly better than those of recording media known hitherto.

The invention accordingly relates to an optical recording medium comprising a substrate and a recording layer, wherein the recording layer comprises a compound of formula (I)

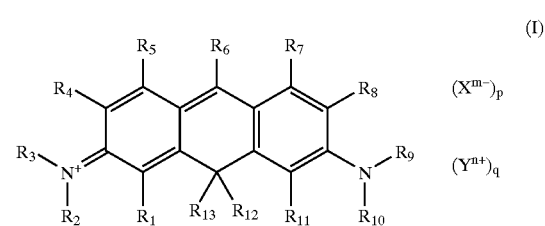

wherein $R_1$, $R_2$, $R_3$, $R_4$, $R_5$, $R_6$, $R_7$, $R_8$, $R_9$, $R_{10}$, $R_{11}$, $R_{12}$ and $R_{13}$ are each independently of the others hydrogen, $G_1$, or $C_1$–$C_{24}$alkyl, $C_2$–$C_{24}$alkenyl, $C_2$–$C_{24}$alkynyl, $C_3$–$C_{24}$cycloalkyl, $C_3$–$C_{24}$cycloalkenyl, $C_7$–$C_{24}$aralkyl, $C_6$–$C_{24}$aryl, $C_4$–$C_{12}$heteroaryl or $C_1$–$C_{12}$heterocycloalkyl, each unsubstituted or substituted by one or more identical or different substituents $G_1$, wherein $R_1$ and $R_2$, $R_1$ and $R_{13}$, $R_2$ and $R_3$, $R_3$ and $R_4$, $R_4$ and $R_5$, $R_5$ and $R_6$, $R_6$ and $R_7$, $R_7$ and $R_8$, $R_8$ and $R_9$, $R_9$ and $R_{10}$, $R_{10}$ and $R_{11}$, $R_{11}$ and $R_{12}$ and/or $R_{12}$ and $R_{13}$ can independently of one another be bonded to one another in pairs separately or, when they contain substitutable sites, via a direct bond or via a —$CH_2$—, —O—, —S—, —NH— or —$NC_1$–$C_{24}$alkyl-bridge in such a manner that, together with the atoms and bonds indicated in formula (I), five- or six-membered, saturated, unsaturated or aromatic, unsubstituted or $G_1$-substituted rings are formed, $G_1$ is any desired substituent, $X^{m-}$ is an inorganic, organic or organometallic anion, $Y^{n+}$ is a proton or a metal, ammonium or phosphonium cation, and m and n are each independently of the other a number from 1 to 5, and p and q are each independently of the other 0 or a number from 0.2 to 6, the ratio of p and q to one another, depending upon m and n and, as applicable, the number of charged $G_1$ substituents, being such that in formula (I) there is no excess positive or negative charge.

Generally the optical recording medium according to the invention additionally comprises a reflecting layer, but this is not absolutely necessary per se and it can be omitted depending upon the type of detector.

Each $G_1$ is, where applicable independently of any other $G_1$, any desired substituent, for example halogen, —OH, —$O^-$, —OA, =O, —SH, —$S^-$, —SA, =S, —$NO_2$, —CN, —$NH_2$, —NHA, —$N(A)_2$, —$N^+H_3$, —$N^+H_2A$, —$N^+H(A_2)$, —$N^+(A)_3$, —NHCOA, —N(A)COA, —CHO, —C(A)=O, —$CH(OA)_2$, —$C(A)(OA)_2$, —$C(OA)_3$, —CH=N—A, —C(A)=N—A, —N=CH—A, —N=$C(A)_2$, —N=N—A, —$COO^-$, —COOH, —COOA, —$CONH_2$, —CONHA, —$CON(A)_2$, —$NHCONH_2$, —NHCONHA, —$NHCON(A)_2$, —$N(A)CONH_2$, —N(A)CONHA, —$N(A)CON(A)_2$, —$SO_2A$, —$SO_3^-$, —$SO_3H$, —$SO_3A$, —$PO_3^-$, —$PO(OA)_2$, —$Si(A)_3$, —$OSi(A)_3$, —$Si(OA)_2(A)$ or —$Si(OA)_3$, each A being independently of the others alkyl, alkenyl, alkynyl, cycloalkyl, cycloalkenyl, aralkyl, aryl or heteroaryl, each of which can be uninterrupted or interrupted by one or more hetero atoms, such as N, O, P and S, for example in the form of a polyalkylene glycol chain, pyrrolidinyl, piperidyl, piperazinyl, morpholinyl, oxybisphenylene or heteroaryl, such as pyridyl, furyl, thienyl or phenothiazinyl.

A is typically $C_1$–$C_{24}$alkyl, $C_2$–$C_{24}$alkenyl, $C_2$–$C_{24}$alkynyl, $C_3$–$C_{24}$cycloalkyl, $C_3$–$C_{24}$cycloalkenyl, $C_7$–$C_{24}$aralkyl, $C_6$–$C_{24}$aryl or $C_4$–$C_{12}$heteroaryl.

It will be understood that different As can also be combined, such as, for example, in chromanyl, phosphindolinyl or 1-phenyl-2-pyrazolinyl, that is to say, for example, in substituted form azo-3-methyl-5-oxo-1-phenyl-2-pyrazolin-(4)-yl. It is also possible for alkylene, arylene or aralkylene to be used in place of two As, for example morpholino in place of methyl-3-oxabutyl-amino or 4-methyl-piperidino in place of ethyl-3-azabutyl-amino.

When $G_1$ contains a radical A, that radical can be unsubstituted or substituted by from 1 to 5 identical or different substituents $G_2$, each $G_2$ being as defined for $G_1$, except that $G_2$ can only be unsubstituted or mono-substituted by $G_3$, where $G_3$ likewise is as defined for $G_1$, except that $G_3$ is not further substituted.

Especially the following substituents may be mentioned as $G_1$: —$CH_2$—$CH_2$—OH, —$CH_2$—O—$CH_3$, —$CH_2$—O—$(CH_2)_7$—$CH_3$, —$CH_2$—$CH_2$—O—$CH_2$—$CH_3$, —$CH_2$—$CH(OCH_3)_2$, —$CH_2$—$CH_2$—$CH(OCH_3)_2$, —$CH_2$—$C(OCH_3)_2$—$CH_3$, —$CH_2$—$CH_2$—O—$CH_2$—$CH_2$—O—$CH_3$, —$(CH_2)_3$—OH, —$(CH_2)_6$—OH, —$(CH_2)_7$—OH, —$(CH_2)_8$—OH, —$(CH_2)_9$—OH, —$(CH_2)_{10}$—OH, —$(CH_2)_{11}$—OH, —$(CH_2)_{12}$—OH, —$CH_2$—$Si(CH_3)_3$, —$CH_2$—$CH_2$—O—$Si(CH_3)_2$—$C(CH_3)_3$, —$(CH_2)_3$—O—$Si(CH_3)_2$—$C(CH_3)_3$, —$(CH_2)_4$—O—$Si(C_6H_5)_2$—$C(CH_3)_3$, —$(CH_2)_5$—O—$Si(CH(CH_3)_2)_3$, —$CH_2$—$CH_2$—$CH(CH_3)$—$CH_2$—$CH_2$—$CH(OH)$—$C(CH_3)_2$—OH, —$CH_2$—$CH(CH_3)$—$CH_2$—OH, —$CH_2$—$C(CH_3)_2$—$CH_2$—OH, —$CH_2$—$C(CH_2$—$OH)_3$, —$CH_2$—$CH(OH)$—$CH_3$, —$CH_2$—$CH(OH)$—$CH_2$—OH,

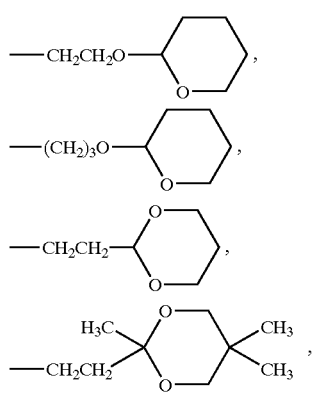

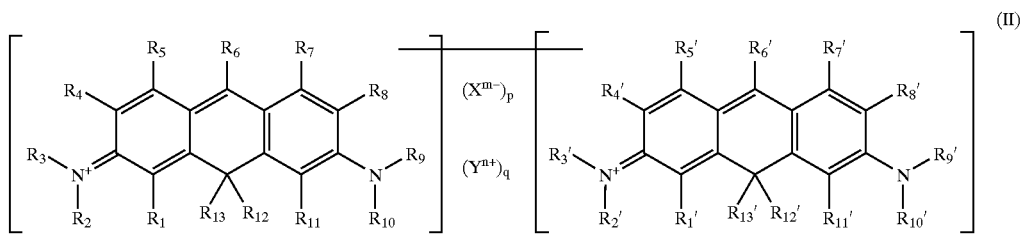

and —$(CH_2)_2CH=N$—$R_{14}$, wherein $R_{14}$ is $C_1$–$C_{24}$alkyl, $C_2$–$C_{24}$alkenyl, $C_2$–$C_{24}$alkynyl, $C_3$–$C_{24}$cycloalkyl, $C_3$–$C_{24}$cycloalkenyl, $C_7$–$C_{24}$aralkyl, $C_6$–$C_{24}$aryl, $C_4$–$C_{12}$heteroaryl or $C_1$–$C_{12}$heterocycloalkyl, each unsubstituted or substituted by one or more identical or different substituents $G_2$, or is a metal complex. When $R_{14}$ is $C_1$–$C_{24}$alkyl, it may be uninterrupted or interrupted by from 1 to 3 oxygen and/or silicon atoms. $G_2$ or $G_3$ may especially advantageously be alkyl unsubstituted or substituted by one or two hydroxy substituents or by a metallocenyl or azo metal complex radical. Such radicals $G_1$ are of very special importance as $R_6$.

The compound of formula (I) may optionally also be a dimer of formula $$\left[\begin{array}{c} R_5 \quad R_6 \quad R_7 \\ R_4 \quad\quad\quad\quad R_8 \\ R_3\diagdown N^+ \quad\quad\quad\quad N \diagup R_9 \\ R_2 \quad R_1 \quad R_{13} \, R_{12} \quad R_{11} \quad R_{10} \end{array}\right] \begin{array}{c}(X^{m-})_p \\ \\ (Y^{n+})_q\end{array} \left[\begin{array}{c} R_5' \quad R_6' \quad R_7' \\ R_4' \quad\quad\quad\quad R_8' \\ R_3'\diagdown N^+ \quad\quad\quad\quad N \diagup R_9' \\ R_2' \quad R_1' \quad R_{13}' \, R_{12}' \quad R_{11}' \quad R_{10}' \end{array}\right] \quad (II)$$

wherein $R_1'$ to $R_{13}'$ have the same meanings as $R_1$ to $R_{13}$ and an R substituent selected from $R_1$ to $R_{13}$ is bonded to an R' substituent selected from $R_1'$ to $R_{13}'$, for example via a direct bond, an alkylene group or a hetero atom, or an R' substituent selected from $R_1'$ to $R_{13}'$ is a direct bond to an R substituent selected from $R_1$ to $R_{13}$.

Great importance is attached especially to compounds of formula (II) wherein $R_6$ is bonded to $R_6'$, or $R_6'$ is a direct bond to $R_6$.

When the numbers p and q are not whole numbers, it is to be understood by formulae (I) and (II) that there is a mixture of a certain molar composition, the individual components of which may also have different stoichiometry.

Alkyl, alkenyl or alkynyl may be straight-chain or branched. Alkenyl is alkyl that is mono- or poly-unsaturated, wherein two or more double bonds may be isolated or conjugated. Alkynyl is alkyl or alkenyl that is double-unsaturated one or more times, wherein the triple bonds may be isolated or conjugated with one another or with double bonds. Cycloalkyl or cycloalkenyl is monocyclic or polycyclic alkyl or alkenyl, respectively.

$C_1$–$C_{24}$Alkyl can therefore be, for example, methyl, ethyl, n-propyl, isopropyl, n-butyl, sec-butyl, isobutyl, tert-butyl, 2-methyl-butyl, n-pentyl, 2-pentyl, 3-pentyl, 2,2-dimethylpropyl, n-hexyl, heptyl, n-octyl, 1,1,3,3-tetramethylbutyl, 2-ethylhexyl, nonyl, decyl, undecyl, dodecyl, tridecyl, tetradecyl, pentadecyl, hexadecyl, heptadecyl, octadecyl, nonadecyl, eicosyl, heneicosyl, docosyl or tetracosyl.

$C_3$–$C_{24}$Cycloalkyl can therefore be, for example, cyclopropyl, cyclopropyl-methyl, cyclobutyl, cyclopentyl, cyclohexyl, cyclohexyl-methyl, trimethyl-cyclohexyl, thujyl, norbornyl, bornyl, norcaryl, caryl, menthyl, norpinyl, pinyl, 1-adamantyl, 2-adamantyl, 5α-gonyl or 5ξ-pregnyl.

$C_2$–$C_{24}$Alkenyl is, for example, vinyl, allyl, 2-propen-2-yl, 2-buten-1-yl, 3-buten-1-yl, 1,3-butadien-2-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, or any desired isomer of hexenyl, octenyl, nonenyl, decenyl, dodecenyl, tetradecenyl, hexadecenyl, octadecenyl, eicosenyl, heneicosenyl, docosenyl, tetracosenyl, hexadienyl, octadienyl, nonadienyl, decadienyl, dodecadienyl, tetradecadienyl, hexadecadienyl, octadecadienyl or eicosadienyl.

$C_3$–$C_{24}$Cycloalkenyl is, for example, 2-cyclobuten-1-yl, 2-cyclopenten-1-yl, 2-cyclohexen-1-yl, 3-cyclohexen-1-yl, 2,4-cyclohexadien-1-yl, 1-p-menthen-8-yl, 4(10)-thujen-10-yl, 2-norbornen-1-yl, 2,5-norbornadien-1-yl, 7,7-dimethyl-2,4-norcaradien-3-yl or camphenyl.

$C_1$–$C_{24}$Alkoxy is O—$C_1$–$C_{24}$alkyl, and $C_1$–$C_{24}$alkylthio is S—$C_1$–$C_{24}$alkyl.

$C_2$–$C_{24}$Alkynyl is, for example, 1-propyn-3-yl, 1-butyn-4-yl, 1-pentyn-5-yl, 2-methyl-3-butyn-2-yl, 1,4-pentadiyn-3-yl, 1,3-pentadiyn-5-yl, 1-hexyn-6-yl, cis-3-methyl-2-penten-4-yn-1-yl, trans-3-methyl-2-penten-4-yn-1-yl, 1,3-hexadiyn-5-yl, 1-octyn-8-yl, 1-nonyn-9-yl, 1-decyn-10-yl or 1-tetracosyn-24-yl.

$C_7$–$C_{24}$Aralkyl is, for example, benzyl, 2-benzyl-2-propyl, β-phenyl-ethyl, 9-fluorenyl, α,α-dimethylbenzyl, ω-phenyl-butyl, ω-phenyl-octyl, ω-phenyl-dodecyl or 3-methyl-5-(1',1',3',3'-tetramethyl-butyl)-benzyl. $C_7$–$C_{24}$Aralkyl can also be, for example, 2,4,6-tri-tert-butyl-benzyl or 1-(3,5-dibenzyl-phenyl)-3-methyl-2-propyl. When $C_7$–$C_{24}$aralkyl is substituted, either the alkyl moiety or the aryl moiety of the aralkyl group can be substituted, the latter alternative being preferred.

$C_6$–$C_{24}$Aryl is, for example, phenyl, naphthyl, biphenylyl, 2-fluorenyl, phenanthryl, anthracenyl or terphenylyl.

Halogen is chlorine, bromine, fluorine or iodine, preferably chlorine or bromine.

$C_4$–$C_{12}$Heteroaryl is an unsaturated or aromatic radical having 4n+2 conjugated π-electrons, for example 2-thienyl, 2-furyl, 1-pyrazolyl, 2-pyridyl, 2-thiazolyl, 2-oxazolyl, 2-imidazolyl, isothiazolyl, triazolyl or any other ring system consisting of thiophene, furan, pyridine, thiazole, oxazole, imidazole, isothiazole, thiadiazole, triazole, pyridine and benzene rings and unsubstituted or substituted by from 1 to 6 ethyl, methyl, ethylene and/or methylene substituents.

Furthermore, aryl and aralkyl can also be aromatic groups bonded to a metal, for example in the form of metallocenes of transition metals known per se, more especially

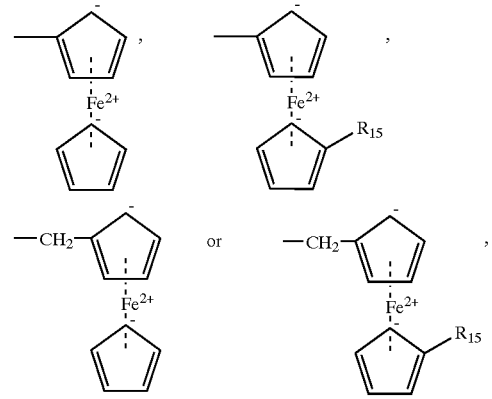

wherein $R_{15}$ is $CH_2OH$, $CH_2OA$, $COOH$, $COOA$ and $COO^-$.

$C_1$–$C_{12}$Heterocycloalkyl is an unsaturated or partially unsaturated ring system radical, for example tetrazolyl; pyrrolidyl, piperidyl, piperazinyl, imidazolinyl, pyrazolidinyl, pyrazolinyl, morpholinyl, quinuclidinyl or another $C_4$–$C_{12}$heteroaryl that is mono- or poly-hydrogenated.

$Y^{n+}$ as a metal, ammonium or phosphonium cation is, for example, $Li^+$, $Na^+$, $K^+$, $Mg^{2+}$, $Ca^{2+}$, $Cu^{2+}$, $Ni^{2+}$, $Fe^{2+}$, $Co^{2+}$, $Zn^{2+}$, $Sn^{2+}$, $Cr^{3+}$, $La^{3+}$, methylammonium, ethylammonium, pentadecylammonium, isopropylammonium, dicyclohexylammonium, tetramethylammonium, tetraethylammonium, tetrabutylammonium, benzyltrimethylammonium, benzyltriethylammonium, methyltrioctylammonium, tridodecylmethylammonium, tetrabutylphosphonium, tetraphenylphosphonium, butyltriphenylphosphonium or ethyltriphenylphosphonium, or protonated Primen 81R™ or Rosin Amin D™.

$X^{m-}$ as an inorganic, organic or organometallic anion is, for example, the anion of a mineral acid, the conjugate base of an organic acid or an organometal complex anion, for example fluoride, chloride, bromide, iodide, perchlorate, periodate, nitrate, ½ carbonate, hydrogen carbonate, $C_1$–$C_4$alkyl sulfate, ½ sulfate, hydrogen sulfate, ⅓ phosphate, ½ hydrogen phosphate, dihydrogen phosphate, ½ $C_1$–$C_4$alkanephosphonate, $C_1$–$C_4$alkane-$C_1$–$C_{12}$alkyl-phosphonate, di-$C_1$–$C_4$alkylphosphinate, tetrafluoroborate, hexafluorophosphate, hexafluoroantimonate, acetate, trifluoroacetate, heptafluorobutyrate, ½ oxalate, methanesulfonate, trifluoromethanesulfonate, tosylate, benzenesulfonate, p-chlorobenzenesulfonate, p-nitrobenzenesulfonate, an alcoholate, phenolate (e.g. phenolate itself), carboxylate (also e.g. benzoate), sulfonate or phosphonate) or a negatively charged metal complex.

The person skilled in the art will readily recognise that it is also possible to use other anions with which he is familiar. It will be self-evident to him that $$\frac{1}{x}$$

of an inorganic, organic or organometallic anion having x negative charges, for example ½.$SO_4^{2-}$, is a multiply charged anion which neutralises several singly charged cations or a cation having x charges, as the case may be.

Phenolates or carboxylates are, for example, anions of $C_1$–$C_{12}$alkylated, especially tert-$C_4$–$C_8$alkylated, phenols or benzoic acids, such as

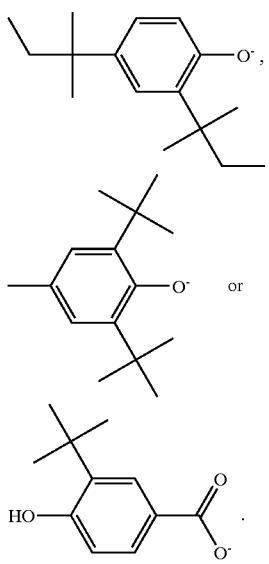
When $X^{m-}$ is an organometallic anion, it is preferably a metal complex of formula $[(L_1)M_1(L_2)]^{m-}$ (III) or $[(L_3)M_2(L_4)]^-$ (IV), wherein $M_1$ and $M_2$ are a transition metal, preferably $M_1$ being $Cr^{3+}$ or $Co^{3+}$ and $M_2$ being $Ni^{2+}$, $Co^{2+}$ or $Cu^{2+}$, m is a number from 1 to 6, $L_1$ and $L_2$ are each independently of the other a ligand of formula
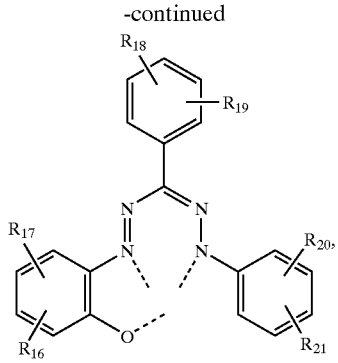
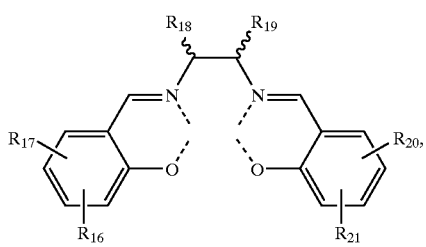
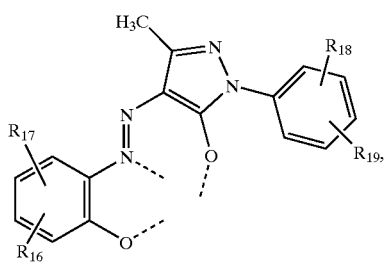
-continued
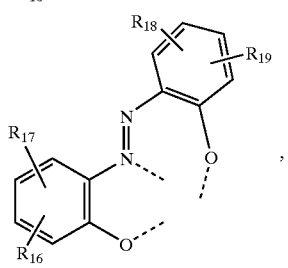
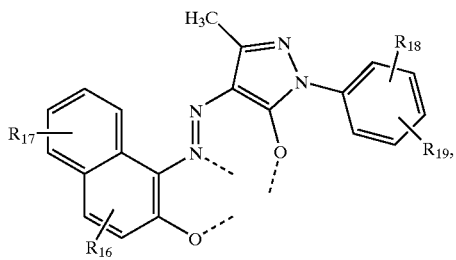
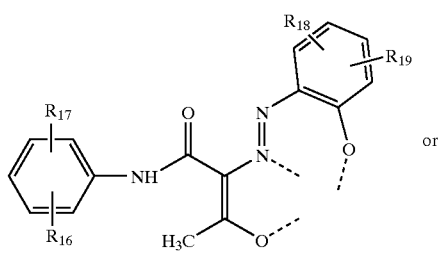
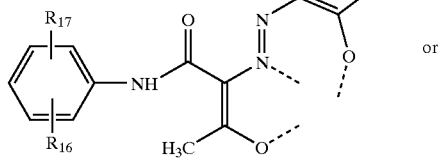
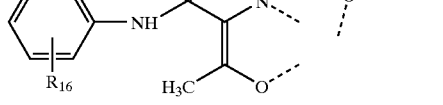

-continued

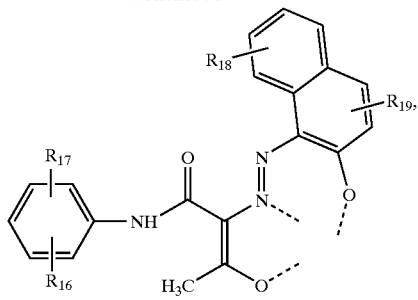

and $L_3$ and $L_4$ are each independently of the other a ligand of formula

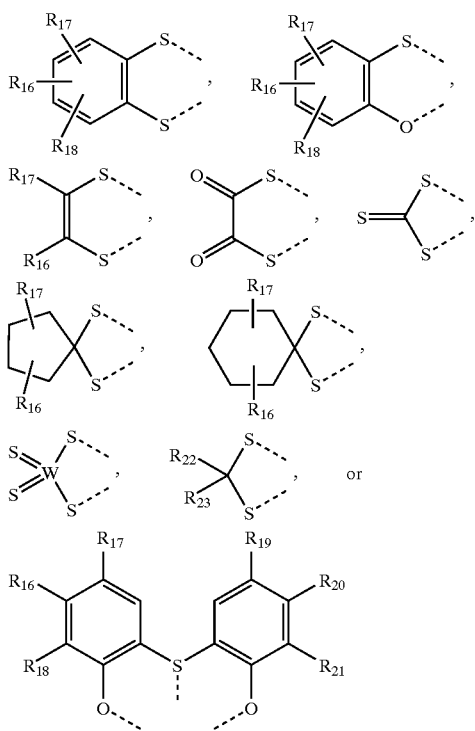

wherein $R_{16}$, $R_{17}$, $R_{18}$, $R_{19}$, $R_{20}$ and $R_{21}$ are each independently of the others hydrogen, halogen, cyano, $R_{24}$, $NO_2$, $NR_{24}R_{25}$, $NHCO$—$R_{24}$, $NHCOOR_{24}$, $SO_2$—$R_{24}$, $SO_2NH_2$, $SO_2NHR_{24}$, $SO_2NR_{24}R_{25}$, $SO_3^-$ or $SO_3H$, preferably hydrogen, chlorine, $SO_2NH_2$ or $SO_2NHR_{24}$, and $R_{22}$ and $R_{23}$ are each independently of the other $CN$, $CONH_2$, $CONHR_{24}$, $CONR_{24}R_{25}$, $COOR_{24}$ or $COR_{24}$, wherein $R_{24}$ and $R_{25}$ are each independently of the other $C_1$–$C_{12}$alkyl, $C_1$–$C_{12}$alkoxy-$C_2$–$C_{12}$alkyl, $C_7$–$C_{12}$aralkyl or $C_6$–$C_{12}$aryl, preferably $C_1$–$C_4$alkyl, each unsubstituted or substituted by hydroxy, halogen, sulfato, $C_1$–$C_6$alkoxy, $C_1$–$C_6$alkylthio, $C_1$–$C_6$alkylamino or by di-$C_1$–$C_6$alkylamino, or $R_{24}$ and $R_{25}$ together are $C_4$–$C_{10}$heterocycloalkyl; it also being possible for $R_{16}$ and $R_{17}$, $R_{18}$ and $R_{19}$, and/or $R_{20}$ and $R_{21}$ to be bonded together in pairs in such a manner that a 5- or 6-membered ring is formed.

Reference is made by way of illustration, but on no account as a limitation, to the individual compounds disclosed in U.S. Pat. No. 5,219,707, U.S. Pat. No. 6,168,843, U.S. Pat. No. 6,242,067, WO-01/19923, WO-01/62853, EP-A-1 125 987, EP-A-1 132 902, JP-A-06/199045, JP-A-07/262604, JP-A-2000/190642 and JP-A-2000/198273.

It is also possible, however, to use any other known transition metal complex anion that contains, for example, a phenolic or phenylcarboxylic azo compound as ligand $L_1$ or $L_2$.

Preference is given to compounds of formula (I) wherein $R_1$, $R_4$, $R_5$, $R_7$, $R_8$ and $R_{11}$ are hydrogen; $R_2$, $R_3$, $R_9$, $R_{10}$, $R_{12}$ and $R_{13}$ are each independently of the others methyl, ethyl or $R_{14}$, it being possible for $R_2$ and $R_3$, $R_9$ and $R_{10}$, $R_{12}$ and $R_{13}$ and/or $R_9$ and $R_{10}$ also to be bonded together in pairs via a direct bond, methylene, —O— or —N($C_1$–$C_4$alkyl); and $R_6$ is hydrogen or $C_1$–$C_{12}$alkyl, $C_6$–$C_{12}$aryl or $C_7$–$C_{13}$aralkyl, each unsubstituted or mono- to tetra-substituted by halogen, —O$^-$, —$OR_{26}$, —CN, —$NR_{26}R_{27}$, —$N^+R_{26}R_{27}R_{28}$, —$N(R_{26})COR_{27}$, —$COO^-$, —$COOR_{26}$, —$CONR_{26}R_{27}$, $R_{14}$ or by —$N(R_{26})COR_{27}R_{28}$, wherein $R_{26}$, $R_{27}$ and $R_{28}$ are each independently of the others $C_1$–$C_{12}$alkyl, $C_6$–$C_{12}$aryl or $C_7$–$C_{13}$aralkyl;

all the bridging possibilities, limitations and definitions indicated above otherwise remaining unchanged.

When $R_6$ is unsubstituted or substituted $C_6$–$C_{12}$aryl, it is preferably

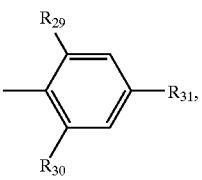

wherein $R_{29}$, $R_{30}$ and $R_{31}$ are each independently of the others hydrogen, halogen, $COOR_{32}$, $OR_{32}$ or $NR_{32}R_{33}$, wherein $R_{32}$ and $R_{33}$ are each independently of the other hydrogen or $C_1$–$C_{12}$alkyl, $C_2$–$C_{12}$alkenyl, $C_1$–$C_{12}$cycloalkyl, $C_2$–$C_{12}$cycloalkenyl, $C_6$–$C_{12}$aryl or $C_7$–$C_{13}$aralkyl, each unsubstituted or substituted by one or two hydroxy substituents or by a metallocenyl or azo metal complex radical and uninterrupted or interrupted by 1, 2, 3, 4 or 5 oxygen and/or silicon atoms. $R_{29}$ is preferably hydrogen, carboxy or COO—$C_1$–$C_8$alkyl, $R_{30}$ is hydrogen or halogen, and $R_{31}$ is hydrogen, $C_1$–$C_8$alkoxy or di-$C_1$–$C_8$alkyl-amino.

Special preference is given to compounds of formula (I) wherein $R_6$ is

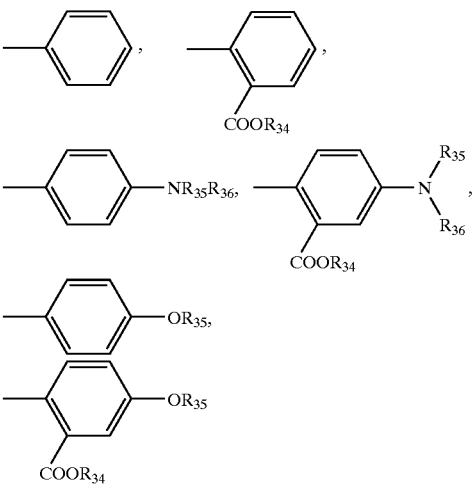

or $R_{37}$, and $R_{34}$, $R_{35}$ and $R_{36}$ are each independently of the others hydrogen or $R_{37}$.

When $R_6$ is substituted by $R_{37}$, then it is preferably substituted by a single $R_{37}$. The total number of radicals $R_{37}$ in formula (I) is preferably 0, 1 or 2, especially 0 or 1. The total number of radicals $R_{37}$ in formula (II) is preferably 0, 1, 2, 3 or 4, especially 0 or 2.

$R_{37}$ is preferably alkyl uninterrupted or interrupted by from 1 to 3 oxygen and/or silicon atoms and unsubstituted or substituted by one or two hydroxy substituents or by a metallocenyl or azo metal complex radical, especially $C_1$–$C_8$alkyl, $CH_2$—$CH_2$—OH, —$CH_2$—O—$CH_3$, —$CH_2$—O—$(CH_2)_7$—$CH_3$, —$CH_2$—$CH_2$—O—$CH_2$—$CH_3$, —$CH_2$—$CH(OCH_3)_2$, —$CH_2$—$CH_2$—$CH(OCH_3)_2$, —$CH_2$—$C(OCH_3)_2$—$CH_3$, —$CH_2$—$CH_2$—O—$CH_2$—$CH_2$—O—$CH_3$, —$(CH_2)_3$—OH, —$(CH_2)_6$—OH, —$(CH_2)_7$—OH, —$(CH_2)_8$—OH, —$(CH_2)_9$—OH, —$(CH_2)_{10}$—OH, —$(CH_2)_{11}$—OH, —$(CH_2)_{12}$—OH, —$CH_2$—$Si(CH_3)_3$, —$CH_2$—$CH_2$—O—$Si(CH_3)_2$—$C(CH_3)_3$, —$(CH_2)_3$—O—$Si(CH_3)_2$—$C(CH_3)_3$, —$(CH_2)_4$—O—$Si(C_6H_5)_2$—$C(CH_3)_3$, —$(CH_2)_5$—O—$Si(CH(CH_3)_2)_3$, —$CH_2$—$CH_2$—$CH(CH_3)$—$CH_2$—$CH_2$—$CH(OH)$—$C(CH_3)_2$—OH, —$CH_2$—$CH(CH_3)$—$CH_2$—OH, —$CH_2$—$C(CH_3)_2$—$CH_2$—OH, —$CH_2$—$C(CH_2$—$OH)_3$, —$CH_2$—$CH(OH)$—$CH_3$, —$CH_2$—$CH(OH)$—$CH_2$—OH,

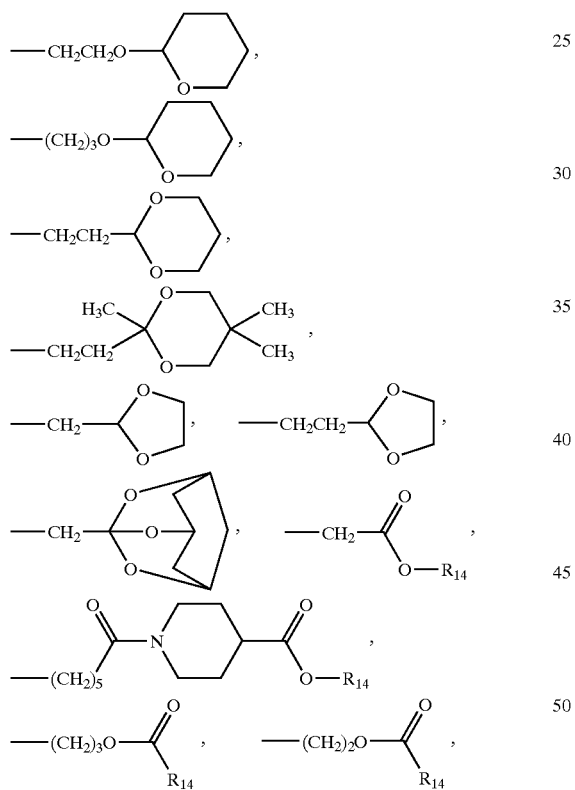

$C_2$–$C_8$alkylene-O—CO-Đ, $C_2$–$C_8$alkylene-COO-Đ or $C_2$–$C_8$alkylene-N=CH-Đ, wherein Đ is

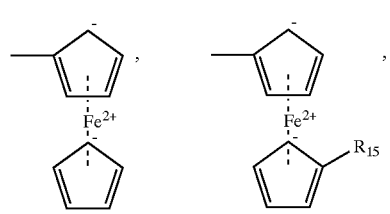

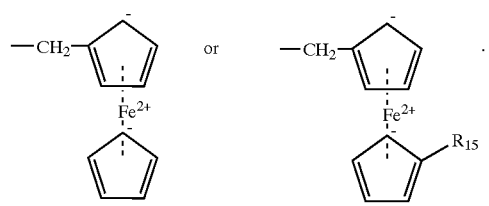

Azo metal complex radicals have, for example, the formula —$[(L_1)M_1(L_2)]^{m-}$.

Metallocenyl radicals preferably contain as metal Ni, Co, Cu, Ti or especially Fe. For example, $R_{37}$ in formula (I) or (II) as a metallocenyl radical may be

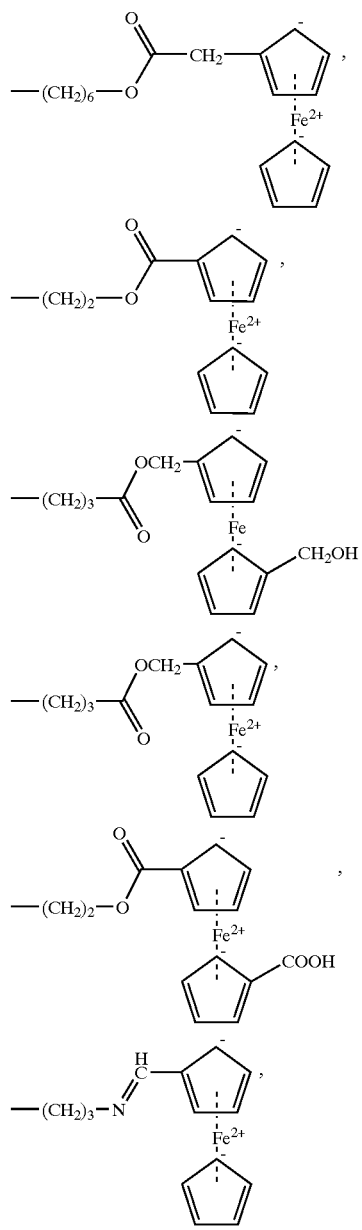

[—$C_2$–$C_8$alkylene-$SO_2$]$_2$-Ø-Š, [—$C_2$–$C_8$alkylene-O—$C_2$–$C_8$alkylene-$NHSO_2$]$_2$-Ø-Š, [—$C_2$–$C_8$alkylene-$NHSO_2$]$_2$- Ø-Š, [—$C_2$–$C_8$alkylene-NH—$C_2$–$C_8$alkylene-$SO_2$]$_2$-Ø-Š or [—$C_2$–$C_8$alkylene-N($C_1$–$C_8$alkyl)-$C_2$–$C_8$alkylene-SO$_2$]$_2$-Ø-Š; or in formula (II) as an azo metal complex radical may be [—$C_2$–$C_8$alkylene-SO$_2$]$_2$-Ø-, [—$C_2$–$C_8$alkylene-NHSO$_2$]$_2$-Ø-, [—$C_2$–$C_8$alkylene-O—$C_2$–$C_8$alkylene-NHSO$_2$]$_2$-Ø-, [—$C_2$–$C_8$alkylene-NH—$C_2$–$C_8$alkylene-SO$_2$]$_2$-Ø- or [—$C_2$–$C_8$alkylene-N($C_1$–$C_8$alkyl)-$C_2$–$C_8$alkylene-SO$_2$]$_2$-Ø-, wherein Š is SO$_3^-$, SO$_2$-$C_1$–$C_8$alkyl, SO$_2$NR$_{39}$R$_{40}$, R$_{39}$ and R$_{40}$ are each independently of the other hydrogen or $C_1$–$C_{12}$alkyl, $C_2$–$C_{12}$alkenyl, $C_1$–$C_{12}$cycloalkyl, $C_2$–$C_{12}$cycloalkenyl, $C_6$–$C_{12}$aryl or $C_7$–$C_{13}$aralkyl, each uninterrupted or interrupted by from 1 to 5 oxygen and/or silicon atoms and unsubstituted or substituted by one or two hydroxy substituents, and Ø is the bivalent radical of an organometallic anion selected from the group consisting of

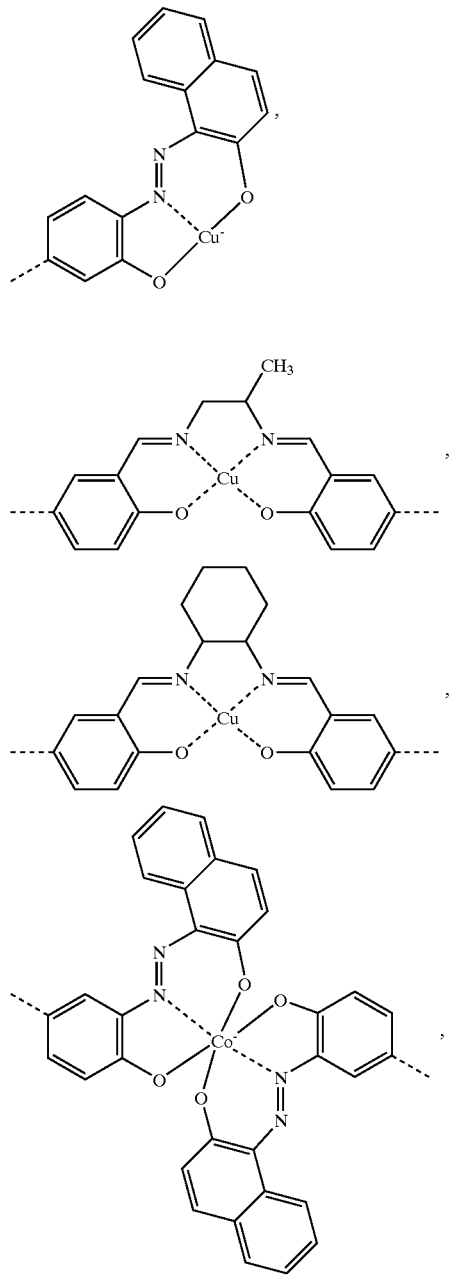

-continued

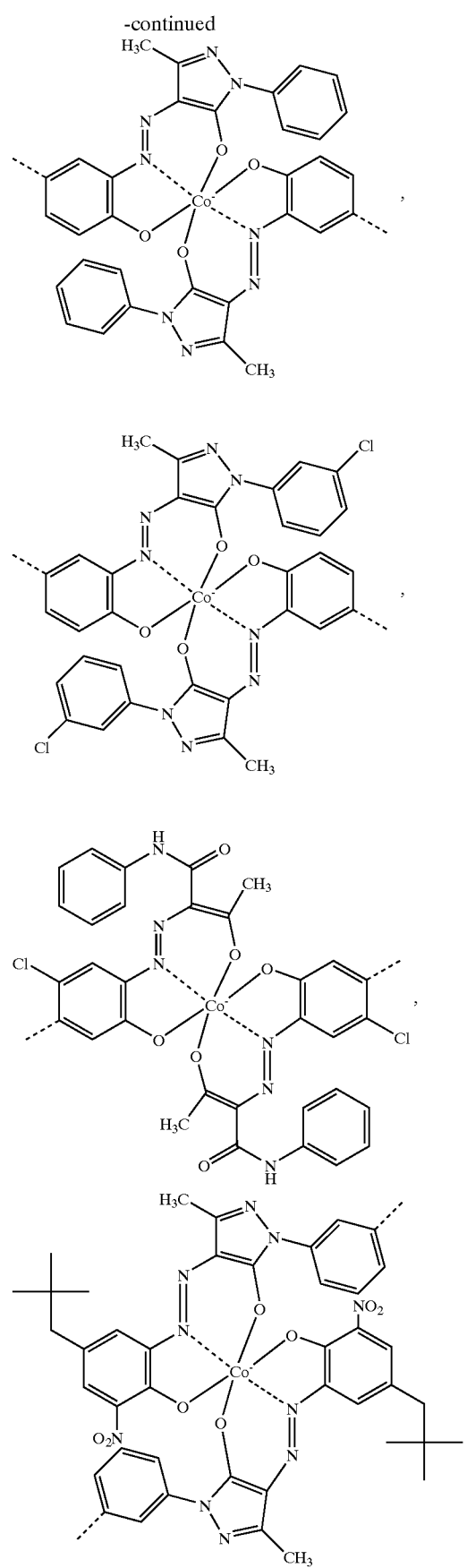

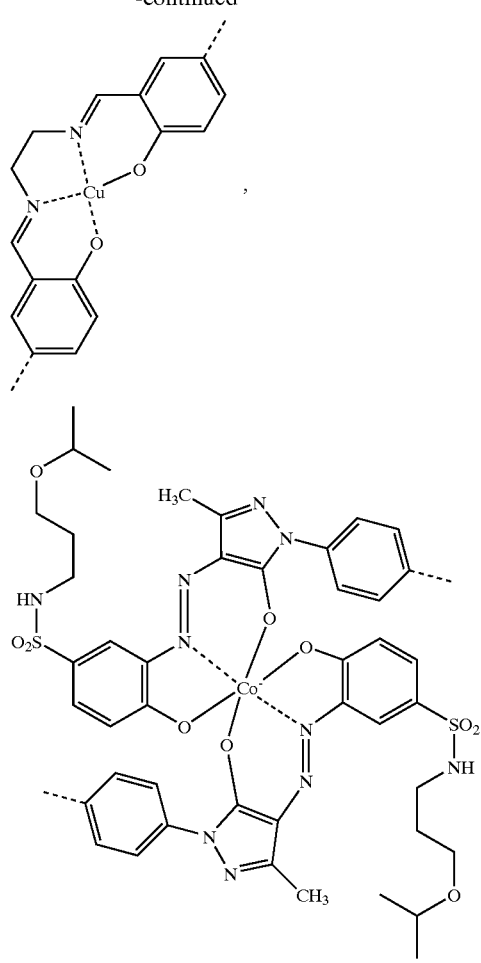

and

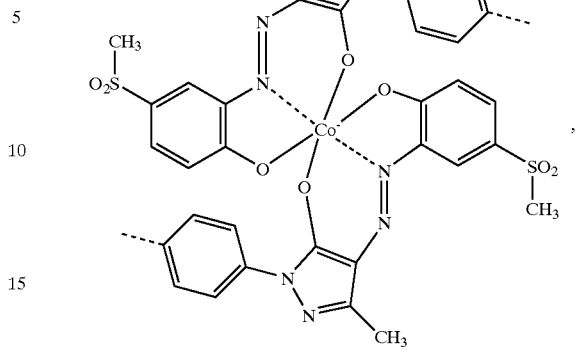

and those of the formulae Q1, Q2, Q3, Q4, Q5, Q6, Q7, Q8, Q9, Q10, Q11, Q12, Q13, Q14, Q15, Q16, Q17, Q18, Q19, Q20, Q21, Q22, Q23, Q24 and Q25 given hereinbelow. -Alkylene-$SO_2$-Ø, -alkylene-$NHSO_2$-Ø, -alkylene-O-alkylene-$NHSO_2$-Ø, -alkylene-NH-alkylene-$SO_2$-Ø or -alkylene-N(alkyl)-alkylene-$SO_2$-Ø are preferably —$(CH_2)_2$—$SO_2$-Ø, —$(CH_2)_2$—$NHSO_2$-Ø, —$(CH_2)_2$—O—$(CH_2)_2$—$NHSO_2$-Ø, —$(CH_2)_2$—NH—$(CH_2)_2$—$SO_2$-Ø, —$(CH_2)_6$—$NHSO_2$-Ø or —$(CH_2)_2$—$N(C_4H_9)$—$(CH_2)_2$—$SO_2$-Ø.

Of special interest are compounds of formula (I) substituted by azo metal complex radicals such as, for example,

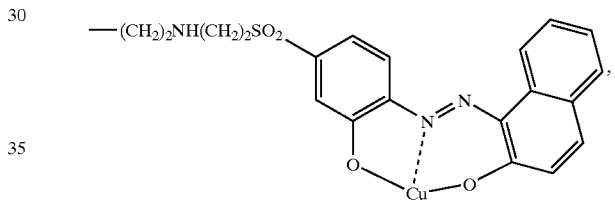

and also compounds of formula (II) wherein two radicals of formula (I) are linked via a bridge of formula

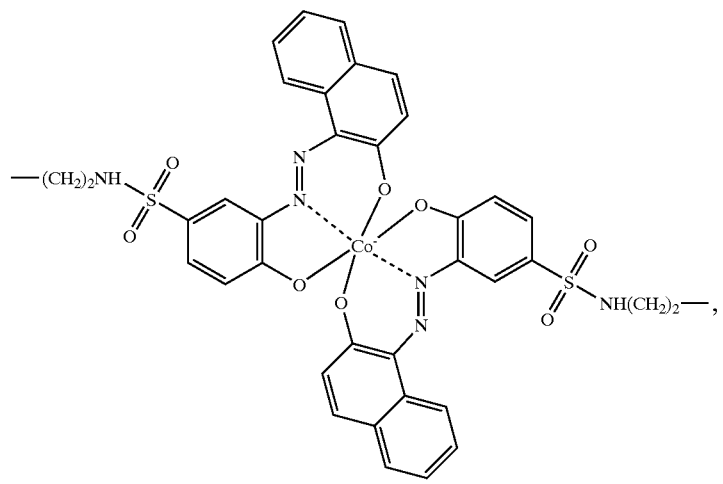

-continued
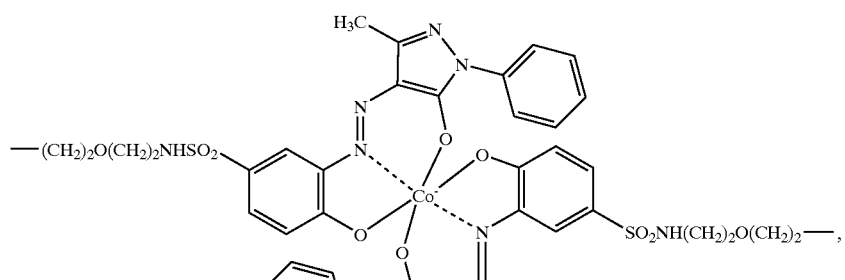
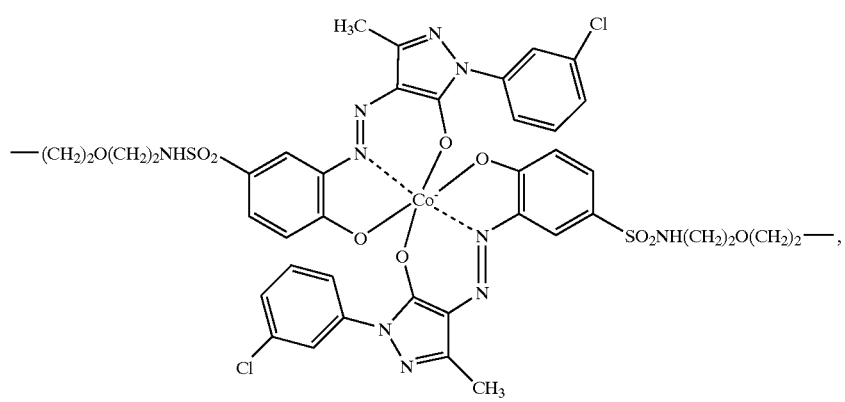
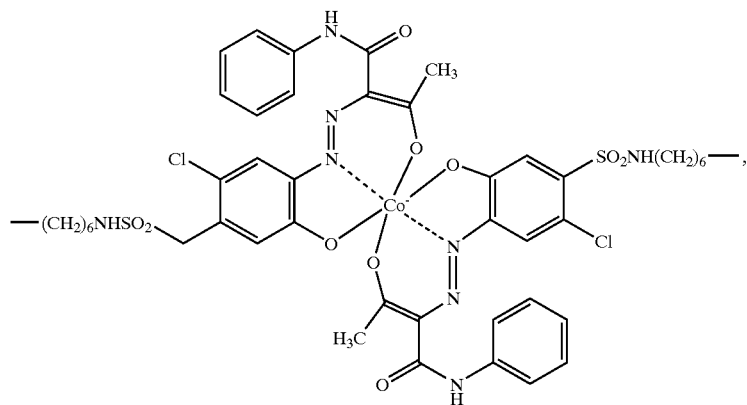
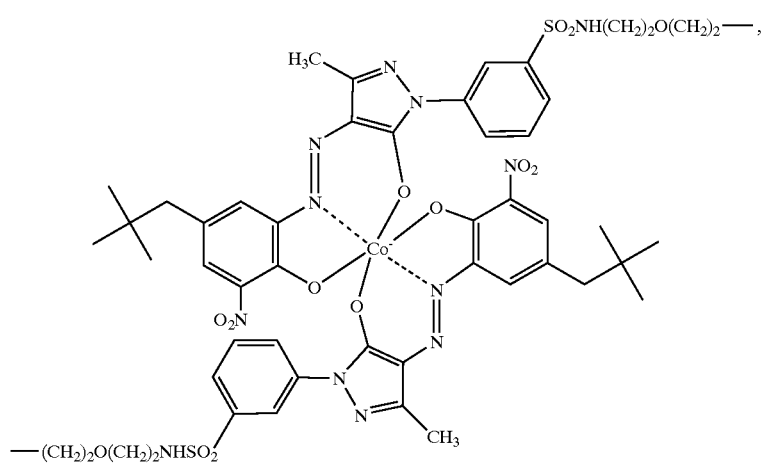

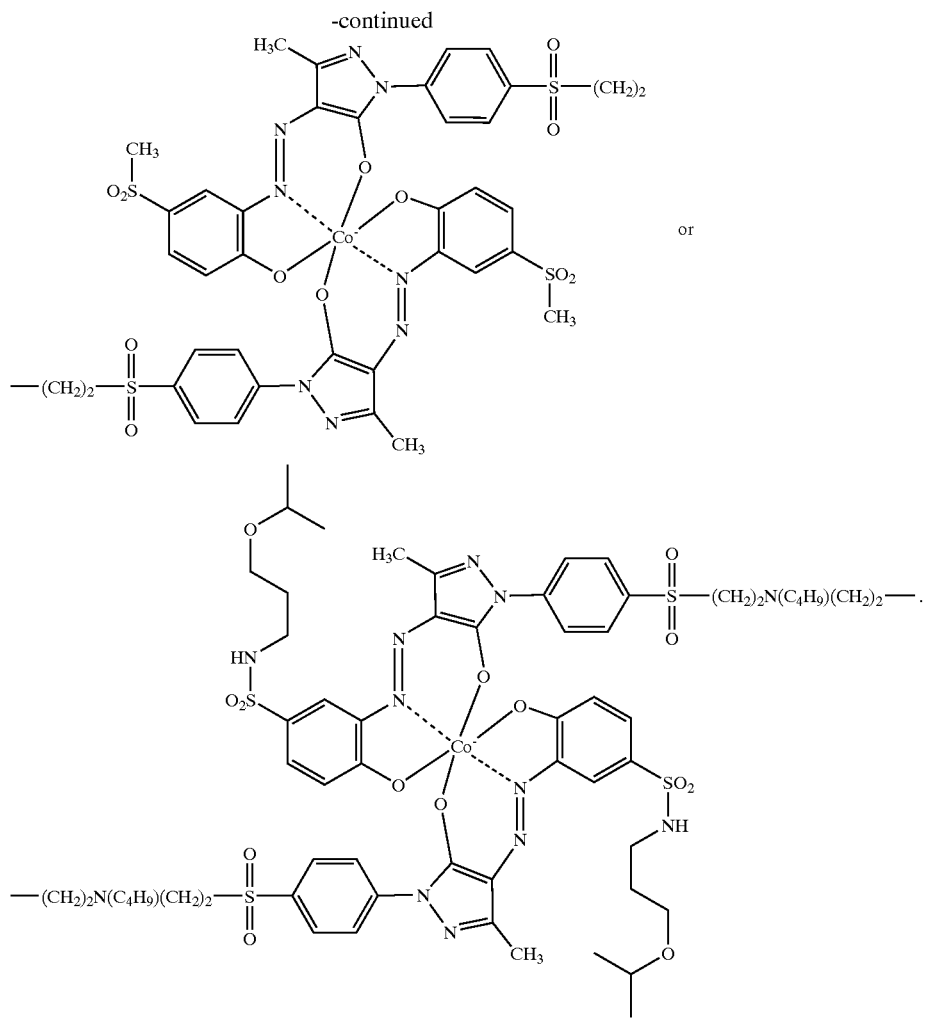

or

Those preferences apply to each of the sub-structures contained in formula (I) or (II), in each case independently of any other sub-structures which may be present, provided that the condition inherent in formula (I) or (II) is fulfilled, i.e. that the resulting compound does not have an excess positive or negative charge. Sub-structures of formula (I) or (II) are to be understood as including their three components carbopyronine, $(X^{m-})_p$ and $(Y^{n+})_q$ that are not bonded to one another.

Special preference is given also to compounds of formula (I) or (II) wherein $Y^{n+}$ is $[NH_2R_{38}R_{39}]^+$, $R_{38}$ being hydrogen or $C_1$–$C_{12}$alkyl and $R_{39}$ being $C_1$–$C_{24}$alkyl or $C_7$–$C_{24}$aralkyl, and $R_{38}$ and $R_{39}$ together having from 8 to 25 carbon atoms.

Special preference is given also to compounds of formula (I) or (II) wherein m and n are each the number 1, p is a number from 1 to 2½, and q is a number from 0 to 1½, the sum of positive charges in formula (I) or (II) being equal to the sum of negative charges.

Very special preference is given to the compounds of formula $[G^+]_1$-$[Q^-]_1$ (V) or $[G^+]_1(F)_r(Cl)_s$-$[Q^-]_1$ (VI), wherein $G^+$ is a cation selected from the group consisting of (G1)

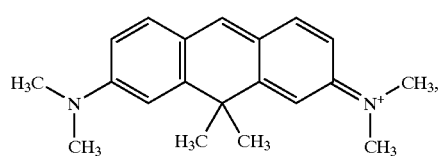

(G2)

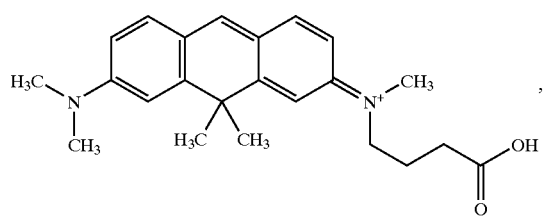

-continued
(G3) 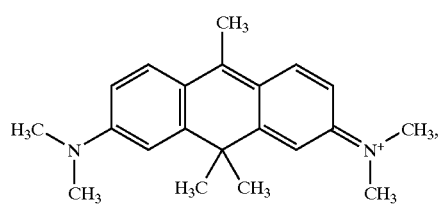
(G4) 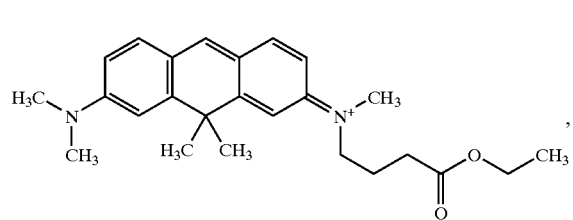
(G5) 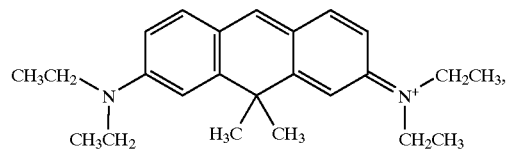
(G6) 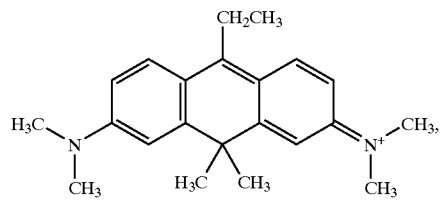
(G7) 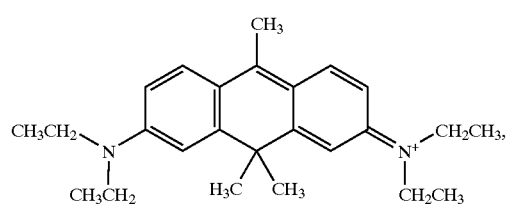
(G8) 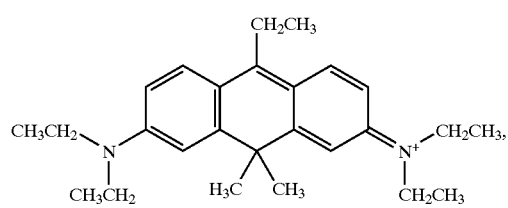
(G9) 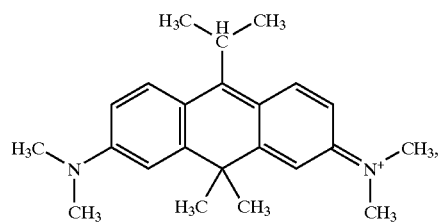
(G10) 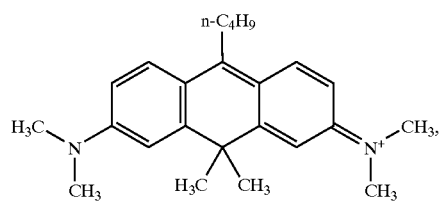
(G11) 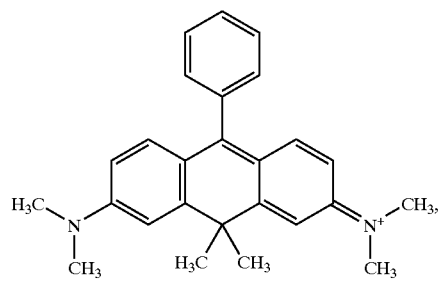
(G12) 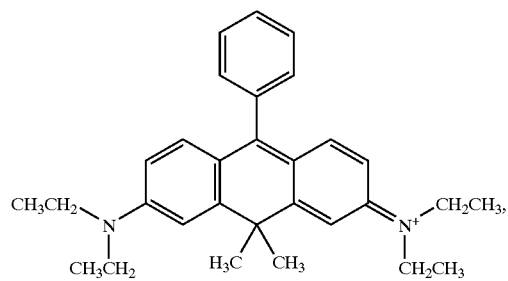
(G13) 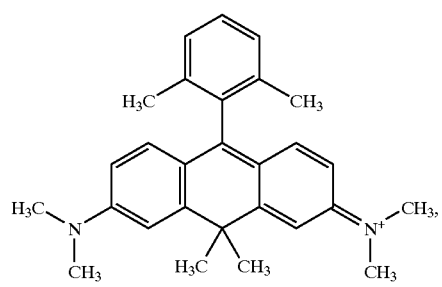
(G14) 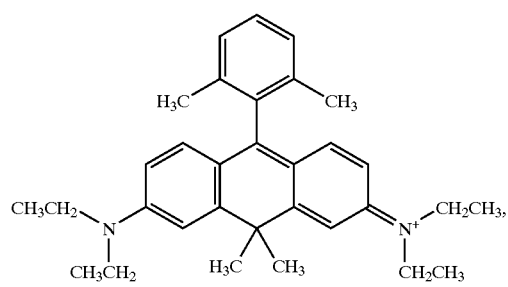

-continued
(G15) 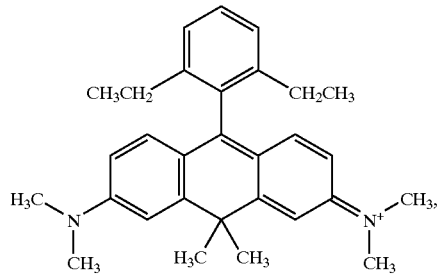
(G16) 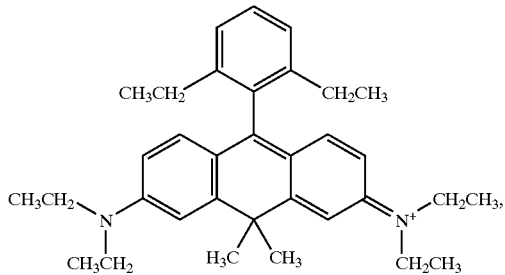
(G17) 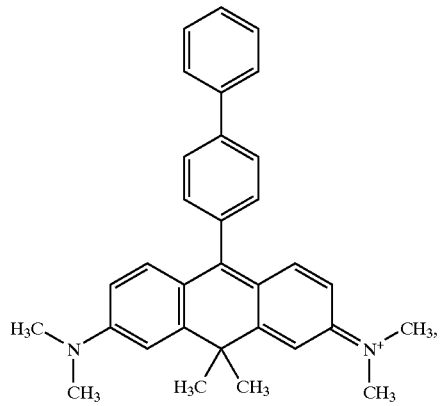
(G18) 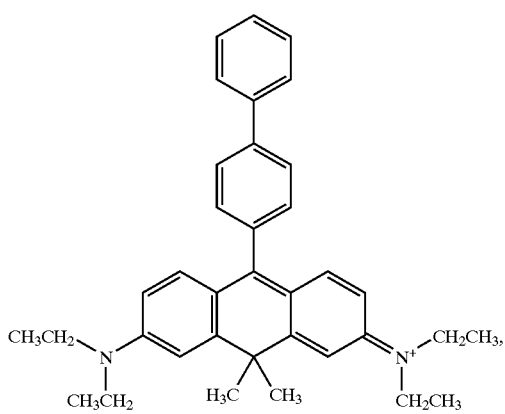
(G19) 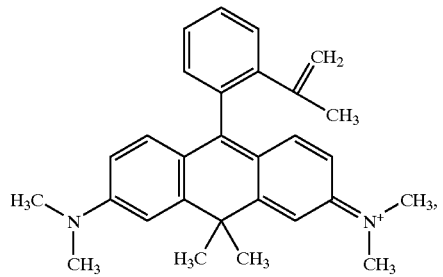
(G20) 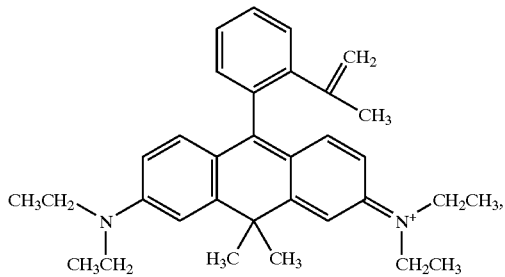
(G21) 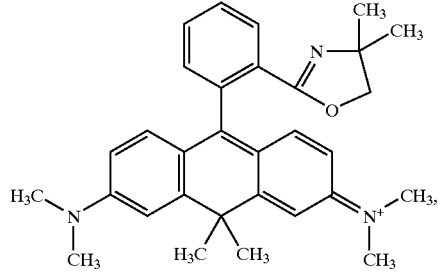
(G22) 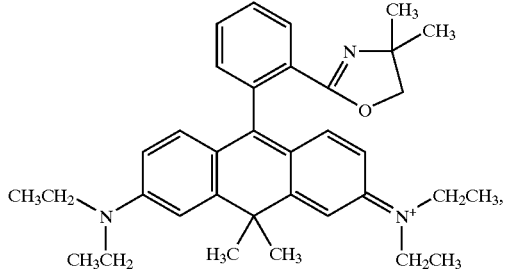
(G23) 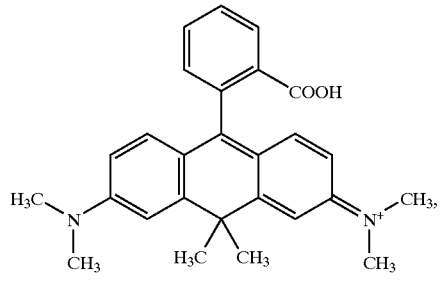
(G24) 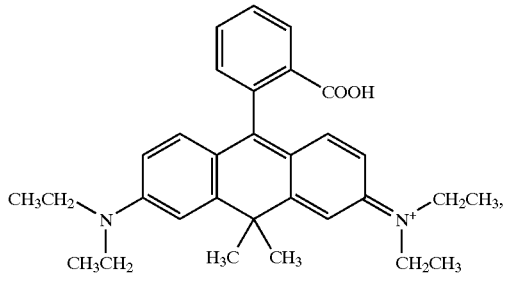

-continued
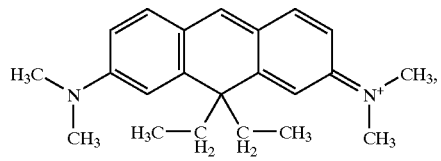
(G25)
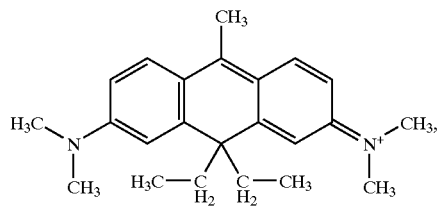
(G27)
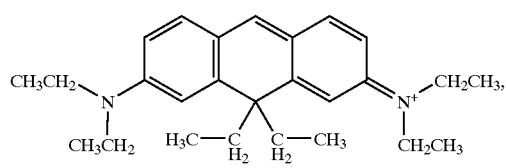
(G29)
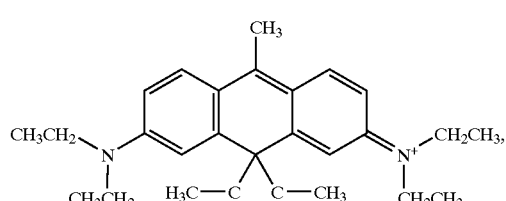
(G31)
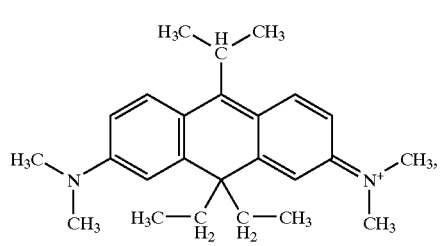
(G33)
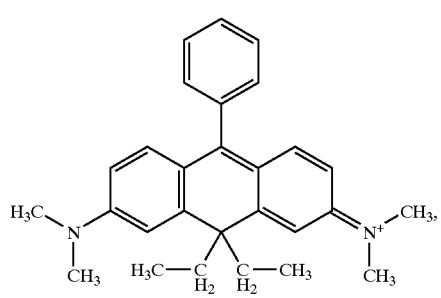
(G35)
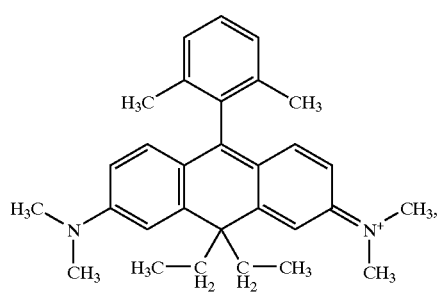
(G37)
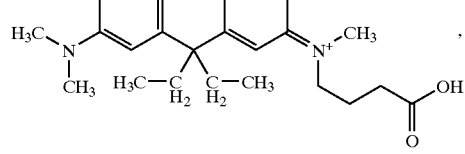
(G26)
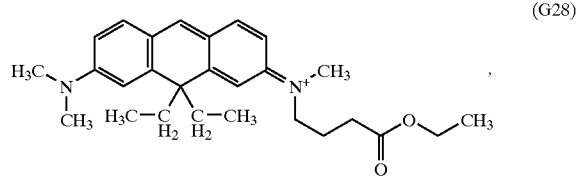
(G28)
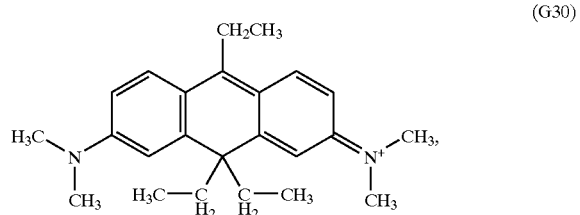
(G30)
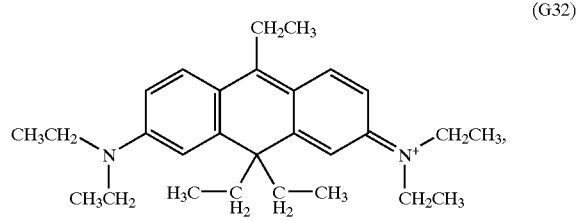
(G32)
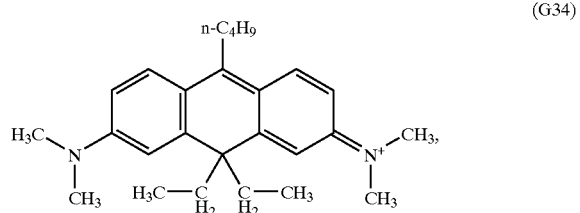
(G34)
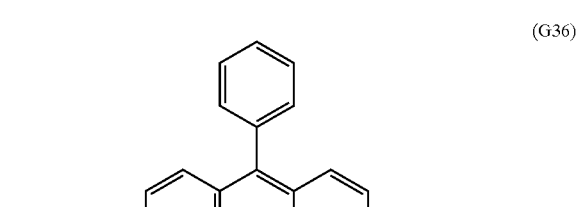
(G36)
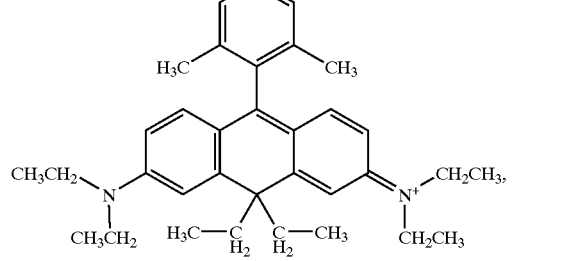
(G38)

-continued
(G39)
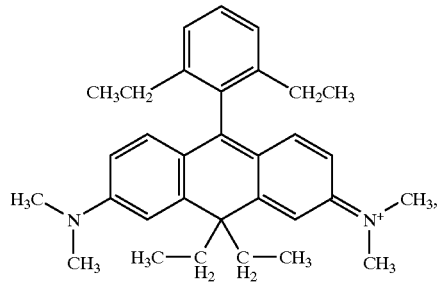
(G40)
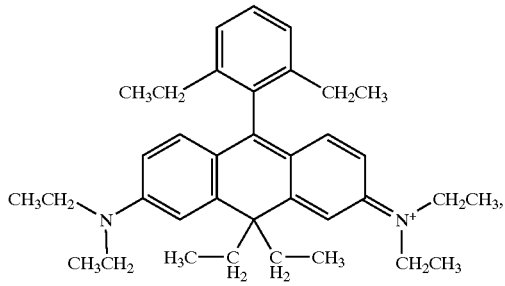
(G41)
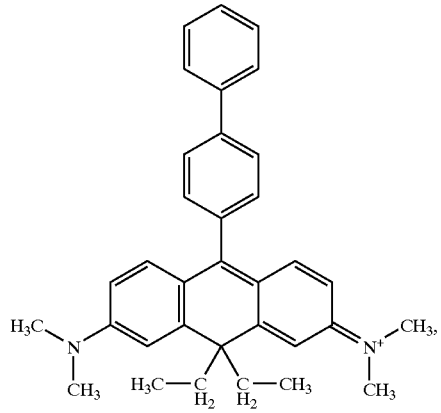
(G42)
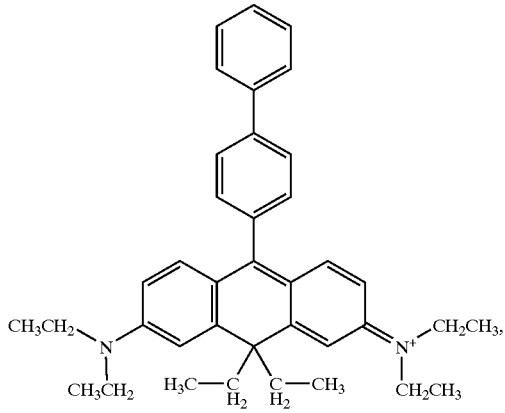
(G43)
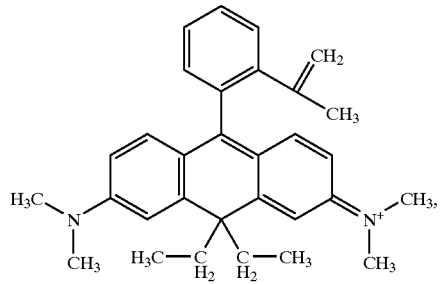
(G44)
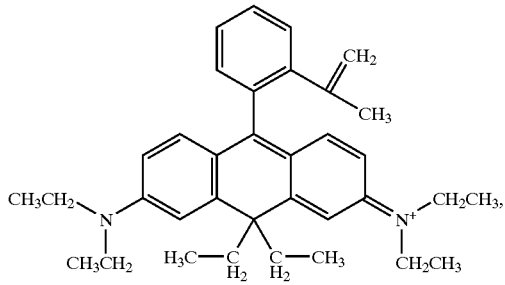
(G45)
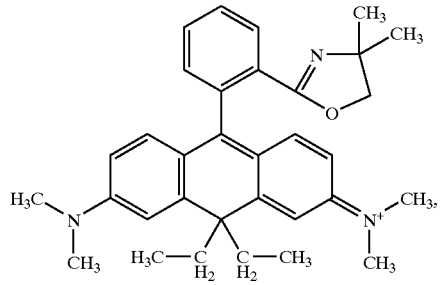
(G46)
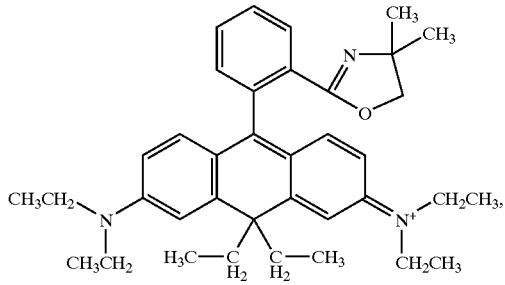
(G47)
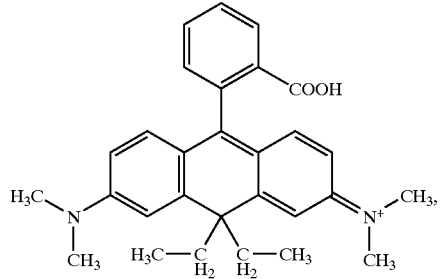
(G48)
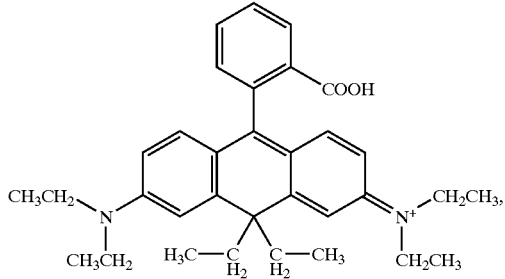

-continued
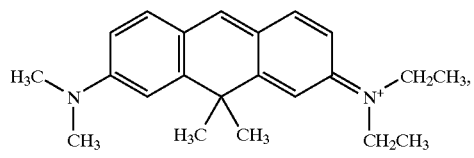 (G49)
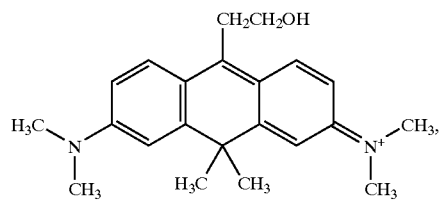 (G50)
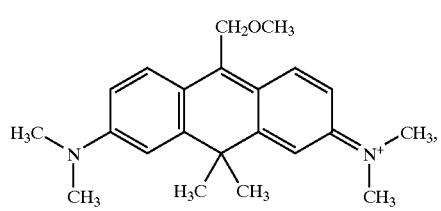 (G51)
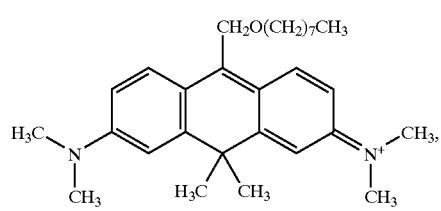 (G52)
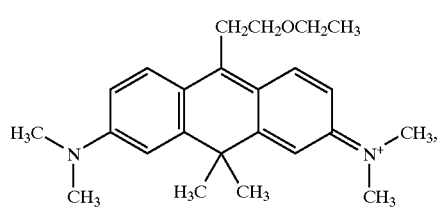 (G53)
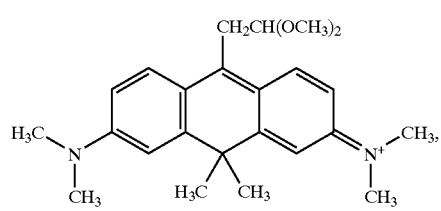 (G54)
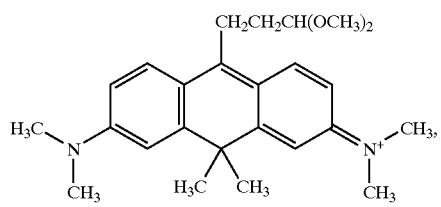 (G55)
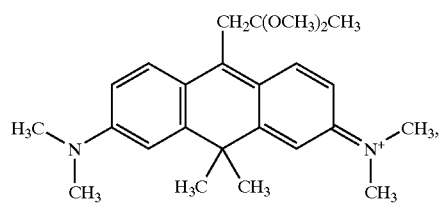 (G56)
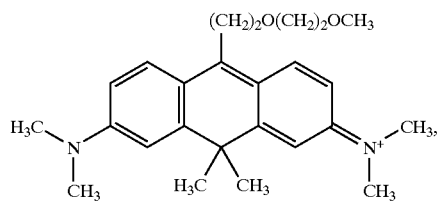 (G57)
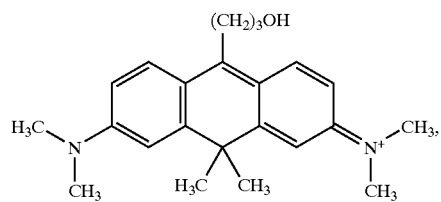 (G58)
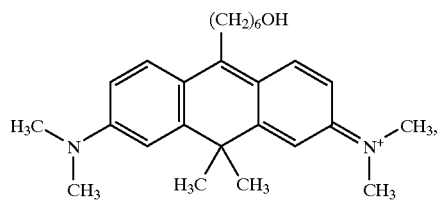 (G59)
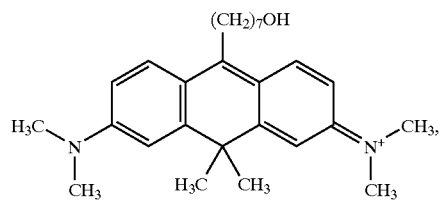 (G60)
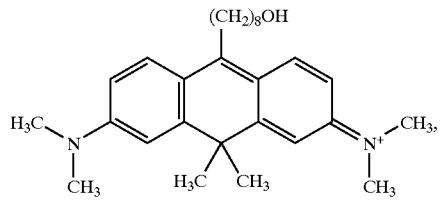 (G61)
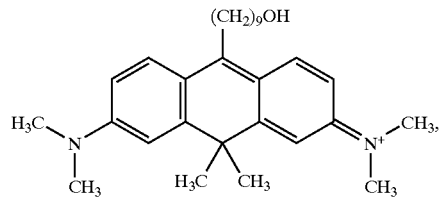 (G62)

-continued
(G63) 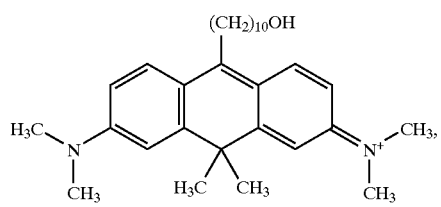
(G64) 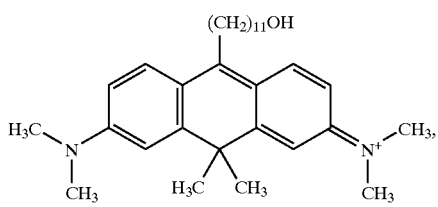
(G65) 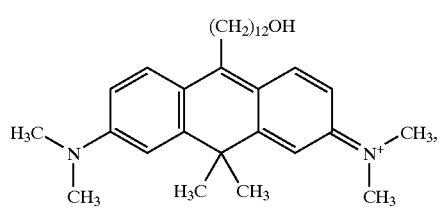
(G66) 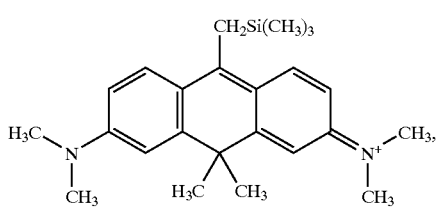
(G67) 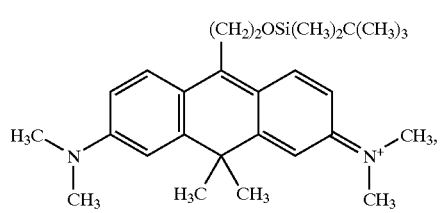
(G68) 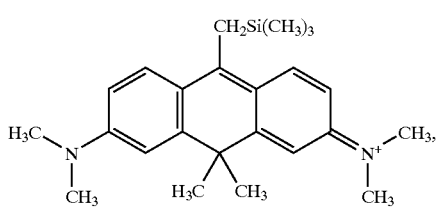
(G69) 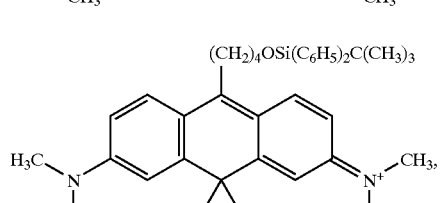
(G70) 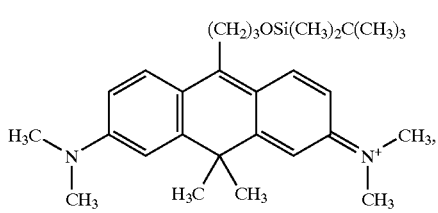
(G71) 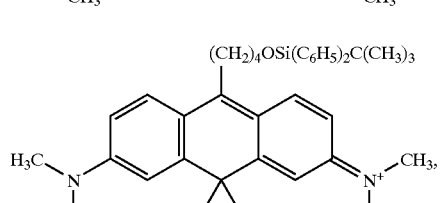
(G72) 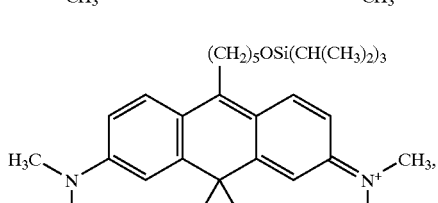
(G73) 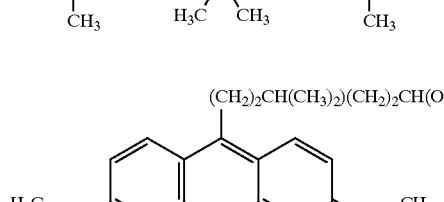
(G74) 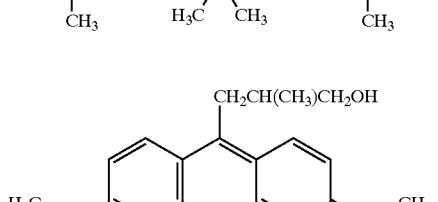
(G75) 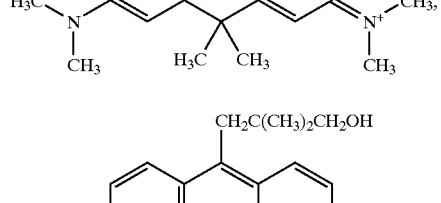
(G76) 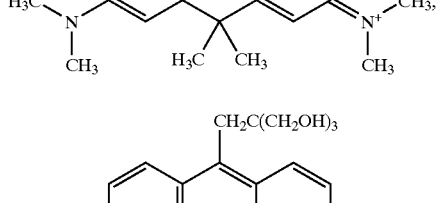

-continued
(G77)
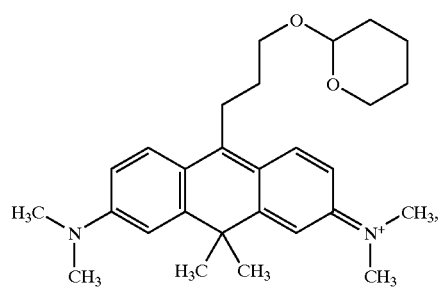
(G78)
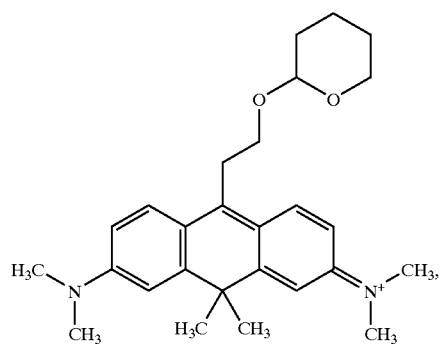
(G79)
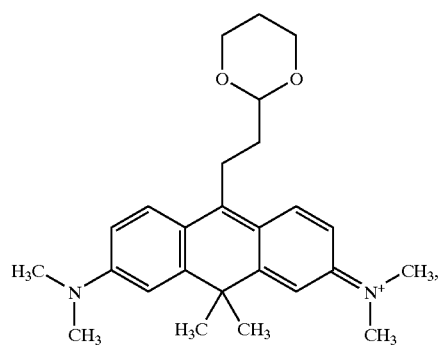
(G80)
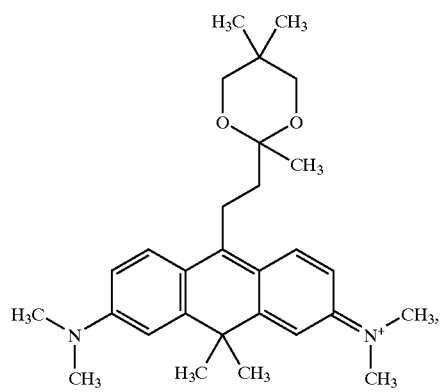
(G81)
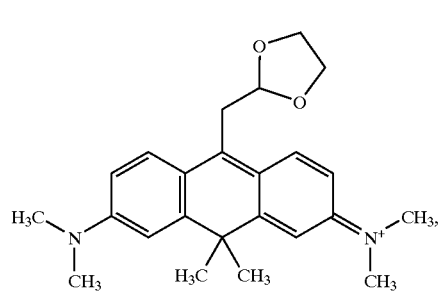
(G82)
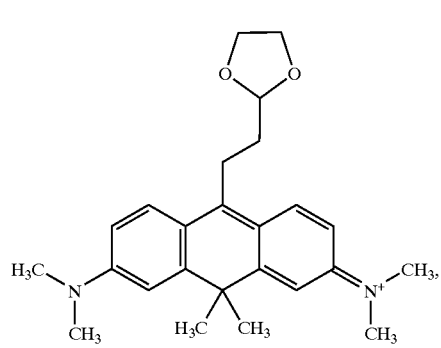
(G83)
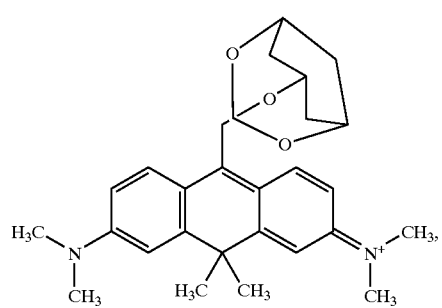

and tautomers thereof, r is a number from 1 to 6, s is a number from 1 to 4, and Q⁻ is an organometallic anion selected from the group consisting of
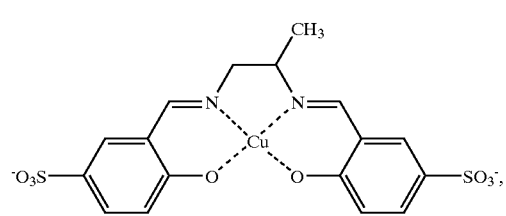
(Q1)
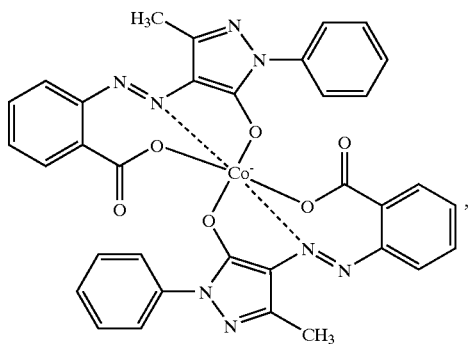
(Q2)
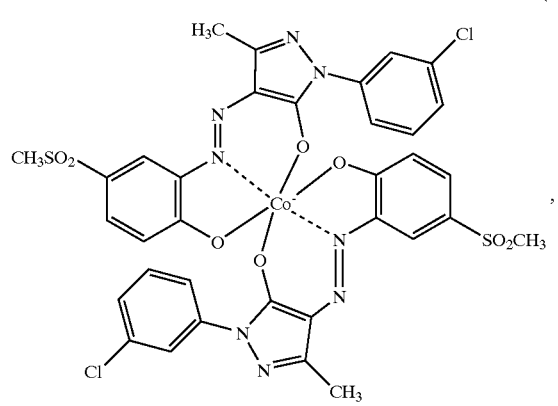
(Q3)
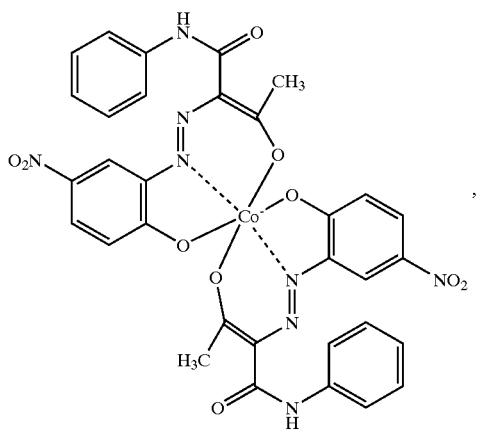
(Q4)
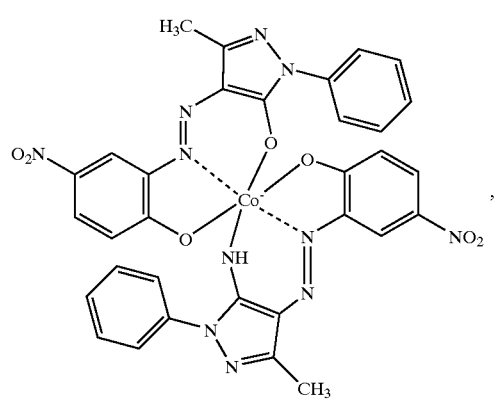
(Q5)
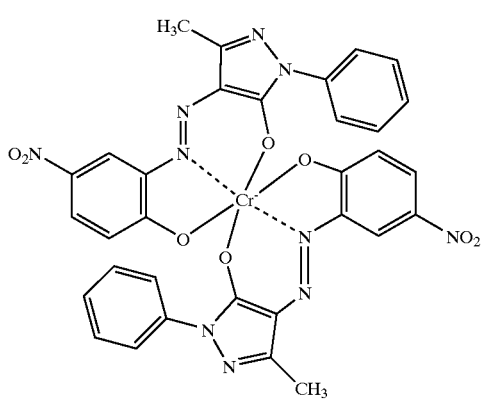
(Q6)

-continued
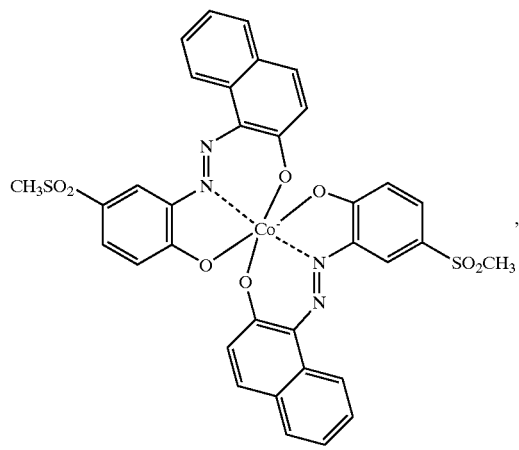
(Q7)
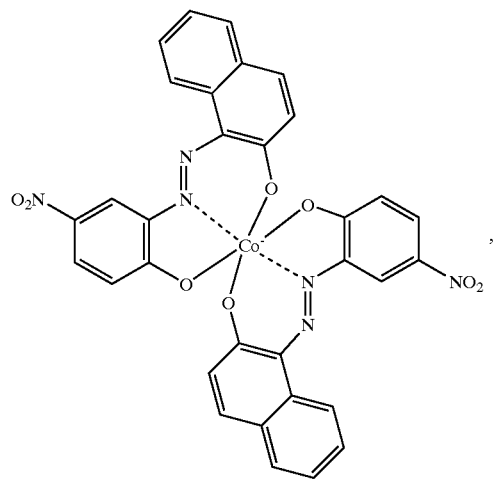
(Q8)
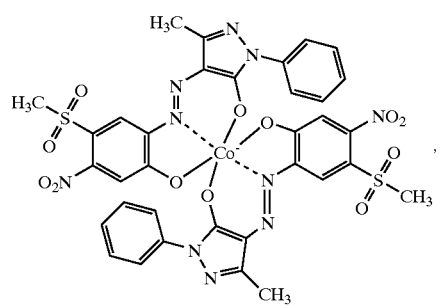
(Q9)
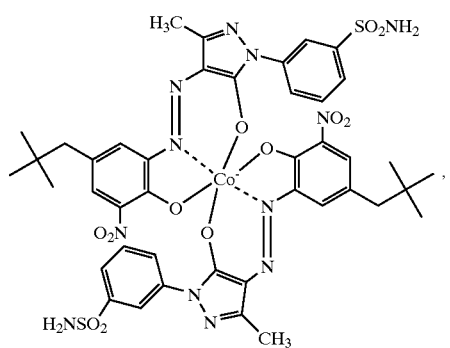
(Q10)
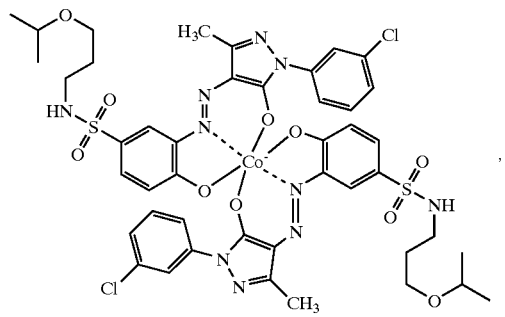
(Q11)
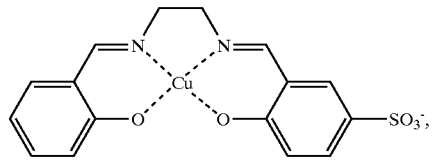
(Q12)
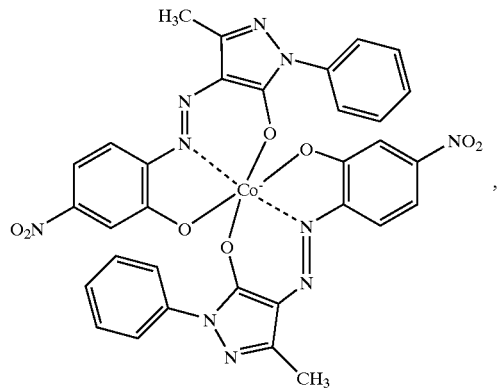
(Q13)
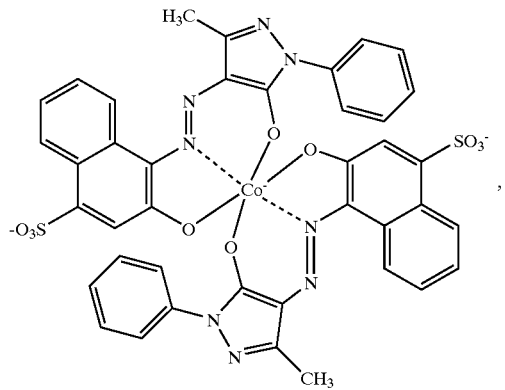
(Q14)

-continued
(Q15)
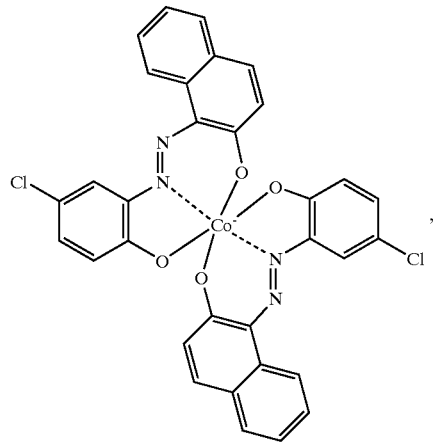
(Q16)
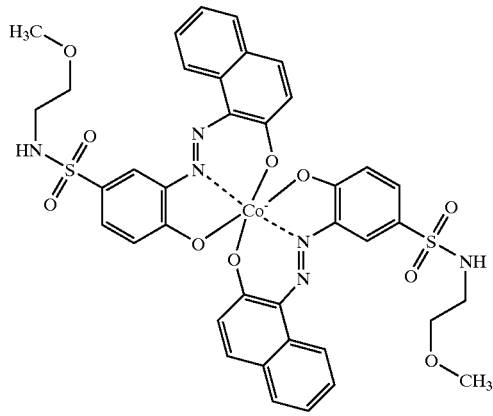
(Q17)
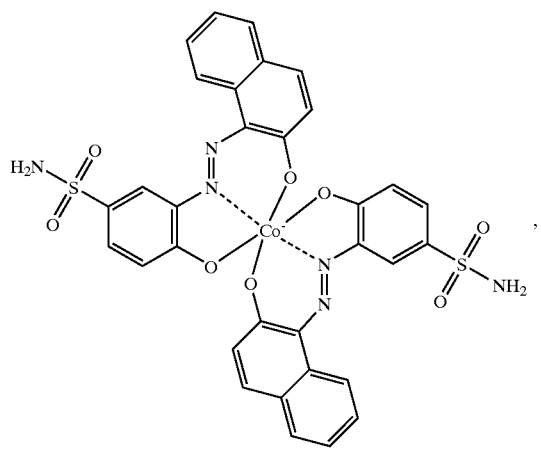
(Q18)
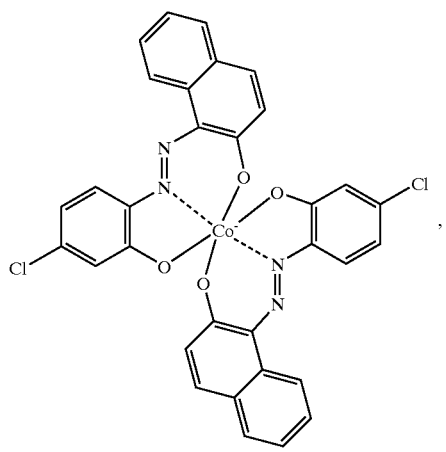
(Q19)
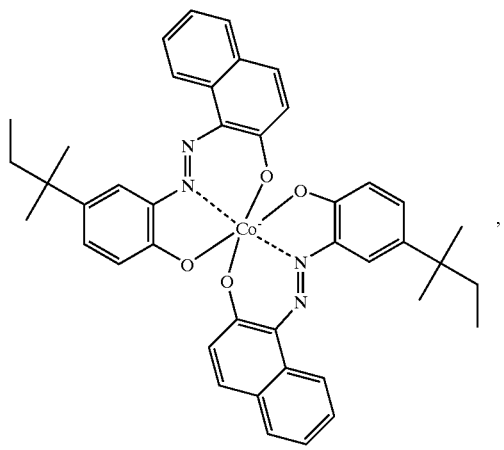
(Q20)
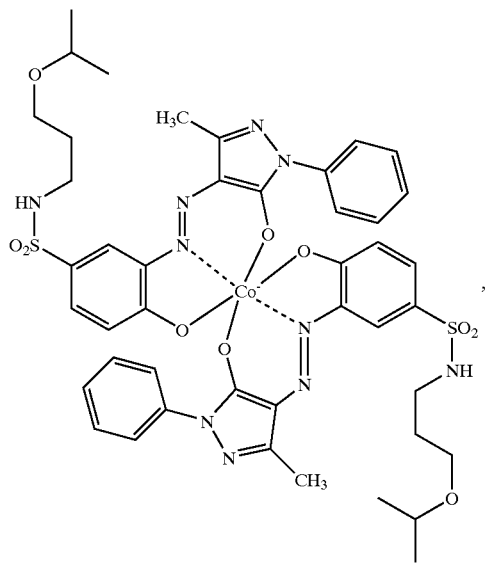

-continued
(Q21) 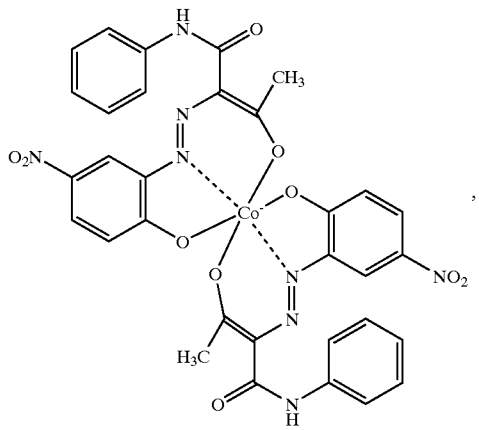
(Q22) 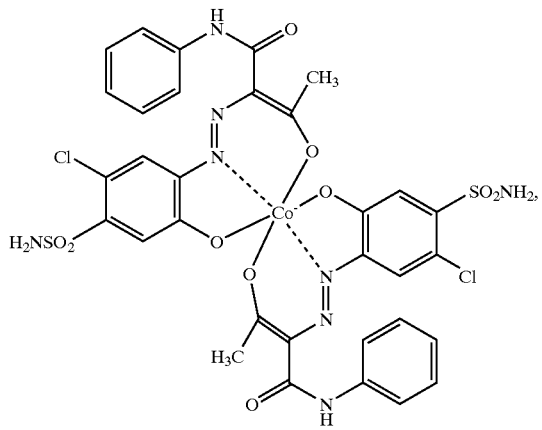
(Q23) 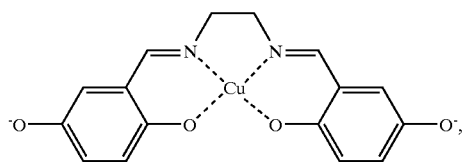
(Q24) 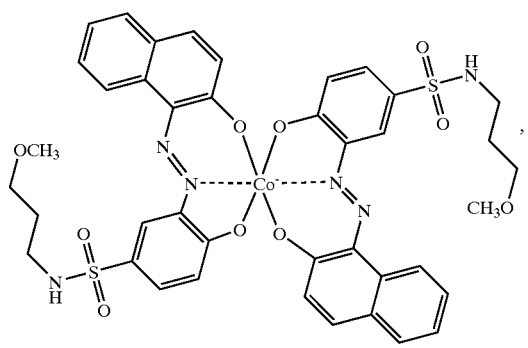
(Q25) 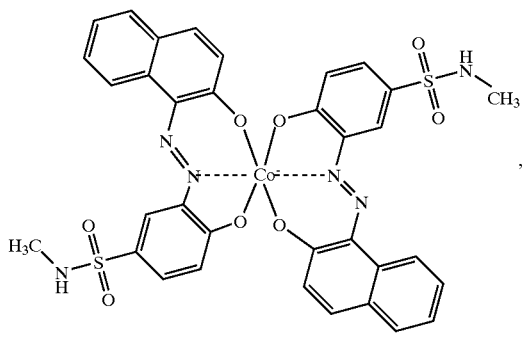
(Q26) 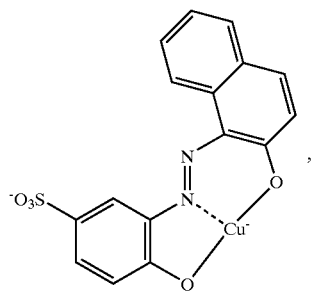
(Q27) 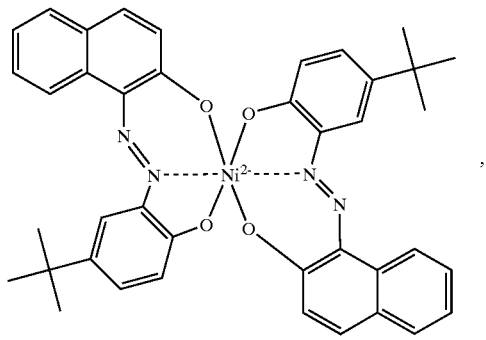
(Q28) 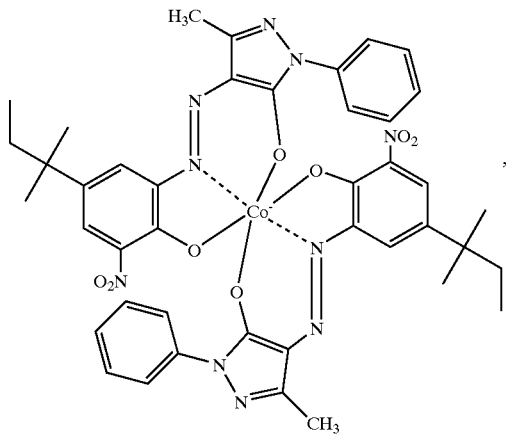

-continued
(Q29)
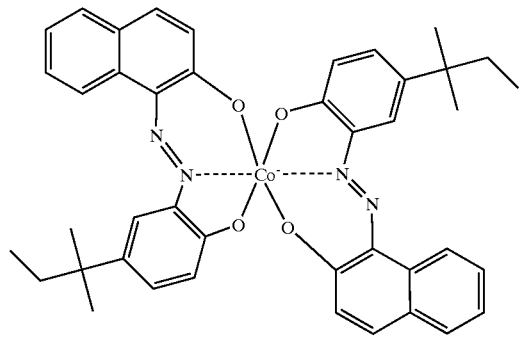
(Q30)
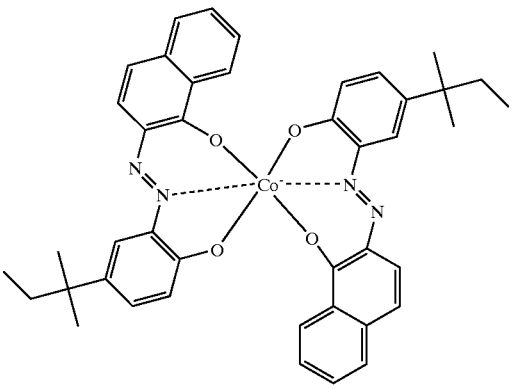
(Q31)
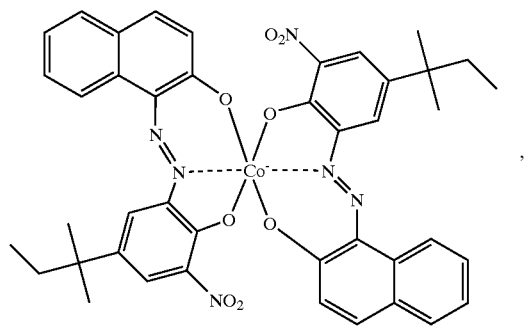
(Q32)
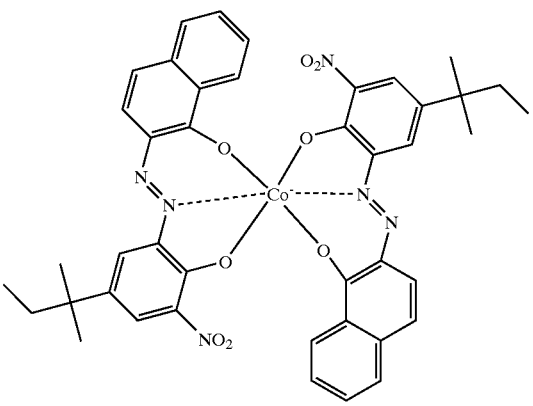
(Q33)
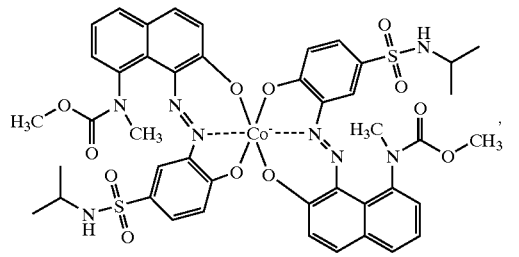
(Q34)
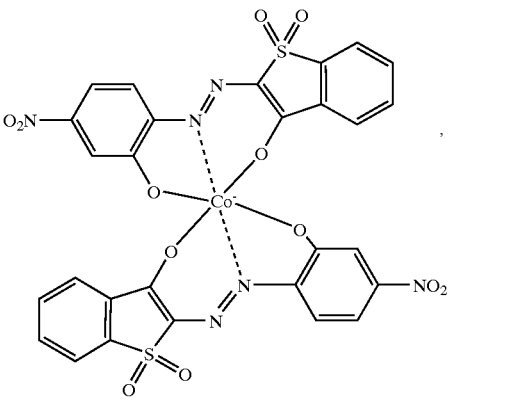
(Q35)
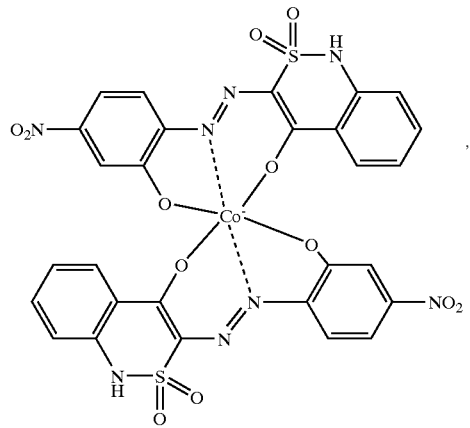
(Q36)
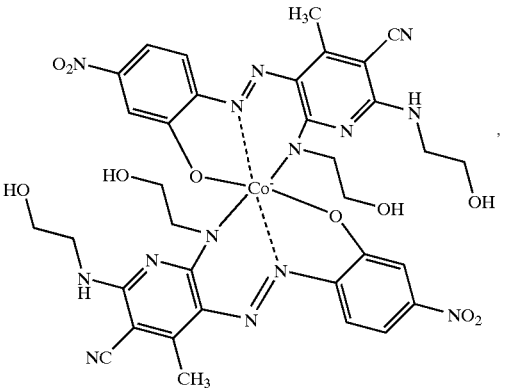

-continued
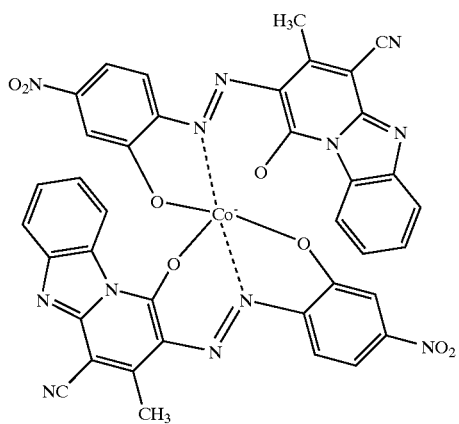
(Q37)
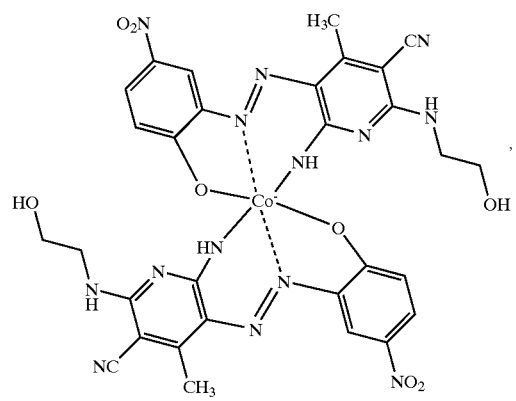
(Q38)
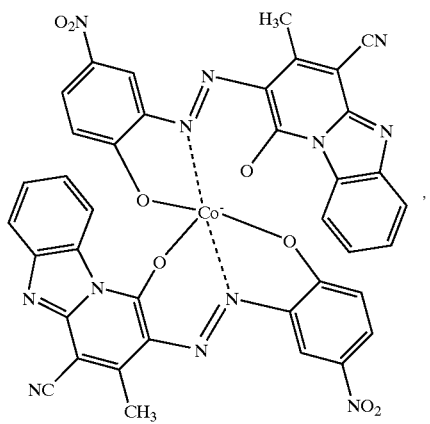
(Q39)
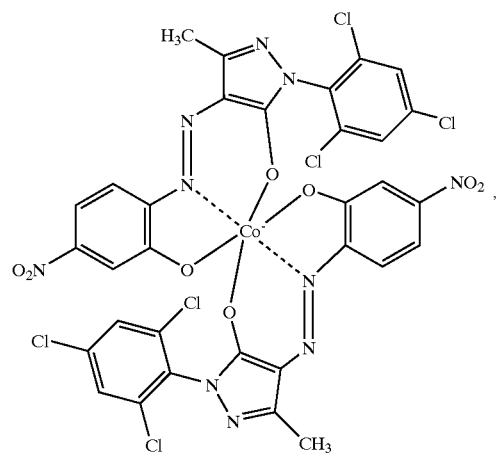
(Q40)
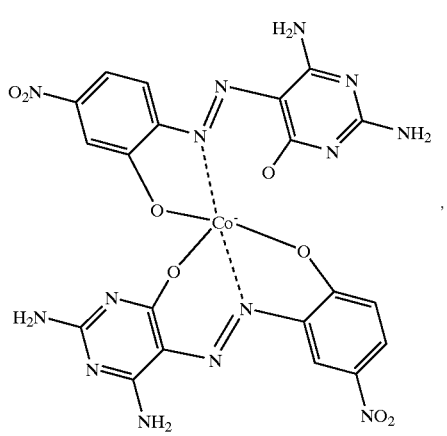
(Q41)
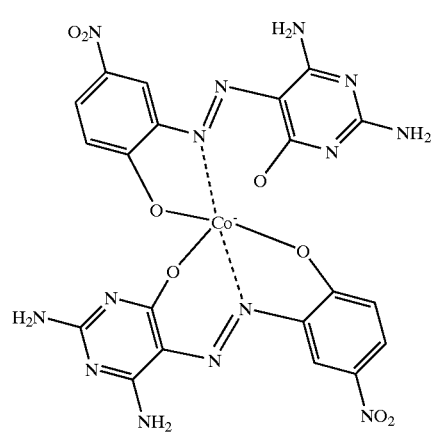
(Q42)

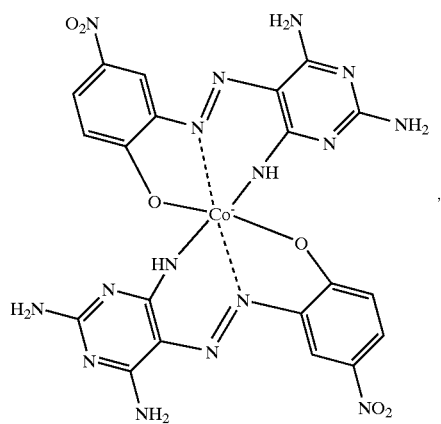 (Q43)
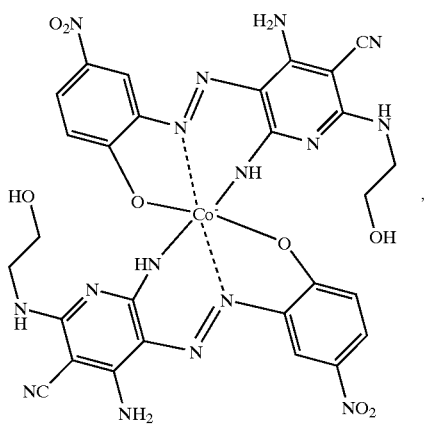 (Q44)
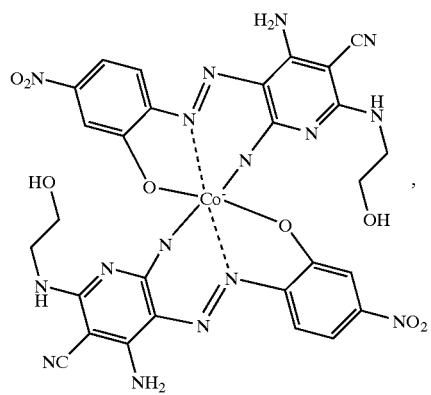 (Q45)
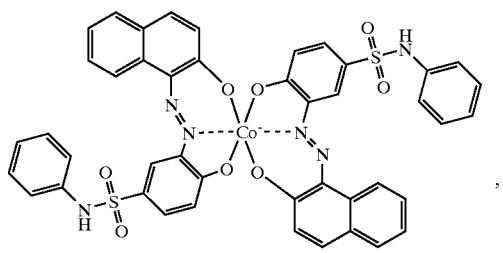 (Q46)
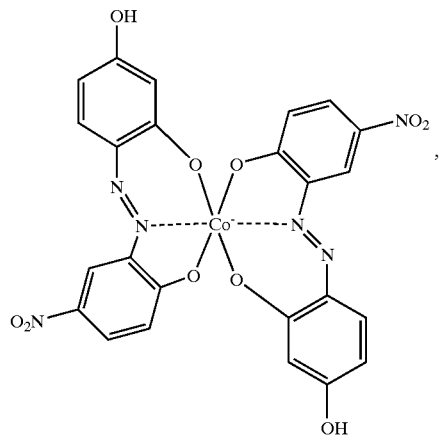 (Q47)
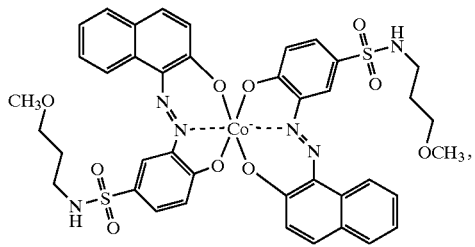 (Q48)
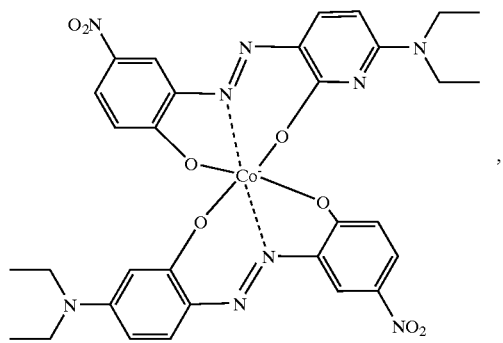 (Q49)
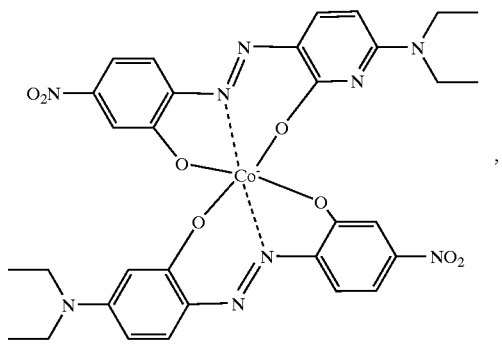 (Q50)

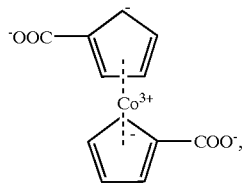

(Q51)

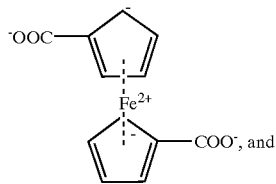

(Q52)

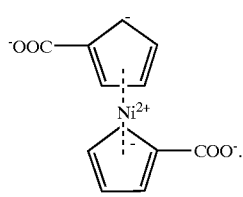

(Q53)

In formula (VI), preferably r is 0 and s is 1 or 2, or especially r is 1 and s is 0, for example compounds wherein G⁺ is

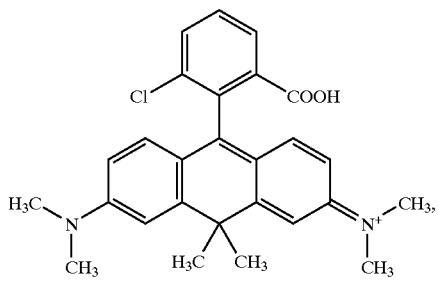

(G84)

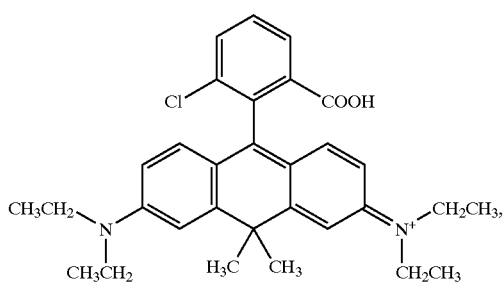

(G85)

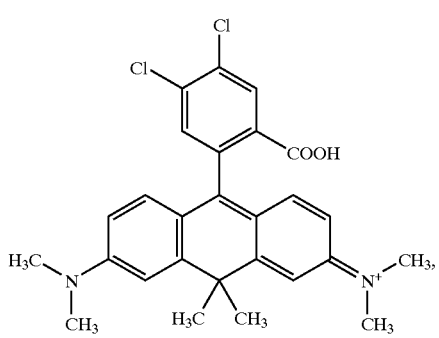

(G86)

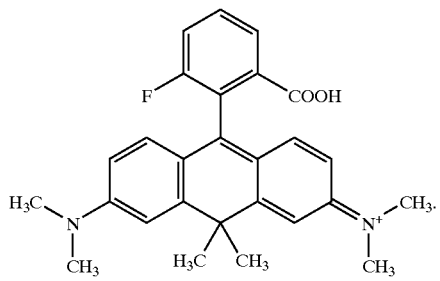

(G87)

The compounds of formulae (I) and (II) are in some cases known compounds which can be found, for example, in the prior art mentioned above. Some of them are new, but they can be prepared analogously to the known compounds by methods known per se, for example by methods disclosed in J. Chem. Soc. III 1963/2655–2662, J. Chem. Soc. (B) 1967/91–92, J. Chem. Soc. (B) 1969/1068–1071, J. Chem. Soc. (B) 1971/319–324, J. Chem. Soc. (B) 1971/1468–1471 or Heterocycles 21/1, 167–190 [1984]. The compounds used according to the invention can also be prepared from their leuco forms, some of which are known for photographic and electrophotographic applications, according to methods known to the person skilled in the art. Metal complexes, preferably those of formula (III), are well known from the specialist literature. In particular, they may be those metal complexes described in GB 1 599 812 or EP 450 421, and reference is made expressly to the teaching contained therein.

Compounds of formula (I) or their precursors are preferably prepared by oxidation of a compound of formula

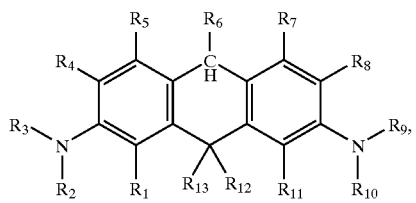

(X)

it having been found, most surprisingly, that liquid acids, for example acetic acid, are especially advantageous solvents and (meta)periodate is an especially advantageous oxidising agent, especially in combination. The reaction proceeds more selectively and the compounds in question are obtained in better yield and better purity, which results in better application-related properties in optical storage media. Ammonium (meta)periodates, especially tetrabutylammonium (meta)periodate, and acetic acid, especially glacial acetic acid, are particularly advantageous.

The invention accordingly relates also to a process for the preparation of a compound of formula (I), wherein a compound of structure

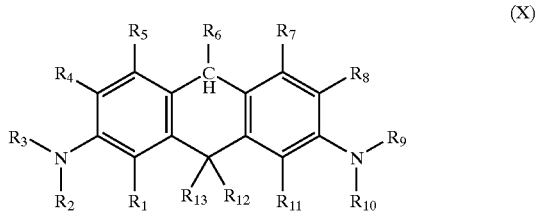

(X)

is oxidised in the presence of a $C_1$–$C_{18}$carboxylic acid. The amount of $C_1$–$C_{18}$carboxylic acid is advantageously from 0.1 to 10 000 parts by weight, based on (X).

The carbopyronine dyes used according to the invention have in ethanolic solution a narrow absorption band having its maximum at from 540 to 640 nm. Very surprisingly, they also have a comparatively weak tendency towards agglomeration in the solid state, so that the absorption curve remains advantageously narrow also in the solid state. This is true especially in the presence of metal-containing anions $(X^{m-})_p$, for example the metal complex anions indicated above.

The carbopyronine dyes used according to the invention also have, in the form of a solid film, as used in optical storage media, at the longer wavelength flank of the absorption band a high refractive index which preferably achieves a peak value of from 2.0 to 3.0 in the range of from 600 to 700 nm, so that a medium having high reflectivity as well as high sensitivity and good playback characteristics in the desired spectral range is achieved.

The substrate, which functions as support for the layers applied thereto, is advantageously semi-transparent ($T \geq 10\%$) or preferably transparent ($T \geq 90\%$). The support can have a thickness of from 0.01 to 10 mm, preferably from 0.1 to 5 mm.

The recording layer is preferably arranged between the transparent substrate and the reflecting layer. The thickness of the recording layer is from 10 to 1000 nm, preferably from 30 to 300 nm, especially about 80 nm, for example from 60 to 120 nm. The absorption of the recording layer is typically from 0.1 to 1.0 at the absorption maximum. The layer thickness is very especially chosen in known manner depending upon the respective refractive indices in the non-written state and in the written state at the reading wavelength, so that in the non-written state constructive interference is obtained, but in the written state destructive interference is obtained, or vice versa.

The reflecting layer, the thickness of which can be from 10 to 150 nm, preferably has high reflectivity ($R \geq 45\%$, especially $R \geq 60\%$), coupled with low transparency ($T \leq 10\%$). In further embodiments, for example in the case of media having a plurality of recording layers, the reflector layer may likewise be semi-transparent, that is to say may have comparatively high transparency (for example $T \geq 50\%$) and low reflectivity (for example $R \leq 30\%$).

The uppermost layer, for example the reflective layer or the recording layer, depending upon the layer structure, is advantageously additionally provided with a protective layer having a thickness of from 0.1 to 1000 $\mu$m, preferably from 0.1 to 50 $\mu$m, especially from 0.5 to 15 $\mu$m. Such a protective layer can, if desired, serve also as adhesion promoter for a second substrate layer applied thereto, which is preferably from 0.1 to 5 mm thick and consists of the same material as the support substrate.

The reflectivity of the entire recording medium is preferably at least 15%, especially at least 40%.

The main features of the recording layer according to the invention are the very high initial reflectivity in the said wavelength range of the laser diodes, which can be modified with especially high sensitivity; the high refractive index; the narrow absorption band in the solid state; the good uniformity of the script width at different pulse durations; the good light stability; and the good solubility in polar solvents.

The recording medium according to the invention is neither writable nor readable using the infra-red laser diodes of customary CD apparatus in accordance with the requirements of the Orange Book Standard, because at 780 nm the refractive indices (n) characteristically lie between 1.4 and 1.9 and their imaginary components (k) between 0 and a maximum of 0.04. As a result, the risk of damage in the event of an erroneous attempt at writing using an apparatus not capable of high resolution is largely averted, which is of advantage. The use of dyes of formula (I) results in advantageously homogeneous, amorphous and low-scatter recording layers having a high refractive index, and the absorption edge is surprisingly especially steep even in the solid phase. Further advantages are high light stability in daylight and under laser radiation of low power density with, at the same time, high sensitivity under laser radiation of high power density, uniform script width, high contrast, and also good thermal stability and storage stability.

At a relatively high recording speed, the results obtained are surprisingly better than with previously known recording media. The marks are more precisely defined relative to the surrounding medium, and thermally induced deformations do not occur. The error rate (BLER) and the statistical variations in mark length (jitter) are also low both at normal recording speed and at relatively high recording speed, so that an error-free recording and playback can be achieved over a large speed range. There are virtually no rejects even at high recording speed, and the reading of written media is not slowed down by the correction of errors. The advantages are obtained in the entire range of from 600 to 700 nm (preferably from 630 to 690 nm), but are especially marked at from 640 to 680 nm, more especially from 650 to 670 nm, particularly at 658±5 nm.

Suitable substrates are, for example, glass, minerals, ceramics and thermosetting or thermoplastic plastics. Preferred supports are glass and homo- or co-polymeric plastics. Suitable plastics are, for example, thermoplastic polycarbonates, polyamides, polyesters, polyacrylates and polymethacrylates, polyurethanes, polyolefins, polyvinyl chloride, polyvinylidene fluoride, polyimides, thermosetting polyesters and epoxy resins. The substrate can be in pure form or may also comprise customary additives, for example UV absorbers or dyes, as proposed e.g. in JP 04/167 239 as light-stabilisers for the recording layer. In the latter case it may be advantageous for the dye added to the support substrate to have an absorption maximum hypsochromically shifted relative to the dye of the recording layer by at least 10 nm, preferably by at least 20 nm.

The substrate is advantageously transparent over at least a portion of the range from 600 to 700 nm (preferably as indicated above), so that it is permeable to at least 90% of the incident light of the writing or readout wavelength. The substrate has preferably on the coating side a spiral guide groove having a groove depth of from 50 to 500 nm, a groove width of from 0.2 to 0.8 µm and a track spacing between two turns of from 0.4 to 1.6 µm, especially having a groove depth of from 100 to 200 nm, a groove width of 0.3 µm and a spacing between two turns of from 0.6 to 0.8 µm. The storage media according to the invention are therefore suitable especially advantageously for the optical recording of DVD media having the currently customary pit width of 0.4 µm and track spacing of 0.74 µm. The increased recording speed relative to known media allows synchronous recording or, for special effects, even accelerated recording of video sequences with excellent image quality.

The recording layer, instead of comprising a single compound of formula (I) or (II), may also comprise a mixture of such compounds having, for example, 2, 3, 4 or 5 carbopyronine dyes according to the invention. By the use of mixtures, for example mixtures of isomers or homologues as well as mixtures of different structures, the solubility can often be increased and/or the amorphous content improved. If desired, mixtures of ion pair compounds may have different anions, different cations or both different anions and different cations.

For a further increase in stability it is also possible, if desired, to add known stabilisers in customary amounts, for example a nickel dithiolate described in JP 04/025 493 as light stabiliser.

The recording layer comprises a compound of formula (I) or (II) or a mixture of such compounds advantageously in an amount sufficient to have a substantial influence on the refractive index, for example at least 30% by weight, preferably at least 60% by weight, especially at least 80% by weight. The recording layer can especially valuably comprise a compound of formula (I) or a mixture of a plurality of such compounds as main component, or may consist exclusively or substantially of one or more compounds of formula (I).

Further customary constituents are possible, for example other chromophores (for example those disclosed in WO-01/75873, or others having an absorption maximum at from 300 to 1000 nm), stabilisers, $^1O_2$—, triplet- or luminescence-quenchers, melting-point reducers, decomposition accelerators or any other additives that have already been described in optical recording media. Preferably, stabilisers or fluoresence-quenchers are added if desired.

When the recording layer comprises further chromophores, they may in principle be any dye that can be decomposed or modified by the laser radiation during the recording, or they may be inert towards the laser radiation. When the further chromophores are decomposed or modified by the laser radiation, this can take place directly by absorption of the laser radiation or can be induced indirectly by the decomposition of the compounds of formula (I) or (II) according to the invention, for example thermally.

Naturally, further chromophores or coloured stabilisers may influence the optical properties of the recording layer. It is therefore preferable to use further chromophores or coloured stabilisers, the optical properties of which conform as far as possible to those of the compounds formula (I) or (II) or are as different as possible, or the amount of further chromophores is kept small.

When further chromophores having optical properties that conform as far as possible to those of compounds formula (I) or (II) are used, preferably this should be the case in the range of the longest-wavelength absorption flank. Preferably the wavelengths of the inversion points of the further chromophores and of the compounds of formula (I) or (II) are a maximum of 20 nm, especially a maximum of 10 nm, apart. In that case the further chromophores and the compounds of formula (I) or (II) should exhibit similar behaviour in respect of the laser radiation, so that it is possible to use as further chromophores known recording agents the action of which is synergistically enhanced or heightened by the compounds of formula (I) or (II).

When further chromophores or coloured stabilisers having optical properties that are as different as possible from those of compounds of formula (I) or (II) are used, they advantageously have an absorption maximum that is hypsochromically or bathochromically shifted relative to the dye of formula (I) or (II). In that case the absorption maxima are preferably at least 50 nm, especially at least 100 nm, apart. Examples thereof are UV absorbers that are hypsochromic to the dye of formula (I) or (II), or coloured stabilisers that are bathochromic to the dye of formula (I) or (II) and have absorption maxima lying, for example, in the NIR or IR range. Other dyes can also be added for the purpose of colour-coded identification, colour-masking ("diamond dyes") or enhancing the aesthetic appearance of the recording layer. In all those cases, the further chromophores or coloured stabilisers should preferably exhibit behaviour towards light and laser radiation that is as inert as possible.

When another dye is added in order to modify the optical properties of the compounds of formula (I) or (II), the amount thereof is dependent upon the optical properties to be achieved. The person skilled in the art will find little difficulty in varying the ratio of additional dye to compound of formula (I) or (II) until he obtains his desired result.

When chromophores or coloured stabilisers are used for other purposes, the amount thereof should preferably be small so that their contribution to the total absorption of the recording layer in the range of from 600 to 700 nm is a a maximum of 20%, preferably a maximum of 10%. In such a case, the amount of additional dye or stabiliser is advantageously a maximum of 50% by weight, preferably a maximum of 10% by weight, based on the recording layer.

Most preferably, however, no additional chromophore is added, unless it is a coloured stabiliser.

Further chromophores that can be used in the recording layer in addition to the compounds of formula (I) or (II) are, for example, cyanines and cyanine metal complexes (U.S. Pat. No. 5,958,650), styryl compounds (U.S. Pat. No. 6,103,331), oxonol dyes (EP-A-833 314), azo dyes and azo metal complexes (JP-A-11/028865), phthalocyanines (EP-A-232 427, EP-A-337 209, EP-A-373 643, EP-A-463 550, EP-A-492 508, EP-A-509 423, EP-A-511 590, EP-A-513 370, EP-A-514 799, EP-A-518 213, EP-A-519 419, EP-A-519 423, EP-A-575 816, EP-A-600 427, EP-A-676 751, EP-A-712 904, WO-98/14520, WO-00/09522, PCT/EP-02/03945), porphyrins and azaporphyrins (EP-A-822 546, U.S. Pat. No. 5,998,093), dipyrromethene dyes and metal chelate compounds thereof (EP-A-822 544, EP-A-903 733), xanthene dyes and metal complex salts thereof (U.S. Pat. No. 5,851,621) or quadratic acid compounds (EP-A-568 877), or oxazines, dioxazines, diazastyryls, formazans, anthraquinones or phenothiazines; this list is on no account exhaustive and the person skilled in the art will interpret the list as including further known dyes.

Stabilisers, $^1O_2$—, triplet- or luminescence-quenchers are, for example, metal complexes of N- or S-containing enolates, phenolates, bisphenolates, thiolates or bisthiolates or of azo, azomethine or formazan dyes, such as bis(4-dimethyl-aminodithiobenzil)nickel [CAS No 38465-55-3], ®Irgalan Bordeaux EL, ®Cibafast N or similar compounds, hindered phenols and derivatives thereof (optionally also as counter-ions X), such as ®Cibafast AO, o-hydroxyphenyl-triazoles or -triazines or other UV absorbers, such as ®Cibafast W or ®Cibafast P or hindered amines (TEMPO or HALS, also as nitroxides or NOR-HALS, optionally also as counter-ions X), and also as cations diimmonium, Paraquat™ or Orthoquat™ salts, such as ®Kayasorb IRG 022, ®Kayasorb IRG 040, optionally also as radical ions, such as N,N,N',N'-tetrakis(4-dibutylaminophenyl)-p-phenylene-amine-ammonium hexafluorophosphate, hexafluoroantimonate or perchlorate. The latter are available from Organica (Wolfen/DE); ®Kayasorb brands are available from Nippon Kayaku Co. Ltd., and ®Irgalan and ®Cibafast brands are available from Ciba Spezialit ätenchemie AG.

Many such structures are known, some of them also in connection with optical recording media, for example from U.S. Pat. No. 5,219,707, JP-A-06/199045, JP-A-07/76169, JP-A-07/262604 or JP-A-2000/272241. They may be, for example, salts of the metal complex anions disclosed above with any desired cations, for example the cations disclosed above.

Also suitable are neutral metal complexes, for example those metal complexes disclosed in EP 0 822 544, EP 0 844 243, EP 0 903 733, EP 0 996 123, EP 1 056 078, EP 1 130 584 or U.S. Pat. No. 6,162,520, for example

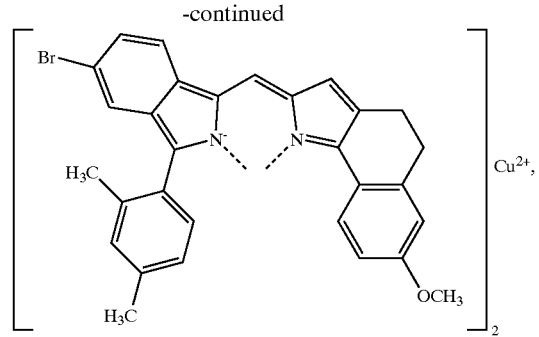

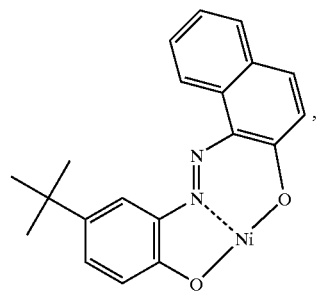

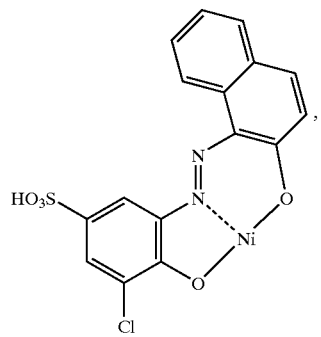

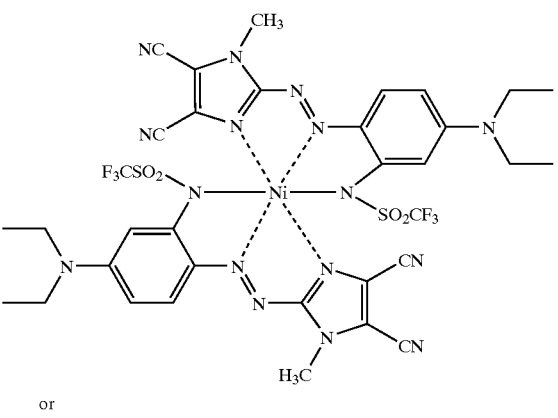

or

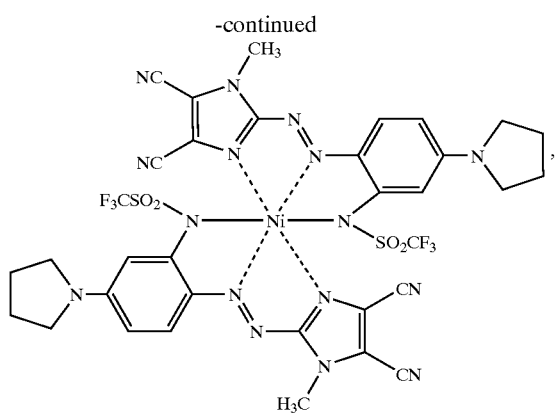

and also those of the formula $(L_3)M_2(L_5)$ (VII), $(L_6)M_2(L_7)$ (VIII) or $M_2(L_8)$ (IX), wherein $L_5$ is $C_1–C_{12}$alkyl-OH, $C_6–C_{12}$aryl-OH, $C_7–C_{12}$aralkyl-OH, $C_1–C_{12}$alkyl-SH, $C_6–C_{12}$aryl-SH, $C_7–C_{12}$aralkyl-SH, $C_1–C_{12}$alkyl-NH$_2$, $C_6–C_{12}$aryl-NH$_2$, $C_7–C_{12}$aralkyl-NH$_2$, di-$C_1–C_{12}$alkyl-NH, di-$C_6–C_{12}$aryl-NH, di-$C_7–C_{12}$aralkyl-NH, tri-$C_1–C_{12}$alkyl-N, tri-$C_6–C_{12}$aryl-N or tri-$C_7–C_{12}$aralkyl-N,

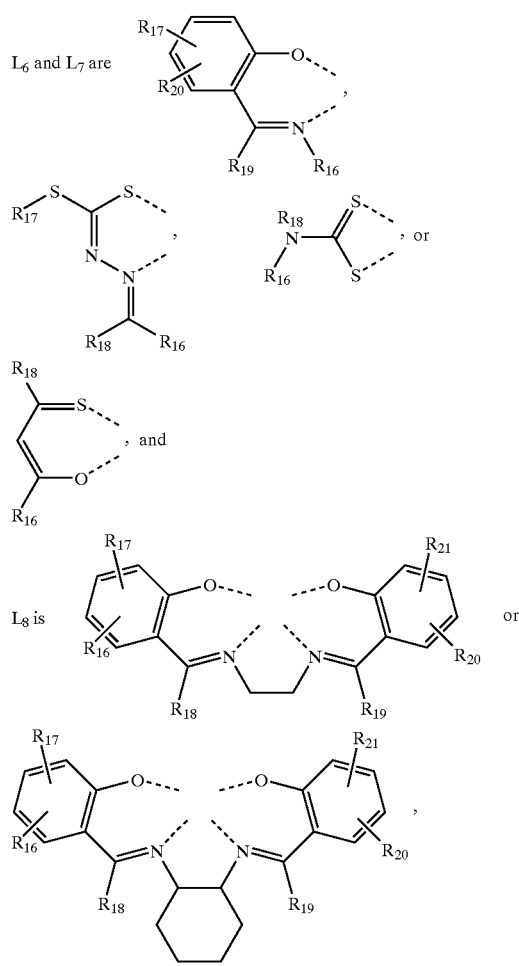

$M_2$ and $R_{16}$ to $R_{21}$ being as defined above.

A particular example of an additive of formula (IX) that may be mentioned is a copper complex, illustrated e.g. by a compound of formula

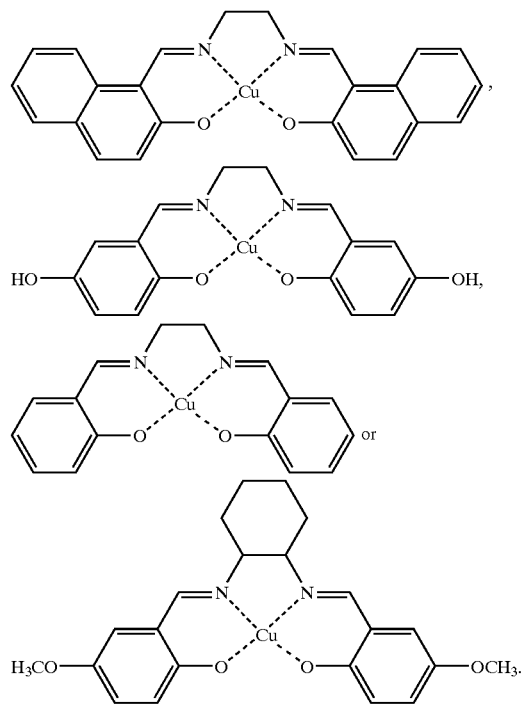

A particular example of an additive of formula (VII) that may be mentioned is a nickel bisphenolate, illustrated e.g. by the compound of formula The person skilled in the art will know from other optical information media, or will easily identify, which additives in which concentration are best suited to which purpose. Suitable concentrations of additives are, for example, from 0.001 to 1000% by weight, preferably from 1 to 50% by weight, based on the recording medium of formula (I) or (II).

The recording medium according to the invention, in addition to comprising compounds of formula (I) or (II), may additionally comprise salts, for example ammonium chloride, pentadecylammonium chloride, sodium chloride, sodium sulfate, sodium methyl sulfonate or sodium methyl sulfate, the ions of which may originate e.g. from the components used. The additional salts, if present, may be present preferably in amounts of up to 20% by weight, based on the total weight of the recording layer.

Reflecting materials suitable for the reflective layer include especially metals, which provide good reflection of the laser radiation used for recording and playback, for example the metals of Main Groups III, IV and V and of the Sub-Groups of the Periodic Table of the Elements. Al, In, Sn, Pb, Sb, Bi, Cu, Ag, Au, Zn, Cd, Hg, Sc, Y, La, Ti, Zr, Hf, V, Nb, Ta, Cr, Mo, W, Fe, Co, Ni, Ru, Rh, Pd, Os, Ir, Pt, Ce, Pr, Nd, Pm, Sm, Eu, Gd, Tb, Dy, Ho, Er, Tm, Yb and Lu and alloys thereof are especially suitable. Special preference is given to a reflective layer of aluminium, silver, copper, gold or an alloy thereof, on account of their high reflectivity and ease of production.

Materials suitable for the protective layer include chiefly plastics, which are applied in a thin layer to the support or the uppermost layer either directly or with the aid of adhesive layers. It is advantageous to select mechanically and thermally stable plastics having good surface properties, which may be modified further, for example written. The plastics may be thermosetting plastics and thermoplastic plastics. Preference is given to radiation-cured (e.g using UV radiation) protective layers, which are particularly simple and economical to produce. A wide variety of radiation-curable materials are known. Examples of radiation-curable monomers and oligomers are acrylates and methacrylates of diols, triols and tetrols, polyimides of aromatic tetracarboxylic acids and aromatic diamines having $C_1$–$C_4$alkyl groups in at least two ortho-positions of the amino groups, and oligomers with dialkylmaleinimidyl groups, e.g. dimethylmaleinimidyl groups.

The recording media according to the invention may also have additional layers, for example interference layers. It is also possible to construct recording media having a plurality of (for example two) recording layers. The structure and the use of such materials are known to the person skilled in the art. Preferred, if present, are interference layers that are arranged between the recording layer and the reflecting layer and/or between the recording layer and the substrate and consist of a dielectric material, for example as described in EP 353 393 of $TiO_2$, $Si_3N_4$, ZnS or silicone resins.

The recording media according to the invention can be produced by processes known per se, various methods of coating being employable depending upon the materials used and their function.

Suitable coating methods are, for example, immersion, pouring, brush-coating, blade-application and spin-coating, as well as vapour-deposition methods carried out under a high vacuum. When pouring methods are used, for example, solutions in organic solvents are generally used. When solvents are employed, care should be taken that the supports used are insensitive to those solvents. Suitable coating methods and solvents are described, for example, in EP-A-401 791.

The recording layer is preferably applied by spin-coating with a dye solution, solvents that have proved satisfactory being especially alcohols, e.g. 2-methoxyethanol, n-propanol, isopropanol, isobutanol, n-butanol, amyl alcohol or 3-methyl-1-butanol or preferably fluorinated alcohols, e.g. 2,2,2-trifluoro-ethanol or 2,2,3,3-tetrafluoro-1-propanol, and mixtures thereof. It will be understood that other solvents or solvent mixtures can also be used, for example those solvent mixtures described in EP-A-511 598 and EP-A-833 316. Ethers (dibutyl ether), ketones (2,6-dimethyl-4-heptanone, 5-methyl-2-hexanone) or saturated or unsaturated hydrocarbons (toluene, xylene) can also be used, for example in the form of mixtures (e.g. dibutyl ether/2,6-dimethyl-4-heptanone) or mixed components.

The person skilled in the art of spin-coating will in general routinely try out all the solvents with which is he is familiar, as well as binary and ternary mixtures thereof, in order to discover the solvents or solvent mixtures which result in a high-quality and, at the same time, cost-effective recording layer containing the solid components of his choice. Known methods of process engineering can also be employed in such optimisation procedures, so that the number of experiments to be carried out can be kept to a minimum.

The invention therefore relates also to a method of producing an optical recording medium, wherein a solution of a compound of formula (I) in an organic solvent is applied to a substrate having pits. The application is preferably carried out by spin-coating.

The application of the metallic reflective layer is preferably effected by sputtering, vapour-deposition in vacuo or by chemical vapour deposition (CVD). The sputtering technique is especially preferred for the application of the metallic reflective layer on account of the high degree of adhesion to the support. Such techniques are known and are described in specialist literature (e.g. J. L. Vossen and W. Kern, "Thin Film Processes", Academic Press, 1978).

The structure of the recording medium according to the invention is governed primarily by the readout method; known function principles include the measurement of the change in the transmission or, preferably, in the reflection, but it is also known to measure, for example, the fluorescence instead of the transmission or reflection.

When the recording material is structured for a change in reflection, the following structures, for example, can be used: transparent support/recording layer (optionally multilayered)/reflective layer and, if expedient, protective layer (not necessarily transparent); or support (not necessarily transparent)/reflective layer/recording layer and, if expedient, transparent protective layer. In the first case, the light is incident from the support side, whereas in the latter case the radiation is incident from the recording layer side or, where applicable, from the protective layer side. In both cases the light detector is located on the same side as the light source. The first-mentioned structure of the recording material to be used according to the invention is generally preferred.

When the recording material is structured for a change in light transmission, the following different structure, for example, comes into consideration: transparent support/recording layer (optionally multilayered) and, if expedient, transparent protective layer. The light for recording and for readout can be incident either from the support side or from the recording layer side or, where applicable, from the protective layer side, the light detector in this case always being located on the opposite side.

Suitable lasers are those having a wavelength of 600–700 nm, for example commercially available lasers having a wavelength of 602, 612, 633, 635, 647, 650, 670 or 680 nm, especially semi-conductor lasers, such as GaAsAl, InGaAlP or GaAs laser diodes having a wavelength especially of about 635, 650 or 658 nm. The recording is effected, for example, point for point in a manner known per se, by modulating the laser in accordance with the mark lengths and focussing its radiation onto the recording layer. It is known from the specialist literature that other methods are currently being developed which may also be suitable for use.

The process according to the invention allows the storage of information with great reliability and stability, distinguished by very good mechanical and thermal stability and by high light stability and by sharp boundary zones of the pits. Special advantages include the high contrast, the low jitter and the surprisingly high signal/noise ratio, so that excellent readout is achieved. The high storage capacity is especially valuable in the field of video.

The readout of information is carried out according to methods known per se by registering the change in absorption or reflection using laser radiation, for example as described in "CD-Player und R-DAT Recorder" (Claus Biaesch-Wiepke, Vogel Buchverlag, Würzburg 1992).

The information-containing medium according to the invention is especially an optical information material of the WORM type. It may be used, for example, as a playable DVD (digital versatile disk), as storage material for a computer or as an identification and security card or for the production of diffractive optical elements, for example holograms.

The invention accordingly relates also to a method for the optical recording, storage and playback of information; wherein a recording medium according to the invention is used. The recording and the playback advantageously take place in a wavelength range of from 600 to 700 nm.

The following Examples illustrate the invention in greater detail:

EXAMPLE 1

98.22 g of N-[7-(dimethylamino)-9,9-dimethyl-2(9H)-anthracenyl-idene]-N-methyl-perchlorate are dissolved in 25 liters of ethanol. Separately, 256.25 g of the sodium salt of the metal complex of formula Q20 (in each case based on dry weight) are then dissolved in 40 liters of ethanol, with heating to 65° C. After cooling to 23° C., the two solutions are combined (for example by pumping the second solution into the first), stirred for 30 minutes to complete the reaction and clarified by filtration. The solution is concentrated by evaporation under a low vacuum using a rotary evaporator with a water bath at a temperature of about 65° C., yielding 353.63 g of crude product. 15 liters of water are added to the crude product and the mixture is treated mechanically and/or by ultrasound for 30 minutes at 10–20° C. in order to dissolve the inorganic salts. After filtration and washing with 10 liters of water, the filtration residue is dried at 80° C./$1.6 \cdot 10^3$ Pa, yielding 322.30 g of the product of formula

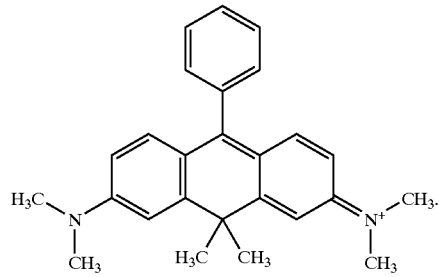
(G11)

EXAMPLE 3

The procedure is as in Example 1, but instead of N-[7-(dimethylamino)-9,9-dimethyl-2(9H)-anthracenylidene]-N-methyl-perchlorate there is used an equimolar amount of the product of formula

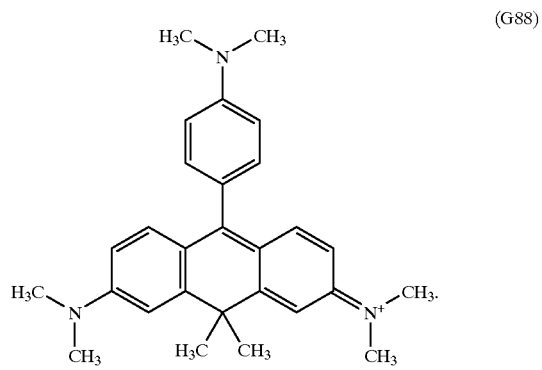
(G88)

EXAMPLE 4

The procedure is as in Example 1, but instead of N-[7-(dimethylamino)-9,9-dimethyl-2(9H)-anthracenylidene]-N-

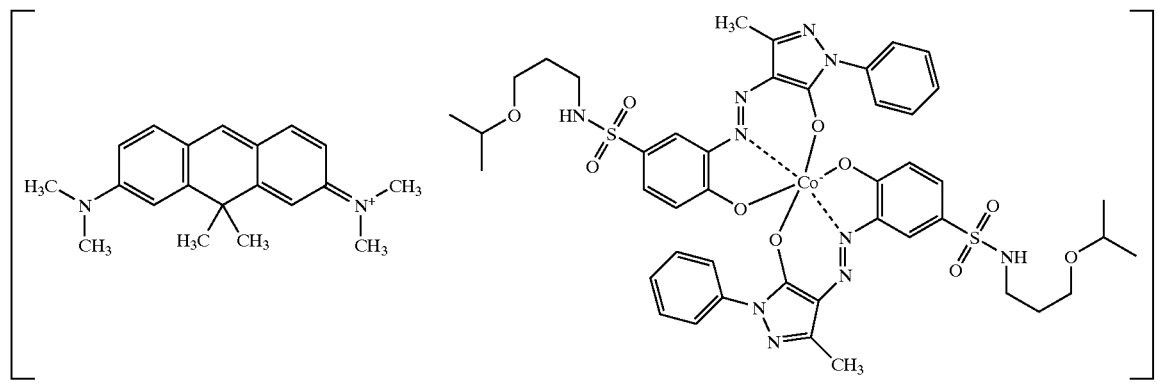

EXAMPLE 2

The procedure is as in Example 1, but instead of N-[7-(dimethylamino)-9,9-dimethyl-2(9H)-anthracenylidene]-N-methyl-perchlorate there is used an equimolar amount of the product of formula methyl-perchlorate there is used an equimolar amount of the product of formula

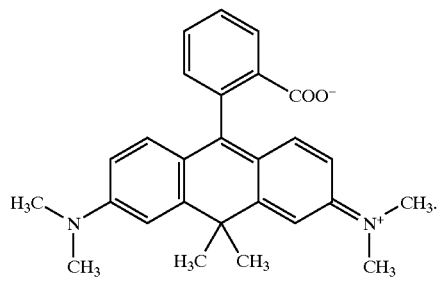

(G89)

EXAMPLE 5

The procedure is as in Example 1, but instead of N-[7-(dimethylamino)-9,9-dimethyl-2(9H)-anthracenylidene]-N-methyl-perchlorate there is used an equimolar amount of the product of formula

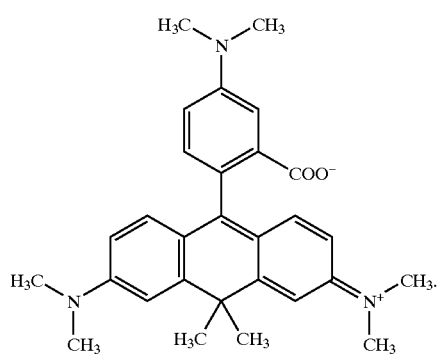

(G90)

EXAMPLE 6

The procedure is as in Example 1, but instead of the metal complex of formula Q20 there is used an equimolar amount of the metal complex of formula Q3.

EXAMPLE 7

2% by weight of the product according to Example 1 are dissolved in 2,2,3,3-tetrafluoro-1-propanol and the solution is filtered through a Teflon filter of pore size 0.2 μm and applied by spin-coating at 1000 rev/min to the surface of a 0.6 mm thick, grooved polycarbonate disc (groove depth: 170 nm, groove width: 350 nm, track spacing: 0.74 μm) of 120 mm diameter. The excess solution is spun off by increasing the rotational speed. On evaporation of the solvent, the dye remains behind in the form of a uniform, amorphous solid layer. After drying in a circulating-air oven at 70° C. (10 min), the solid layer exhibits an absorption of 0.45 at 625 nm. In a vacuum coating apparatus (Twister™, Balzers Unaxis), a 60 nm thick silver layer is then applied to the recording layer by atomisation. Then a 6 μm thick protective layer of a UV-curable photopolymer (650-020, DSM) is applied thereto by means of spin-coating. The recording support exhibits a reflectivity of 47% at 658 nm. The optical constants (absorption maximum $\lambda_{max}$, refractive index at 658 nm $n_{658}$, absorption coefficient at 658 nm $k_{658}$) are determined reflectometrically (ETA-RT™, ETA-Optik Steag-Hamatech):

$\lambda_{max}$=624 nm; $n_{658}$=2.29; $k_{658}$=0.21.

Using a commercial test apparatus (DVDT-R 650™, Expert Magnetics), marks are written into the active layer at a speed of 3.5 m/sec using a laser diode of wavelength 658 nm and laser power of 9.2 mW. Then, using the same test apparatus, the dynamic parameters are determined, there being obtained good measured values:

DTC Jitter=8.8%; R14H=47%; |14/|14H=0.72.

EXAMPLE 8

The procedure is as in Example 7, but the product according to Example 6 is used instead of the product according to Example 1. The optical constants are determined reflectometrically as in Example 7:

$\lambda_{max}$=626 nm; $n_{658}$=2.55; $k_{658}$=0.33.

COMPARISON EXAMPLE 9

The procedure is as in Examples 7 and 8, but the product according to Example A8 of EP-A-0 805 441 is used instead of the products according to Examples 1 and 6. The optical constants are determined reflectometrically in the same way:

$\lambda_{max}$=581 nm; $n_{658}$=1.94; $k_{658}$=0.016.

This disc cannot be written using commercial recording apparatus (Pioneer A03 DVD-R(G)) on account of insufficient sensitivity.

EXAMPLES 10–2094

The procedure is as in Examples 7–9, but the following compounds of formula [G$^+$].[X$^-$], which can be prepared analogously to Examples 1–6, are used:

| Ex. | [G$^+$] | [X$^-$] |
|---|---|---|
| 10 | G1 | Q2 |
| 11 | G2 | Q2 |
| 12 | G3 | Q2 |
| 13 | G4 | Q2 |
| 14 | G5 | Q2 |
| 15 | G6 | Q2 |
| 16 | G7 | Q2 |
| 17 | G8 | Q2 |
| 18 | G9 | Q2 |
| 19 | G10 | Q2 |
| 20 | G11 | Q2 |
| 21 | G12 | Q2 |
| 22 | G13 | Q2 |
| 23 | G14 | Q2 |
| 24 | G15 | Q2 |
| 25 | G16 | Q2 |
| 26 | G17 | Q2 |
| 27 | G18 | Q2 |
| 28 | G19 | Q2 |
| 29 | G20 | Q2 |
| 30 | G21 | Q2 |
| 31 | G22 | Q2 |
| 32 | G23 | Q2 |
| 33 | G24 | Q2 |
| 34 | G25 | Q2 |
| 35 | G26 | Q2 |
| 36 | G27 | Q2 |
| 37 | G28 | Q2 |
| 38 | G29 | Q2 |
| 39 | G30 | Q2 |
| 40 | G31 | Q2 |
| 41 | G32 | Q2 |
| 42 | G33 | Q2 |
| 43 | G34 | Q2 |
| 44 | G35 | Q2 |
| 45 | G36 | Q2 |

-continued

| Ex. | [G⁺] | [X⁻] |
|---|---|---|
| 46 | G37 | Q2 |
| 47 | G38 | Q2 |
| 48 | G39 | Q2 |
| 49 | G40 | Q2 |
| 50 | G41 | Q2 |
| 51 | G42 | Q2 |
| 52 | G43 | Q2 |
| 53 | G44 | Q2 |
| 54 | G45 | Q2 |
| 55 | G46 | Q2 |
| 56 | G47 | Q2 |
| 57 | G48 | Q2 |
| 58 | G49 | Q2 |
| 59 | G50 | Q2 |
| 60 | G51 | Q2 |
| 61 | G52 | Q2 |
| 62 | G53 | Q2 |
| 63 | G54 | Q2 |
| 64 | G55 | Q2 |
| 65 | G56 | Q2 |
| 66 | G57 | Q2 |
| 67 | G58 | Q2 |
| 68 | G59 | Q2 |
| 69 | G60 | Q2 |
| 70 | G61 | Q2 |
| 71 | G62 | Q2 |
| 72 | G63 | Q2 |
| 73 | G64 | Q2 |
| 74 | G65 | Q2 |
| 75 | G66 | Q2 |
| 76 | G67 | Q2 |
| 77 | G68 | Q2 |
| 78 | G69 | Q2 |
| 79 | G70 | Q2 |
| 80 | G71 | Q2 |
| 81 | G72 | Q2 |
| 82 | G73 | Q2 |
| 83 | G74 | Q2 |
| 84 | G75 | Q2 |
| 85 | G76 | Q2 |
| 86 | G77 | Q2 |
| 87 | G78 | Q2 |
| 88 | G79 | Q2 |
| 89 | G80 | Q2 |
| 90 | G81 | Q2 |
| 91 | G82 | Q2 |
| 92 | G83 | Q2 |
| 93 | G84 | Q2 |
| 94 | G85 | Q2 |
| 95 | G86 | Q2 |
| 96 | G87 | Q2 |
| 97 | G2 | Q3 |
| 98 | G3 | Q3 |
| 99 | G4 | Q3 |
| 100 | G5 | Q3 |
| 101 | G6 | Q3 |
| 102 | G7 | Q3 |
| 103 | G8 | Q3 |
| 104 | G9 | Q3 |
| 105 | G10 | Q3 |
| 106 | G11 | Q3 |
| 107 | G12 | Q3 |
| 108 | G13 | Q3 |
| 109 | G14 | Q3 |
| 110 | G15 | Q3 |
| 111 | G16 | Q3 |
| 112 | G17 | Q3 |
| 113 | G18 | Q3 |
| 114 | G19 | Q3 |
| 115 | G20 | Q3 |
| 116 | G21 | Q3 |
| 117 | G22 | Q3 |
| 118 | G23 | Q3 |
| 119 | G24 | Q3 |
| 120 | G25 | Q3 |
| 121 | G26 | Q3 |
| 122 | G27 | Q3 |
| 123 | G28 | Q3 |
| 124 | G29 | Q3 |
| 125 | G30 | Q3 |
| 126 | G31 | Q3 |
| 127 | G32 | Q3 |
| 128 | G33 | Q3 |
| 129 | G34 | Q3 |
| 130 | G35 | Q3 |
| 131 | G36 | Q3 |
| 132 | G37 | Q3 |
| 133 | G38 | Q3 |
| 134 | G39 | Q3 |
| 135 | G40 | Q3 |
| 136 | G41 | Q3 |
| 137 | G42 | Q3 |
| 138 | G43 | Q3 |
| 139 | G44 | Q3 |
| 140 | G45 | Q3 |
| 141 | G46 | Q3 |
| 142 | G47 | Q3 |
| 143 | G48 | Q3 |
| 144 | G49 | Q3 |
| 145 | G50 | Q3 |
| 146 | G51 | Q3 |
| 147 | G52 | Q3 |
| 148 | G53 | Q3 |
| 149 | G54 | Q3 |
| 150 | G55 | Q3 |
| 151 | G56 | Q3 |
| 152 | G57 | Q3 |
| 153 | G58 | Q3 |
| 154 | G59 | Q3 |
| 155 | G60 | Q3 |
| 156 | G61 | Q3 |
| 157 | G62 | Q3 |
| 158 | G63 | Q3 |
| 159 | G64 | Q3 |
| 160 | G65 | Q3 |
| 161 | G66 | Q3 |
| 162 | G67 | Q3 |
| 163 | G68 | Q3 |
| 164 | G69 | Q3 |
| 165 | G70 | Q3 |
| 166 | G71 | Q3 |
| 167 | G72 | Q3 |
| 168 | G73 | Q3 |
| 169 | G74 | Q3 |
| 170 | G75 | Q3 |
| 171 | G76 | Q3 |
| 172 | G77 | Q3 |
| 173 | G78 | Q3 |
| 174 | G79 | Q3 |
| 175 | G80 | Q3 |
| 176 | G81 | Q3 |
| 177 | G82 | Q3 |
| 178 | G83 | Q3 |
| 179 | G84 | Q3 |
| 180 | G85 | Q3 |
| 181 | G86 | Q3 |
| 182 | G87 | Q3 |
| 183 | G1 | Q4 |
| 184 | G2 | Q4 |
| 185 | G3 | Q4 |
| 186 | G4 | Q4 |
| 187 | G5 | Q4 |
| 188 | G6 | Q4 |
| 189 | G7 | Q4 |
| 190 | G8 | Q4 |
| 191 | G9 | Q4 |
| 192 | G10 | Q4 |
| 193 | G11 | Q4 |
| 194 | G12 | Q4 |
| 195 | G13 | Q4 |
| 196 | G14 | Q4 |
| 197 | G15 | Q4 |
| 198 | G16 | Q4 |
| 199 | G17 | Q4 |

-continued

| Ex. | [G+] | [X−] |
|---|---|---|
| 200 | G18 | Q4 |
| 201 | G19 | Q4 |
| 202 | G20 | Q4 |
| 203 | G21 | Q4 |
| 204 | G22 | Q4 |
| 205 | G23 | Q4 |
| 206 | G24 | Q4 |
| 207 | G25 | Q4 |
| 208 | G26 | Q4 |
| 209 | G27 | Q4 |
| 210 | G28 | Q4 |
| 211 | G29 | Q4 |
| 212 | G30 | Q4 |
| 213 | G31 | Q4 |
| 214 | G32 | Q4 |
| 215 | G33 | Q4 |
| 216 | G34 | Q4 |
| 217 | G35 | Q4 |
| 218 | G36 | Q4 |
| 219 | G37 | Q4 |
| 220 | G38 | Q4 |
| 221 | G39 | Q4 |
| 222 | G40 | Q4 |
| 223 | G41 | Q4 |
| 224 | G42 | Q4 |
| 225 | G43 | Q4 |
| 226 | G44 | Q4 |
| 227 | G45 | Q4 |
| 228 | G46 | Q4 |
| 229 | G47 | Q4 |
| 230 | G48 | Q4 |
| 231 | G49 | Q4 |
| 232 | G50 | Q4 |
| 233 | G51 | Q4 |
| 234 | G52 | Q4 |
| 235 | G53 | Q4 |
| 236 | G54 | Q4 |
| 237 | G55 | Q4 |
| 238 | G56 | Q4 |
| 239 | G57 | Q4 |
| 240 | G58 | Q4 |
| 241 | G59 | Q4 |
| 242 | G60 | Q4 |
| 243 | G61 | Q4 |
| 244 | G62 | Q4 |
| 245 | G63 | Q4 |
| 246 | G64 | Q4 |
| 247 | G65 | Q4 |
| 248 | G66 | Q4 |
| 249 | G67 | Q4 |
| 250 | G68 | Q4 |
| 251 | G69 | Q4 |
| 252 | G70 | Q4 |
| 253 | G71 | Q4 |
| 254 | G72 | Q4 |
| 255 | G73 | Q4 |
| 256 | G74 | Q4 |
| 257 | G75 | Q4 |
| 258 | G76 | Q4 |
| 259 | G77 | Q4 |
| 260 | G78 | Q4 |
| 261 | G79 | Q4 |
| 262 | G80 | Q4 |
| 263 | G81 | Q4 |
| 264 | G82 | Q4 |
| 265 | G83 | Q4 |
| 266 | G84 | Q4 |
| 267 | G85 | Q4 |
| 268 | G86 | Q4 |
| 269 | G87 | Q4 |
| 270 | G1 | Q5 |
| 271 | G2 | Q5 |
| 272 | G3 | Q5 |
| 273 | G4 | Q5 |
| 274 | G5 | Q5 |
| 275 | G6 | Q5 |
| 276 | G7 | Q5 |

-continued

| Ex. | [G+] | [X−] |
|---|---|---|
| 277 | G8 | Q5 |
| 278 | G9 | Q5 |
| 279 | G10 | Q5 |
| 280 | G11 | Q5 |
| 281 | G12 | Q5 |
| 282 | G13 | Q5 |
| 283 | G14 | Q5 |
| 284 | G15 | Q5 |
| 285 | G16 | Q5 |
| 286 | G17 | Q5 |
| 287 | G18 | Q5 |
| 288 | G19 | Q5 |
| 289 | G20 | Q5 |
| 290 | G21 | Q5 |
| 291 | G22 | Q5 |
| 292 | G23 | Q5 |
| 293 | G24 | Q5 |
| 294 | G25 | Q5 |
| 295 | G26 | Q5 |
| 296 | G27 | Q5 |
| 297 | G28 | Q5 |
| 298 | G29 | Q5 |
| 299 | G30 | Q5 |
| 300 | G31 | Q5 |
| 301 | G32 | Q5 |
| 302 | G33 | Q5 |
| 303 | G34 | Q5 |
| 304 | G35 | Q5 |
| 305 | G36 | Q5 |
| 306 | G37 | Q5 |
| 307 | G38 | Q5 |
| 308 | G39 | Q5 |
| 309 | G40 | Q5 |
| 310 | G41 | Q5 |
| 311 | G42 | Q5 |
| 312 | G43 | Q5 |
| 313 | G44 | Q5 |
| 314 | G45 | Q5 |
| 315 | G46 | Q5 |
| 316 | G47 | Q5 |
| 317 | G48 | Q5 |
| 318 | G49 | Q5 |
| 319 | G50 | Q5 |
| 320 | G51 | Q5 |
| 321 | G52 | Q5 |
| 322 | G53 | Q5 |
| 323 | G54 | Q5 |
| 324 | G55 | Q5 |
| 325 | G56 | Q5 |
| 326 | G57 | Q5 |
| 327 | G58 | Q5 |
| 328 | G59 | Q5 |
| 329 | G60 | Q5 |
| 330 | G61 | Q5 |
| 331 | G62 | Q5 |
| 332 | G63 | Q5 |
| 333 | G64 | Q5 |
| 334 | G65 | Q5 |
| 335 | G66 | Q5 |
| 336 | G67 | Q5 |
| 337 | G68 | Q5 |
| 338 | G69 | Q5 |
| 339 | G70 | Q5 |
| 340 | G71 | Q5 |
| 341 | G72 | Q5 |
| 342 | G73 | Q5 |
| 343 | G74 | Q5 |
| 344 | G75 | Q5 |
| 345 | G76 | Q5 |
| 346 | G77 | Q5 |
| 347 | G78 | Q5 |
| 348 | G79 | Q5 |
| 349 | G80 | Q5 |
| 350 | G81 | Q5 |
| 351 | G82 | Q5 |
| 352 | G83 | Q5 |
| 353 | G84 | Q5 |

| Ex. | [G+] | [X−] |
|---|---|---|
| 354 | G85 | Q5 |
| 355 | G86 | Q5 |
| 356 | G87 | Q5 |
| 357 | G1 | Q6 |
| 358 | G2 | Q6 |
| 359 | G3 | Q6 |
| 360 | G4 | Q6 |
| 361 | G5 | Q6 |
| 362 | G6 | Q6 |
| 363 | G7 | Q6 |
| 364 | G8 | Q6 |
| 365 | G9 | Q6 |
| 366 | G10 | Q6 |
| 367 | G11 | Q6 |
| 368 | G12 | Q6 |
| 369 | G13 | Q6 |
| 370 | G14 | Q6 |
| 371 | G15 | Q6 |
| 372 | G16 | Q6 |
| 373 | G17 | Q6 |
| 374 | G18 | Q6 |
| 375 | G19 | Q6 |
| 376 | G20 | Q6 |
| 377 | G21 | Q6 |
| 378 | G22 | Q6 |
| 379 | G23 | Q6 |
| 380 | G24 | Q6 |
| 381 | G25 | Q6 |
| 382 | G26 | Q6 |
| 383 | G27 | Q6 |
| 384 | G28 | Q6 |
| 385 | G29 | Q6 |
| 386 | G30 | Q6 |
| 387 | G31 | Q6 |
| 388 | G32 | Q6 |
| 389 | G33 | Q6 |
| 390 | G34 | Q6 |
| 391 | G35 | Q6 |
| 392 | G36 | Q6 |
| 393 | G37 | Q6 |
| 394 | G38 | Q6 |
| 395 | G39 | Q6 |
| 396 | G40 | Q6 |
| 397 | G41 | Q6 |
| 398 | G42 | Q6 |
| 399 | G43 | Q6 |
| 400 | G44 | Q6 |
| 401 | G45 | Q6 |
| 402 | G46 | Q6 |
| 403 | G47 | Q6 |
| 404 | G48 | Q6 |
| 405 | G49 | Q6 |
| 406 | G50 | Q6 |
| 407 | G51 | Q6 |
| 408 | G52 | Q6 |
| 409 | G53 | Q6 |
| 410 | G54 | Q6 |
| 411 | G55 | Q6 |
| 412 | G56 | Q6 |
| 413 | G57 | Q6 |
| 414 | G58 | Q6 |
| 415 | G59 | Q6 |
| 416 | G60 | Q6 |
| 417 | G61 | Q6 |
| 418 | G62 | Q6 |
| 419 | G63 | Q6 |
| 420 | G64 | Q6 |
| 421 | G65 | Q6 |
| 422 | G66 | Q6 |
| 423 | G67 | Q6 |
| 424 | G68 | Q6 |
| 425 | G69 | Q6 |
| 426 | G70 | Q6 |
| 427 | G71 | Q6 |
| 428 | G72 | Q6 |
| 429 | G73 | Q6 |
| 430 | G74 | Q6 |
| 431 | G75 | Q6 |
| 432 | G76 | Q6 |
| 433 | G77 | Q6 |
| 434 | G78 | Q6 |
| 435 | G79 | Q6 |
| 436 | G80 | Q6 |
| 437 | G81 | Q6 |
| 438 | G82 | Q6 |
| 439 | G83 | Q6 |
| 440 | G84 | Q6 |
| 441 | G85 | Q6 |
| 442 | G86 | Q6 |
| 443 | G87 | Q6 |
| 444 | G1 | Q7 |
| 445 | G2 | Q7 |
| 446 | G3 | Q7 |
| 447 | G4 | Q7 |
| 448 | G5 | Q7 |
| 449 | G6 | Q7 |
| 450 | G7 | Q7 |
| 451 | G8 | Q7 |
| 452 | G9 | Q7 |
| 453 | G10 | Q7 |
| 454 | G11 | Q7 |
| 455 | G12 | Q7 |
| 456 | G13 | Q7 |
| 457 | G14 | Q7 |
| 458 | G15 | Q7 |
| 459 | G16 | Q7 |
| 460 | G17 | Q7 |
| 461 | G18 | Q7 |
| 462 | G19 | Q7 |
| 463 | G20 | Q7 |
| 464 | G21 | Q7 |
| 465 | G22 | Q7 |
| 466 | G23 | Q7 |
| 467 | G24 | Q7 |
| 468 | G25 | Q7 |
| 469 | G26 | Q7 |
| 470 | G27 | Q7 |
| 471 | G28 | Q7 |
| 472 | G29 | Q7 |
| 473 | G30 | Q7 |
| 474 | G31 | Q7 |
| 475 | G32 | Q7 |
| 476 | G33 | Q7 |
| 477 | G34 | Q7 |
| 478 | G35 | Q7 |
| 479 | G36 | Q7 |
| 480 | G37 | Q7 |
| 481 | G38 | Q7 |
| 482 | G39 | Q7 |
| 483 | G40 | Q7 |
| 484 | G41 | Q7 |
| 485 | G42 | Q7 |
| 486 | G43 | Q7 |
| 487 | G44 | Q7 |
| 488 | G45 | Q7 |
| 489 | G46 | Q7 |
| 490 | G47 | Q7 |
| 491 | G48 | Q7 |
| 492 | G49 | Q7 |
| 493 | G50 | Q7 |
| 494 | G51 | Q7 |
| 495 | G52 | Q7 |
| 496 | G53 | Q7 |
| 497 | G54 | Q7 |
| 498 | G55 | Q7 |
| 499 | G56 | Q7 |
| 500 | G57 | Q7 |
| 501 | G58 | Q7 |
| 502 | G59 | Q7 |
| 503 | G60 | Q7 |
| 504 | G61 | Q7 |
| 505 | G62 | Q7 |
| 506 | G63 | Q7 |
| 507 | G64 | Q7 |

| Ex. | [G⁺] | [X⁻] |
|---|---|---|
| 508 | G65 | Q7 |
| 509 | G66 | Q7 |
| 510 | G67 | Q7 |
| 511 | G68 | Q7 |
| 512 | G69 | Q7 |
| 513 | G70 | Q7 |
| 514 | G71 | Q7 |
| 515 | G72 | Q7 |
| 516 | G73 | Q7 |
| 517 | G74 | Q7 |
| 518 | G75 | Q7 |
| 519 | G76 | Q7 |
| 520 | G77 | Q7 |
| 521 | G78 | Q7 |
| 522 | G79 | Q7 |
| 523 | G80 | Q7 |
| 524 | G81 | Q7 |
| 525 | G82 | Q7 |
| 526 | G83 | Q7 |
| 527 | G84 | Q7 |
| 528 | G85 | Q7 |
| 529 | G86 | Q7 |
| 530 | G87 | Q7 |
| 531 | G1 | Q8 |
| 532 | G2 | Q8 |
| 533 | G3 | Q8 |
| 534 | G4 | Q8 |
| 535 | G5 | Q8 |
| 536 | G6 | Q8 |
| 537 | G7 | Q8 |
| 538 | G8 | Q8 |
| 539 | G9 | Q8 |
| 540 | G10 | Q8 |
| 541 | G11 | Q8 |
| 542 | G12 | Q8 |
| 543 | G13 | Q8 |
| 544 | G14 | Q8 |
| 545 | G15 | Q8 |
| 546 | G16 | Q8 |
| 547 | G17 | Q8 |
| 548 | G18 | Q8 |
| 549 | G19 | Q8 |
| 550 | G20 | Q8 |
| 551 | G21 | Q8 |
| 552 | G22 | Q8 |
| 553 | G23 | Q8 |
| 554 | G24 | Q8 |
| 555 | G25 | Q8 |
| 556 | G26 | Q8 |
| 557 | G27 | Q8 |
| 558 | G28 | Q8 |
| 559 | G29 | Q8 |
| 560 | G30 | Q8 |
| 561 | G31 | Q8 |
| 562 | G32 | Q8 |
| 563 | G33 | Q8 |
| 564 | G34 | Q8 |
| 565 | G35 | Q8 |
| 566 | G36 | Q8 |
| 567 | G37 | Q8 |
| 568 | G38 | Q8 |
| 569 | G39 | Q8 |
| 570 | G40 | Q8 |
| 571 | G41 | Q8 |
| 572 | G42 | Q8 |
| 573 | G43 | Q8 |
| 574 | G44 | Q8 |
| 575 | G45 | Q8 |
| 576 | G46 | Q8 |
| 577 | G47 | Q8 |
| 578 | G48 | Q8 |
| 579 | G49 | Q8 |
| 580 | G50 | Q8 |
| 581 | G51 | Q8 |
| 582 | G52 | Q8 |
| 583 | G53 | Q8 |
| 584 | G54 | Q8 |
| 585 | G55 | Q8 |
| 586 | G56 | Q8 |
| 587 | G57 | Q8 |
| 588 | G58 | Q8 |
| 589 | G59 | Q8 |
| 590 | G60 | Q8 |
| 591 | G61 | Q8 |
| 592 | G62 | Q8 |
| 593 | G63 | Q8 |
| 594 | G64 | Q8 |
| 595 | G65 | Q8 |
| 596 | G66 | Q8 |
| 597 | G67 | Q8 |
| 598 | G68 | Q8 |
| 599 | G69 | Q8 |
| 600 | G70 | Q8 |
| 601 | G71 | Q8 |
| 602 | G72 | Q8 |
| 603 | G73 | Q8 |
| 604 | G74 | Q8 |
| 605 | G75 | Q8 |
| 606 | G76 | Q8 |
| 607 | G77 | Q8 |
| 608 | G78 | Q8 |
| 609 | G79 | Q8 |
| 610 | G80 | Q8 |
| 611 | G81 | Q8 |
| 612 | G82 | Q8 |
| 613 | G83 | Q8 |
| 614 | G84 | Q8 |
| 615 | G85 | Q8 |
| 616 | G86 | Q8 |
| 617 | G87 | Q8 |
| 618 | G1 | Q9 |
| 619 | G2 | Q9 |
| 620 | G3 | Q9 |
| 621 | G4 | Q9 |
| 622 | G5 | Q9 |
| 623 | G6 | Q9 |
| 624 | G7 | Q9 |
| 625 | G8 | Q9 |
| 626 | G9 | Q9 |
| 627 | G10 | Q9 |
| 628 | G11 | Q9 |
| 629 | G12 | Q9 |
| 630 | G13 | Q9 |
| 631 | G14 | Q9 |
| 632 | G15 | Q9 |
| 633 | G16 | Q9 |
| 634 | G17 | Q9 |
| 635 | G18 | Q9 |
| 636 | G19 | Q9 |
| 637 | G20 | Q9 |
| 638 | G21 | Q9 |
| 639 | G22 | Q9 |
| 640 | G23 | Q9 |
| 641 | G24 | Q9 |
| 642 | G25 | Q9 |
| 643 | G26 | Q9 |
| 644 | G27 | Q9 |
| 645 | G28 | Q9 |
| 646 | G29 | Q9 |
| 647 | G30 | Q9 |
| 648 | G31 | Q9 |
| 649 | G32 | Q9 |
| 650 | G33 | Q9 |
| 651 | G34 | Q9 |
| 652 | G35 | Q9 |
| 653 | G36 | Q9 |
| 654 | G37 | Q9 |
| 655 | G38 | Q9 |
| 656 | G39 | Q9 |
| 657 | G40 | Q9 |
| 658 | G41 | Q9 |
| 659 | G42 | Q9 |
| 660 | G43 | Q9 |
| 661 | G44 | Q9 |

| Ex. | [G⁺] | [X⁻] |
|---|---|---|
| 662 | G45 | Q9 |
| 663 | G46 | Q9 |
| 664 | G47 | Q9 |
| 665 | G48 | Q9 |
| 666 | G49 | Q9 |
| 667 | G50 | Q9 |
| 668 | G51 | Q9 |
| 669 | G52 | Q9 |
| 670 | G53 | Q9 |
| 671 | G54 | Q9 |
| 672 | G55 | Q9 |
| 673 | G56 | Q9 |
| 674 | G57 | Q9 |
| 675 | G58 | Q9 |
| 676 | G59 | Q9 |
| 677 | G60 | Q9 |
| 678 | G61 | Q9 |
| 679 | G62 | Q9 |
| 680 | G63 | Q9 |
| 681 | G64 | Q9 |
| 682 | G65 | Q9 |
| 683 | G66 | Q9 |
| 684 | G67 | Q9 |
| 685 | G68 | Q9 |
| 686 | G69 | Q9 |
| 687 | G70 | Q9 |
| 688 | G71 | Q9 |
| 689 | G72 | Q9 |
| 690 | G73 | Q9 |
| 691 | G74 | Q9 |
| 692 | G75 | Q9 |
| 693 | G76 | Q9 |
| 694 | G77 | Q9 |
| 695 | G78 | Q9 |
| 696 | G79 | Q9 |
| 697 | G80 | Q9 |
| 698 | G81 | Q9 |
| 699 | G82 | Q9 |
| 700 | G83 | Q9 |
| 701 | G84 | Q9 |
| 702 | G85 | Q9 |
| 703 | G86 | Q9 |
| 704 | G87 | Q9 |
| 705 | G1 | Q10 |
| 706 | G2 | Q10 |
| 707 | G3 | Q10 |
| 708 | G4 | Q10 |
| 709 | G5 | Q10 |
| 710 | G6 | Q10 |
| 711 | G7 | Q10 |
| 712 | G8 | Q10 |
| 713 | G9 | Q10 |
| 714 | G10 | Q10 |
| 715 | G11 | Q10 |
| 716 | G12 | Q10 |
| 717 | G13 | Q10 |
| 718 | G14 | Q10 |
| 719 | G15 | Q10 |
| 720 | G16 | Q10 |
| 721 | G17 | Q10 |
| 722 | G18 | Q10 |
| 723 | G19 | Q10 |
| 724 | G20 | Q10 |
| 725 | G21 | Q10 |
| 726 | G22 | Q10 |
| 727 | G23 | Q10 |
| 728 | G24 | Q10 |
| 729 | G25 | Q10 |
| 730 | G26 | Q10 |
| 731 | G27 | Q10 |
| 732 | G28 | Q10 |
| 733 | G29 | Q10 |
| 734 | G30 | Q10 |
| 735 | G31 | Q10 |
| 736 | G32 | Q10 |
| 737 | G33 | Q10 |
| 738 | G34 | Q10 |
| 739 | G35 | Q10 |
| 740 | G36 | Q10 |
| 741 | G37 | Q10 |
| 742 | G38 | Q10 |
| 743 | G39 | Q10 |
| 744 | G40 | Q10 |
| 745 | G41 | Q10 |
| 746 | G42 | Q10 |
| 747 | G43 | Q10 |
| 748 | G44 | Q10 |
| 749 | G45 | Q10 |
| 750 | G46 | Q10 |
| 751 | G47 | Q10 |
| 752 | G48 | Q10 |
| 753 | G49 | Q10 |
| 754 | G50 | Q10 |
| 755 | G51 | Q10 |
| 756 | G52 | Q10 |
| 757 | G53 | Q10 |
| 758 | G54 | Q10 |
| 759 | G55 | Q10 |
| 760 | G56 | Q10 |
| 761 | G57 | Q10 |
| 762 | G58 | Q10 |
| 763 | G59 | Q10 |
| 764 | G60 | Q10 |
| 765 | G61 | Q10 |
| 766 | G62 | Q10 |
| 767 | G63 | Q10 |
| 768 | G64 | Q10 |
| 769 | G65 | Q10 |
| 770 | G66 | Q10 |
| 771 | G67 | Q10 |
| 772 | G68 | Q10 |
| 773 | G69 | Q10 |
| 774 | G70 | Q10 |
| 775 | G71 | Q10 |
| 776 | G72 | Q10 |
| 777 | G73 | Q10 |
| 778 | G74 | Q10 |
| 779 | G75 | Q10 |
| 780 | G76 | Q10 |
| 781 | G77 | Q10 |
| 782 | G78 | Q10 |
| 783 | G79 | Q10 |
| 784 | G80 | Q10 |
| 785 | G81 | Q10 |
| 786 | G82 | Q10 |
| 787 | G83 | Q10 |
| 788 | G84 | Q10 |
| 789 | G85 | Q10 |
| 790 | G86 | Q10 |
| 791 | G87 | Q10 |
| 792 | G1 | Q11 |
| 793 | G2 | Q11 |
| 794 | G3 | Q11 |
| 795 | G4 | Q11 |
| 796 | G5 | Q11 |
| 797 | G6 | Q11 |
| 798 | G7 | Q11 |
| 799 | G8 | Q11 |
| 800 | G9 | Q11 |
| 801 | G10 | Q11 |
| 802 | G11 | Q11 |
| 803 | G12 | Q11 |
| 804 | G13 | Q11 |
| 805 | G14 | Q11 |
| 806 | G15 | Q11 |
| 807 | G16 | Q11 |
| 808 | G17 | Q11 |
| 809 | G18 | Q11 |
| 810 | G19 | Q11 |
| 811 | G20 | Q11 |
| 812 | G21 | Q11 |
| 813 | G22 | Q11 |
| 814 | G23 | Q11 |
| 815 | G24 | Q11 |

| Ex. | [G+] | [X−] |
|---|---|---|
| 816 | G25 | Q11 |
| 817 | G26 | Q11 |
| 818 | G27 | Q11 |
| 819 | G28 | Q11 |
| 820 | G29 | Q11 |
| 821 | G30 | Q11 |
| 822 | G31 | Q11 |
| 823 | G32 | Q11 |
| 824 | G33 | Q11 |
| 825 | G34 | Q11 |
| 826 | G35 | Q11 |
| 827 | G36 | Q11 |
| 828 | G37 | Q11 |
| 829 | G38 | Q11 |
| 830 | G39 | Q11 |
| 831 | G40 | Q11 |
| 832 | G41 | Q11 |
| 833 | G42 | Q11 |
| 834 | G43 | Q11 |
| 835 | G44 | Q11 |
| 836 | G45 | Q11 |
| 837 | G46 | Q11 |
| 838 | G47 | Q11 |
| 839 | G48 | Q11 |
| 840 | G49 | Q11 |
| 841 | G50 | Q11 |
| 842 | G51 | Q11 |
| 843 | G52 | Q11 |
| 844 | G53 | Q11 |
| 845 | G54 | Q11 |
| 846 | G55 | Q11 |
| 847 | G56 | Q11 |
| 848 | G57 | Q11 |
| 849 | G58 | Q11 |
| 850 | G59 | Q11 |
| 851 | G60 | Q11 |
| 852 | G61 | Q11 |
| 853 | G62 | Q11 |
| 854 | G63 | Q11 |
| 855 | G64 | Q11 |
| 856 | G65 | Q11 |
| 857 | G66 | Q11 |
| 858 | G67 | Q11 |
| 859 | G68 | Q11 |
| 860 | G69 | Q11 |
| 861 | G70 | Q11 |
| 862 | G71 | Q11 |
| 863 | G72 | Q11 |
| 864 | G73 | Q11 |
| 865 | G74 | Q11 |
| 866 | G75 | Q11 |
| 867 | G76 | Q11 |
| 868 | G77 | Q11 |
| 869 | G78 | Q11 |
| 870 | G79 | Q11 |
| 871 | G80 | Q11 |
| 872 | G81 | Q11 |
| 873 | G82 | Q11 |
| 874 | G83 | Q11 |
| 875 | G84 | Q11 |
| 876 | G85 | Q11 |
| 877 | G86 | Q11 |
| 878 | G87 | Q11 |
| 879 | G1 | Q12 |
| 880 | G2 | Q12 |
| 881 | G3 | Q12 |
| 882 | G4 | Q12 |
| 883 | G5 | Q12 |
| 884 | G6 | Q12 |
| 885 | G7 | Q12 |
| 886 | G8 | Q12 |
| 887 | G9 | Q12 |
| 888 | G10 | Q12 |
| 889 | G11 | Q12 |
| 890 | G12 | Q12 |
| 891 | G13 | Q12 |
| 892 | G14 | Q12 |
| 893 | G15 | Q12 |
| 894 | G16 | Q12 |
| 895 | G17 | Q12 |
| 896 | G18 | Q12 |
| 897 | G19 | Q12 |
| 898 | G20 | Q12 |
| 899 | G21 | Q12 |
| 900 | G22 | Q12 |
| 901 | G23 | Q12 |
| 902 | G24 | Q12 |
| 903 | G25 | Q12 |
| 904 | G26 | Q12 |
| 905 | G27 | Q12 |
| 906 | G28 | Q12 |
| 907 | G29 | Q12 |
| 908 | G30 | Q12 |
| 909 | G31 | Q12 |
| 910 | G32 | Q12 |
| 911 | G33 | Q12 |
| 912 | G34 | Q12 |
| 913 | G35 | Q12 |
| 914 | G36 | Q12 |
| 915 | G37 | Q12 |
| 916 | G38 | Q12 |
| 917 | G39 | Q12 |
| 918 | G40 | Q12 |
| 919 | G41 | Q12 |
| 920 | G42 | Q12 |
| 921 | G43 | Q12 |
| 922 | G44 | Q12 |
| 923 | G45 | Q12 |
| 924 | G46 | Q12 |
| 925 | G47 | Q12 |
| 926 | G48 | Q12 |
| 927 | G49 | Q12 |
| 928 | G50 | Q12 |
| 929 | G51 | Q12 |
| 930 | G52 | Q12 |
| 931 | G53 | Q12 |
| 932 | G54 | Q12 |
| 933 | G55 | Q12 |
| 934 | G56 | Q12 |
| 935 | G57 | Q12 |
| 936 | G58 | Q12 |
| 937 | G59 | Q12 |
| 938 | G60 | Q12 |
| 939 | G61 | Q12 |
| 940 | G62 | Q12 |
| 941 | G63 | Q12 |
| 942 | G64 | Q12 |
| 943 | G65 | Q12 |
| 944 | G66 | Q12 |
| 945 | G67 | Q12 |
| 946 | G68 | Q12 |
| 947 | G69 | Q12 |
| 948 | G70 | Q12 |
| 949 | G71 | Q12 |
| 950 | G72 | Q12 |
| 951 | G73 | Q12 |
| 952 | G74 | Q12 |
| 953 | G75 | Q12 |
| 954 | G76 | Q12 |
| 955 | G77 | Q12 |
| 956 | G78 | Q12 |
| 957 | G79 | Q12 |
| 958 | G80 | Q12 |
| 959 | G81 | Q12 |
| 960 | G82 | Q12 |
| 961 | G83 | Q12 |
| 962 | G84 | Q12 |
| 963 | G85 | Q12 |
| 964 | G86 | Q12 |
| 965 | G87 | Q12 |
| 966 | G1 | Q13 |
| 967 | G2 | Q13 |
| 968 | G3 | Q13 |
| 969 | G4 | Q13 |

| Ex. | [G⁺] | [X⁻] |
|---|---|---|
| 970 | G5 | Q13 |
| 971 | G6 | Q13 |
| 972 | G7 | Q13 |
| 973 | G8 | Q13 |
| 974 | G9 | Q13 |
| 975 | G10 | Q13 |
| 976 | G11 | Q13 |
| 977 | G12 | Q13 |
| 978 | G13 | Q13 |
| 979 | G14 | Q13 |
| 980 | G15 | Q13 |
| 981 | G16 | Q13 |
| 982 | G17 | Q13 |
| 983 | G18 | Q13 |
| 984 | G19 | Q13 |
| 985 | G20 | Q13 |
| 986 | G21 | Q13 |
| 987 | G22 | Q13 |
| 988 | G23 | Q13 |
| 989 | G24 | Q13 |
| 990 | G25 | Q13 |
| 991 | G26 | Q13 |
| 992 | G27 | Q13 |
| 993 | G28 | Q13 |
| 994 | G29 | Q13 |
| 995 | G30 | Q13 |
| 996 | G31 | Q13 |
| 997 | G32 | Q13 |
| 998 | G33 | Q13 |
| 999 | G34 | Q13 |
| 1000 | G35 | Q13 |
| 1001 | G36 | Q13 |
| 1002 | G37 | Q13 |
| 1003 | G38 | Q13 |
| 1004 | G39 | Q13 |
| 1005 | G40 | Q13 |
| 1006 | G41 | Q13 |
| 1007 | G42 | Q13 |
| 1008 | G43 | Q13 |
| 1009 | G44 | Q13 |
| 1010 | G45 | Q13 |
| 1011 | G46 | Q13 |
| 1012 | G47 | Q13 |
| 1013 | G48 | Q13 |
| 1014 | G49 | Q13 |
| 1015 | G50 | Q13 |
| 1016 | G51 | Q13 |
| 1017 | G52 | Q13 |
| 1018 | G53 | Q13 |
| 1019 | G54 | Q13 |
| 1020 | G55 | Q13 |
| 1021 | G56 | Q13 |
| 1022 | G57 | Q13 |
| 1023 | G58 | Q13 |
| 1024 | G59 | Q13 |
| 1025 | G60 | Q13 |
| 1026 | G61 | Q13 |
| 1027 | G62 | Q13 |
| 1028 | G63 | Q13 |
| 1029 | G64 | Q13 |
| 1030 | G65 | Q13 |
| 1031 | G66 | Q13 |
| 1032 | G67 | Q13 |
| 1033 | G68 | Q13 |
| 1034 | G69 | Q13 |
| 1035 | G70 | Q13 |
| 1036 | G71 | Q13 |
| 1037 | G72 | Q13 |
| 1038 | G73 | Q13 |
| 1039 | G74 | Q13 |
| 1040 | G75 | Q13 |
| 1041 | G76 | Q13 |
| 1042 | G77 | Q13 |
| 1043 | G78 | Q13 |
| 1044 | G79 | Q13 |
| 1045 | G80 | Q13 |
| 1046 | G81 | Q13 |
| 1047 | G82 | Q13 |
| 1048 | G83 | Q13 |
| 1049 | G84 | Q13 |
| 1050 | G85 | Q13 |
| 1051 | G86 | Q13 |
| 1052 | G87 | Q13 |
| 1053 | G1 | Q14 |
| 1054 | G2 | Q14 |
| 1055 | G3 | Q14 |
| 1056 | G4 | Q14 |
| 1057 | G5 | Q14 |
| 1058 | G6 | Q14 |
| 1059 | G7 | Q14 |
| 1060 | G8 | Q14 |
| 1061 | G9 | Q14 |
| 1062 | G10 | Q14 |
| 1063 | G11 | Q14 |
| 1064 | G12 | Q14 |
| 1065 | G13 | Q14 |
| 1066 | G14 | Q14 |
| 1067 | G15 | Q14 |
| 1068 | G16 | Q14 |
| 1069 | G17 | Q14 |
| 1070 | G18 | Q14 |
| 1071 | G19 | Q14 |
| 1072 | G20 | Q14 |
| 1073 | G21 | Q14 |
| 1074 | G22 | Q14 |
| 1075 | G23 | Q14 |
| 1076 | G24 | Q14 |
| 1077 | G25 | Q14 |
| 1078 | G26 | Q14 |
| 1079 | G27 | Q14 |
| 1080 | G28 | Q14 |
| 1081 | G29 | Q14 |
| 1082 | G30 | Q14 |
| 1083 | G31 | Q14 |
| 1084 | G32 | Q14 |
| 1085 | G33 | Q14 |
| 1086 | G34 | Q14 |
| 1087 | G35 | Q14 |
| 1088 | G36 | Q14 |
| 1089 | G37 | Q14 |
| 1090 | G38 | Q14 |
| 1091 | G39 | Q14 |
| 1092 | G40 | Q14 |
| 1093 | G41 | Q14 |
| 1094 | G42 | Q14 |
| 1095 | G43 | Q14 |
| 1096 | G44 | Q14 |
| 1097 | G45 | Q14 |
| 1098 | G46 | Q14 |
| 1099 | G47 | Q14 |
| 1100 | G48 | Q14 |
| 1101 | G49 | Q14 |
| 1102 | G50 | Q14 |
| 1103 | G51 | Q14 |
| 1104 | G52 | Q14 |
| 1105 | G53 | Q14 |
| 1106 | G54 | Q14 |
| 1107 | G55 | Q14 |
| 1108 | G56 | Q14 |
| 1109 | G57 | Q14 |
| 1110 | G58 | Q14 |
| 1111 | G59 | Q14 |
| 1112 | G60 | Q14 |
| 1113 | G61 | Q14 |
| 1114 | G62 | Q14 |
| 1115 | G63 | Q14 |
| 1116 | G64 | Q14 |
| 1117 | G65 | Q14 |
| 1118 | G66 | Q14 |
| 1119 | G67 | Q14 |
| 1120 | G68 | Q14 |
| 1121 | G69 | Q14 |
| 1122 | G70 | Q14 |
| 1123 | G71 | Q14 |

-continued

| Ex. | [G+] | [X−] |
|---|---|---|
| 1124 | G72 | Q14 |
| 1125 | G73 | Q14 |
| 1126 | G74 | Q14 |
| 1127 | G75 | Q14 |
| 1128 | G76 | Q14 |
| 1129 | G77 | Q14 |
| 1130 | G78 | Q14 |
| 1131 | G79 | Q14 |
| 1132 | G80 | Q14 |
| 1133 | G81 | Q14 |
| 1134 | G82 | Q14 |
| 1135 | G83 | Q14 |
| 1136 | G84 | Q14 |
| 1137 | G85 | Q14 |
| 1138 | G86 | Q14 |
| 1139 | G87 | Q14 |
| 1140 | G1 | Q15 |
| 1141 | G2 | Q15 |
| 1142 | G3 | Q15 |
| 1143 | G4 | Q15 |
| 1144 | G5 | Q15 |
| 1145 | G6 | Q15 |
| 1146 | G7 | Q15 |
| 1147 | G8 | Q15 |
| 1148 | G9 | Q15 |
| 1149 | G10 | Q15 |
| 1150 | G11 | Q15 |
| 1151 | G12 | Q15 |
| 1152 | G13 | Q15 |
| 1153 | G14 | Q15 |
| 1154 | G15 | Q15 |
| 1155 | G16 | Q15 |
| 1156 | G17 | Q15 |
| 1157 | G18 | Q15 |
| 1158 | G19 | Q15 |
| 1159 | G20 | Q15 |
| 1160 | G21 | Q15 |
| 1161 | G22 | Q15 |
| 1162 | G23 | Q15 |
| 1163 | G24 | Q15 |
| 1164 | G25 | Q15 |
| 1165 | G26 | Q15 |
| 1166 | G27 | Q15 |
| 1167 | G28 | Q15 |
| 1168 | G29 | Q15 |
| 1169 | G30 | Q15 |
| 1170 | G31 | Q15 |
| 1171 | G32 | Q15 |
| 1172 | G33 | Q15 |
| 1173 | G34 | Q15 |
| 1174 | G35 | Q15 |
| 1175 | G36 | Q15 |
| 1176 | G37 | Q15 |
| 1177 | G38 | Q15 |
| 1178 | G39 | Q15 |
| 1179 | G40 | Q15 |
| 1180 | G41 | Q15 |
| 1181 | G42 | Q15 |
| 1182 | G43 | Q15 |
| 1183 | G44 | Q15 |
| 1184 | G45 | Q15 |
| 1185 | G46 | Q15 |
| 1186 | G47 | Q15 |
| 1187 | G48 | Q15 |
| 1188 | G49 | Q15 |
| 1189 | G50 | Q15 |
| 1190 | G51 | Q15 |
| 1191 | G52 | Q15 |
| 1192 | G53 | Q15 |
| 1193 | G54 | Q15 |
| 1194 | G55 | Q15 |
| 1195 | G56 | Q15 |
| 1196 | G57 | Q15 |
| 1197 | G58 | Q15 |
| 1198 | G59 | Q15 |
| 1199 | G60 | Q15 |
| 1200 | G61 | Q15 |

-continued

| Ex. | [G+] | [X−] |
|---|---|---|
| 1201 | G62 | Q15 |
| 1202 | G63 | Q15 |
| 1203 | G64 | Q15 |
| 1204 | G65 | Q15 |
| 1205 | G66 | Q15 |
| 1206 | G67 | Q15 |
| 1207 | G68 | Q15 |
| 1208 | G69 | Q15 |
| 1209 | G70 | Q15 |
| 1210 | G71 | Q15 |
| 1211 | G72 | Q15 |
| 1212 | G73 | Q15 |
| 1213 | G74 | Q15 |
| 1214 | G75 | Q15 |
| 1215 | G76 | Q15 |
| 1216 | G77 | Q15 |
| 1217 | G78 | Q15 |
| 1218 | G79 | Q15 |
| 1219 | G80 | Q15 |
| 1220 | G81 | Q15 |
| 1221 | G82 | Q15 |
| 1222 | G83 | Q15 |
| 1223 | G84 | Q15 |
| 1224 | G85 | Q15 |
| 1225 | G86 | Q15 |
| 1226 | G87 | Q15 |
| 1227 | G1 | Q16 |
| 1228 | G2 | Q16 |
| 1229 | G3 | Q16 |
| 1230 | G4 | Q16 |
| 1231 | G5 | Q16 |
| 1232 | G6 | Q16 |
| 1233 | G7 | Q16 |
| 1234 | G8 | Q16 |
| 1235 | G9 | Q16 |
| 1236 | G10 | Q16 |
| 1237 | G11 | Q16 |
| 1238 | G12 | Q16 |
| 1239 | G13 | Q16 |
| 1240 | G14 | Q16 |
| 1241 | G15 | Q16 |
| 1242 | G16 | Q16 |
| 1243 | G17 | Q16 |
| 1244 | G18 | Q16 |
| 1245 | G19 | Q16 |
| 1246 | G20 | Q16 |
| 1247 | G21 | Q16 |
| 1248 | G22 | Q16 |
| 1249 | G23 | Q16 |
| 1250 | G24 | Q16 |
| 1251 | G25 | Q16 |
| 1252 | G26 | Q16 |
| 1253 | G27 | Q16 |
| 1254 | G28 | Q16 |
| 1255 | G29 | Q16 |
| 1256 | G30 | Q16 |
| 1257 | G31 | Q16 |
| 1258 | G32 | Q16 |
| 1259 | G33 | Q16 |
| 1260 | G34 | Q16 |
| 1261 | G35 | Q16 |
| 1262 | G36 | Q16 |
| 1263 | G37 | Q16 |
| 1264 | G38 | Q16 |
| 1265 | G39 | Q16 |
| 1266 | G40 | Q16 |
| 1267 | G41 | Q16 |
| 1268 | G42 | Q16 |
| 1269 | G43 | Q16 |
| 1270 | G44 | Q16 |
| 1271 | G45 | Q16 |
| 1272 | G46 | Q16 |
| 1273 | G47 | Q16 |
| 1274 | G48 | Q16 |
| 1275 | G49 | Q16 |
| 1276 | G50 | Q16 |
| 1277 | G51 | Q16 |

-continued

| Ex. | [G+] | [X−] |
|---|---|---|
| 1278 | G52 | Q16 |
| 1279 | G53 | Q16 |
| 1280 | G54 | Q16 |
| 1281 | G55 | Q16 |
| 1282 | G56 | Q16 |
| 1283 | G57 | Q16 |
| 1284 | G58 | Q16 |
| 1285 | G59 | Q16 |
| 1286 | G60 | Q16 |
| 1287 | G61 | Q16 |
| 1288 | G62 | Q16 |
| 1289 | G63 | Q16 |
| 1290 | G64 | Q16 |
| 1291 | G65 | Q16 |
| 1292 | G66 | Q16 |
| 1293 | G67 | Q16 |
| 1294 | G68 | Q16 |
| 1295 | G69 | Q16 |
| 1296 | G70 | Q16 |
| 1297 | G71 | Q16 |
| 1298 | G72 | Q16 |
| 1299 | G73 | Q16 |
| 1300 | G74 | Q16 |
| 1301 | G75 | Q16 |
| 1302 | G76 | Q16 |
| 1303 | G77 | Q16 |
| 1304 | G78 | Q16 |
| 1305 | G79 | Q16 |
| 1306 | G80 | Q16 |
| 1307 | G81 | Q16 |
| 1308 | G82 | Q16 |
| 1309 | G83 | Q16 |
| 1310 | G84 | Q16 |
| 1311 | G85 | Q16 |
| 1312 | G86 | Q16 |
| 1313 | G87 | Q16 |
| 1314 | G1 | Q17 |
| 1315 | G2 | Q17 |
| 1316 | G3 | Q17 |
| 1317 | G4 | Q17 |
| 1318 | G5 | Q17 |
| 1319 | G6 | Q17 |
| 1320 | G7 | Q17 |
| 1321 | G8 | Q17 |
| 1322 | G9 | Q17 |
| 1323 | G10 | Q17 |
| 1324 | G11 | Q17 |
| 1325 | G12 | Q17 |
| 1326 | G13 | Q17 |
| 1327 | G14 | Q17 |
| 1328 | G15 | Q17 |
| 1329 | G16 | Q17 |
| 1330 | G17 | Q17 |
| 1331 | G18 | Q17 |
| 1332 | G19 | Q17 |
| 1333 | G20 | Q17 |
| 1334 | G21 | Q17 |
| 1335 | G22 | Q17 |
| 1336 | G23 | Q17 |
| 1337 | G24 | Q17 |
| 1338 | G25 | Q17 |
| 1339 | G26 | Q17 |
| 1340 | G27 | Q17 |
| 1341 | G28 | Q17 |
| 1342 | G29 | Q17 |
| 1343 | G30 | Q17 |
| 1344 | G31 | Q17 |
| 1345 | G32 | Q17 |
| 1346 | G33 | Q17 |
| 1347 | G34 | Q17 |
| 1348 | G35 | Q17 |
| 1349 | G36 | Q17 |
| 1350 | G37 | Q17 |
| 1351 | G38 | Q17 |
| 1352 | G39 | Q17 |
| 1353 | G40 | Q17 |
| 1354 | G41 | Q17 |

-continued

| Ex. | [G+] | [X−] |
|---|---|---|
| 1355 | G42 | Q17 |
| 1356 | G43 | Q17 |
| 1357 | G44 | Q17 |
| 1358 | G45 | Q17 |
| 1359 | G46 | Q17 |
| 1360 | G47 | Q17 |
| 1361 | G48 | Q17 |
| 1362 | G49 | Q17 |
| 1363 | G50 | Q17 |
| 1364 | G51 | Q17 |
| 1365 | G52 | Q17 |
| 1366 | G53 | Q17 |
| 1367 | G54 | Q17 |
| 1368 | G55 | Q17 |
| 1369 | G56 | Q17 |
| 1370 | G57 | Q17 |
| 1371 | G58 | Q17 |
| 1372 | G59 | Q17 |
| 1373 | G60 | Q17 |
| 1374 | G61 | Q17 |
| 1375 | G62 | Q17 |
| 1376 | G63 | Q17 |
| 1377 | G64 | Q17 |
| 1378 | G65 | Q17 |
| 1379 | G66 | Q17 |
| 1380 | G67 | Q17 |
| 1381 | G68 | Q17 |
| 1382 | G69 | Q17 |
| 1383 | G70 | Q17 |
| 1384 | G71 | Q17 |
| 1385 | G72 | Q17 |
| 1386 | G73 | Q17 |
| 1387 | G74 | Q17 |
| 1388 | G75 | Q17 |
| 1389 | G76 | Q17 |
| 1390 | G77 | Q17 |
| 1391 | G78 | Q17 |
| 1392 | G79 | Q17 |
| 1393 | G80 | Q17 |
| 1394 | G81 | Q17 |
| 1395 | G82 | Q17 |
| 1396 | G83 | Q17 |
| 1397 | G84 | Q17 |
| 1398 | G85 | Q17 |
| 1399 | G86 | Q17 |
| 1400 | G87 | Q17 |
| 1401 | G1 | Q18 |
| 1402 | G2 | Q18 |
| 1403 | G3 | Q18 |
| 1404 | G4 | Q18 |
| 1405 | G5 | Q18 |
| 1406 | G6 | Q18 |
| 1407 | G7 | Q18 |
| 1408 | G8 | Q18 |
| 1409 | G9 | Q18 |
| 1410 | G10 | Q18 |
| 1411 | G11 | Q18 |
| 1412 | G12 | Q18 |
| 1413 | G13 | Q18 |
| 1414 | G14 | Q18 |
| 1415 | G15 | Q18 |
| 1416 | G16 | Q18 |
| 1417 | G17 | Q18 |
| 1418 | G18 | Q18 |
| 1419 | G19 | Q18 |
| 1420 | G20 | Q18 |
| 1421 | G21 | Q18 |
| 1422 | G22 | Q18 |
| 1423 | G23 | Q18 |
| 1424 | G24 | Q18 |
| 1425 | G25 | Q18 |
| 1426 | G26 | Q18 |
| 1427 | G27 | Q18 |
| 1428 | G28 | Q18 |
| 1429 | G29 | Q18 |
| 1430 | G30 | Q18 |
| 1431 | G31 | Q18 |

| Ex. | [G+] | [X−] |
|---|---|---|
| 1432 | G32 | Q18 |
| 1433 | G33 | Q18 |
| 1434 | G34 | Q18 |
| 1435 | G35 | Q18 |
| 1436 | G36 | Q18 |
| 1437 | G37 | Q18 |
| 1438 | G38 | Q18 |
| 1439 | G39 | Q18 |
| 1440 | G40 | Q18 |
| 1441 | G41 | Q18 |
| 1442 | G42 | Q18 |
| 1443 | G43 | Q18 |
| 1444 | G44 | Q18 |
| 1445 | G45 | Q18 |
| 1446 | G46 | Q18 |
| 1447 | G47 | Q18 |
| 1448 | G48 | Q18 |
| 1449 | G49 | Q18 |
| 1450 | G50 | Q18 |
| 1451 | G51 | Q18 |
| 1452 | G52 | Q18 |
| 1453 | G53 | Q18 |
| 1454 | G54 | Q18 |
| 1455 | G55 | Q18 |
| 1456 | G56 | Q18 |
| 1457 | G57 | Q18 |
| 1458 | G58 | Q18 |
| 1459 | G59 | Q18 |
| 1460 | G60 | Q18 |
| 1461 | G61 | Q18 |
| 1462 | G62 | Q18 |
| 1463 | G63 | Q18 |
| 1464 | G64 | Q18 |
| 1465 | G65 | Q18 |
| 1466 | G66 | Q18 |
| 1467 | G67 | Q18 |
| 1468 | G68 | Q18 |
| 1469 | G69 | Q18 |
| 1470 | G70 | Q18 |
| 1471 | G71 | Q18 |
| 1472 | G72 | Q18 |
| 1473 | G73 | Q18 |
| 1474 | G74 | Q18 |
| 1475 | G75 | Q18 |
| 1476 | G76 | Q18 |
| 1477 | G77 | Q18 |
| 1478 | G78 | Q18 |
| 1479 | G79 | Q18 |
| 1480 | G80 | Q18 |
| 1481 | G81 | Q18 |
| 1482 | G82 | Q18 |
| 1483 | G83 | Q18 |
| 1484 | G84 | Q18 |
| 1485 | G85 | Q18 |
| 1486 | G86 | Q18 |
| 1487 | G87 | Q18 |
| 1488 | G1 | Q19 |
| 1489 | G2 | Q19 |
| 1490 | G3 | Q19 |
| 1491 | G4 | Q19 |
| 1492 | G5 | Q19 |
| 1493 | G6 | Q19 |
| 1494 | G7 | Q19 |
| 1495 | G8 | Q19 |
| 1496 | G9 | Q19 |
| 1497 | G10 | Q19 |
| 1498 | G11 | Q19 |
| 1499 | G12 | Q19 |
| 1500 | G13 | Q19 |
| 1501 | G14 | Q19 |
| 1502 | G15 | Q19 |
| 1503 | G16 | Q19 |
| 1504 | G17 | Q19 |
| 1505 | G18 | Q19 |
| 1506 | G19 | Q19 |
| 1507 | G20 | Q19 |
| 1508 | G21 | Q19 |
| 1509 | G22 | Q19 |
| 1510 | G23 | Q19 |
| 1511 | G24 | Q19 |
| 1512 | G25 | Q19 |
| 1513 | G26 | Q19 |
| 1514 | G27 | Q19 |
| 1515 | G28 | Q19 |
| 1516 | G29 | Q19 |
| 1517 | G30 | Q19 |
| 1518 | G31 | Q19 |
| 1519 | G32 | Q19 |
| 1520 | G33 | Q19 |
| 1521 | G34 | Q19 |
| 1522 | G35 | Q19 |
| 1523 | G36 | Q19 |
| 1524 | G37 | Q19 |
| 1525 | G38 | Q19 |
| 1526 | G39 | Q19 |
| 1527 | G40 | Q19 |
| 1528 | G41 | Q19 |
| 1529 | G42 | Q19 |
| 1530 | G43 | Q19 |
| 1531 | G44 | Q19 |
| 1532 | G45 | Q19 |
| 1533 | G46 | Q19 |
| 1534 | G47 | Q19 |
| 1535 | G48 | Q19 |
| 1536 | G49 | Q19 |
| 1537 | G50 | Q19 |
| 1538 | G51 | Q19 |
| 1539 | G52 | Q19 |
| 1540 | G53 | Q19 |
| 1541 | G54 | Q19 |
| 1542 | G55 | Q19 |
| 1543 | G56 | Q19 |
| 1544 | G57 | Q19 |
| 1545 | G58 | Q19 |
| 1546 | G59 | Q19 |
| 1547 | G60 | Q19 |
| 1548 | G61 | Q19 |
| 1549 | G62 | Q19 |
| 1550 | G63 | Q19 |
| 1551 | G64 | Q19 |
| 1552 | G65 | Q19 |
| 1553 | G66 | Q19 |
| 1554 | G67 | Q19 |
| 1555 | G68 | Q19 |
| 1556 | G69 | Q19 |
| 1557 | G70 | Q19 |
| 1558 | G71 | Q19 |
| 1559 | G72 | Q19 |
| 1560 | G73 | Q19 |
| 1561 | G74 | Q19 |
| 1562 | G75 | Q19 |
| 1563 | G76 | Q19 |
| 1564 | G77 | Q19 |
| 1565 | G78 | Q19 |
| 1566 | G79 | Q19 |
| 1567 | G80 | Q19 |
| 1568 | G81 | Q19 |
| 1569 | G82 | Q19 |
| 1570 | G83 | Q19 |
| 1571 | G84 | Q19 |
| 1572 | G85 | Q19 |
| 1573 | G86 | Q19 |
| 1574 | G87 | Q19 |
| 1575 | G2 | Q20 |
| 1576 | G3 | Q20 |
| 1577 | G4 | Q20 |
| 1578 | G5 | Q20 |
| 1579 | G6 | Q20 |
| 1580 | G7 | Q20 |
| 1581 | G8 | Q20 |
| 1582 | G9 | Q20 |
| 1583 | G10 | Q20 |
| 1584 | G12 | Q20 |
| 1585 | G13 | Q20 |

| Ex. | [G⁺] | [X⁻] |
|---|---|---|
| 1586 | G14 | Q20 |
| 1587 | G15 | Q20 |
| 1588 | G16 | Q20 |
| 1589 | G17 | Q20 |
| 1590 | G18 | Q20 |
| 1591 | G19 | Q20 |
| 1592 | G20 | Q20 |
| 1593 | G21 | Q20 |
| 1594 | G22 | Q20 |
| 1595 | G23 | Q20 |
| 1596 | G24 | Q20 |
| 1597 | G25 | Q20 |
| 1598 | G26 | Q20 |
| 1599 | G27 | Q20 |
| 1600 | G28 | Q20 |
| 1601 | G29 | Q20 |
| 1602 | G30 | Q20 |
| 1603 | G31 | Q20 |
| 1604 | G32 | Q20 |
| 1605 | G33 | Q20 |
| 1606 | G34 | Q20 |
| 1607 | G35 | Q20 |
| 1608 | G36 | Q20 |
| 1609 | G37 | Q20 |
| 1610 | G38 | Q20 |
| 1611 | G39 | Q20 |
| 1612 | G40 | Q20 |
| 1613 | G41 | Q20 |
| 1614 | G42 | Q20 |
| 1615 | G43 | Q20 |
| 1616 | G44 | Q20 |
| 1617 | G45 | Q20 |
| 1618 | G46 | Q20 |
| 1619 | G47 | Q20 |
| 1620 | G48 | Q20 |
| 1621 | G49 | Q20 |
| 1622 | G50 | Q20 |
| 1623 | G51 | Q20 |
| 1624 | G52 | Q20 |
| 1625 | G53 | Q20 |
| 1626 | G54 | Q20 |
| 1627 | G55 | Q20 |
| 1628 | G56 | Q20 |
| 1629 | G57 | Q20 |
| 1630 | G58 | Q20 |
| 1631 | G59 | Q20 |
| 1632 | G60 | Q20 |
| 1633 | G61 | Q20 |
| 1634 | G62 | Q20 |
| 1635 | G63 | Q20 |
| 1636 | G64 | Q20 |
| 1637 | G65 | Q20 |
| 1638 | G66 | Q20 |
| 1639 | G67 | Q20 |
| 1640 | G68 | Q20 |
| 1641 | G69 | Q20 |
| 1642 | G70 | Q20 |
| 1643 | G71 | Q20 |
| 1644 | G72 | Q20 |
| 1645 | G73 | Q20 |
| 1646 | G74 | Q20 |
| 1647 | G75 | Q20 |
| 1648 | G76 | Q20 |
| 1649 | G77 | Q20 |
| 1650 | G78 | Q20 |
| 1651 | G79 | Q20 |
| 1652 | G80 | Q20 |
| 1653 | G81 | Q20 |
| 1654 | G82 | Q20 |
| 1655 | G83 | Q20 |
| 1656 | G84 | Q20 |
| 1657 | G85 | Q20 |
| 1658 | G86 | Q20 |
| 1659 | G87 | Q20 |
| 1660 | G1 | Q21 |
| 1661 | G2 | Q21 |
| 1662 | G3 | Q21 |
| 1663 | G4 | Q21 |
| 1664 | G5 | Q21 |
| 1665 | G6 | Q21 |
| 1666 | G7 | Q21 |
| 1667 | G8 | Q21 |
| 1668 | G9 | Q21 |
| 1669 | G10 | Q21 |
| 1670 | G11 | Q21 |
| 1671 | G12 | Q21 |
| 1672 | G13 | Q21 |
| 1673 | G14 | Q21 |
| 1674 | G15 | Q21 |
| 1675 | G16 | Q21 |
| 1676 | G17 | Q21 |
| 1677 | G18 | Q21 |
| 1678 | G19 | Q21 |
| 1679 | G20 | Q21 |
| 1680 | G21 | Q21 |
| 1681 | G22 | Q21 |
| 1682 | G23 | Q21 |
| 1683 | G24 | Q21 |
| 1684 | G25 | Q21 |
| 1685 | G26 | Q21 |
| 1686 | G27 | Q21 |
| 1687 | G28 | Q21 |
| 1688 | G29 | Q21 |
| 1689 | G30 | Q21 |
| 1690 | G31 | Q21 |
| 1691 | G32 | Q21 |
| 1692 | G33 | Q21 |
| 1693 | G34 | Q21 |
| 1694 | G35 | Q21 |
| 1695 | G36 | Q21 |
| 1696 | G37 | Q21 |
| 1697 | G38 | Q21 |
| 1698 | G39 | Q21 |
| 1699 | G40 | Q21 |
| 1700 | G41 | Q21 |
| 1701 | G42 | Q21 |
| 1702 | G43 | Q21 |
| 1703 | G44 | Q21 |
| 1704 | G45 | Q21 |
| 1705 | G46 | Q21 |
| 1706 | G47 | Q21 |
| 1707 | G48 | Q21 |
| 1708 | G49 | Q21 |
| 1709 | G50 | Q21 |
| 1710 | G51 | Q21 |
| 1711 | G52 | Q21 |
| 1712 | G53 | Q21 |
| 1713 | G54 | Q21 |
| 1714 | G55 | Q21 |
| 1715 | G56 | Q21 |
| 1716 | G57 | Q21 |
| 1717 | G58 | Q21 |
| 1718 | G59 | Q21 |
| 1719 | G60 | Q21 |
| 1720 | G61 | Q21 |
| 1721 | G62 | Q21 |
| 1722 | G63 | Q21 |
| 1723 | G64 | Q21 |
| 1724 | G65 | Q21 |
| 1725 | G66 | Q21 |
| 1726 | G67 | Q21 |
| 1727 | G68 | Q21 |
| 1728 | G69 | Q21 |
| 1729 | G70 | Q21 |
| 1730 | G71 | Q21 |
| 1731 | G72 | Q21 |
| 1732 | G73 | Q21 |
| 1733 | G74 | Q21 |
| 1734 | G75 | Q21 |
| 1735 | G76 | Q21 |
| 1736 | G77 | Q21 |
| 1737 | G78 | Q21 |
| 1738 | G79 | Q21 |
| 1739 | G80 | Q21 |

-continued

| Ex. | [G⁺] | [X⁻] |
|---|---|---|
| 1740 | G81 | Q21 |
| 1741 | G82 | Q21 |
| 1742 | G83 | Q21 |
| 1743 | G84 | Q21 |
| 1744 | G85 | Q21 |
| 1745 | G86 | Q21 |
| 1746 | G87 | Q21 |
| 1747 | G1 | Q22 |
| 1748 | G2 | Q22 |
| 1749 | G3 | Q22 |
| 1750 | G4 | Q22 |
| 1751 | G5 | Q22 |
| 1752 | G6 | Q22 |
| 1753 | G7 | Q22 |
| 1754 | G8 | Q22 |
| 1755 | G9 | Q22 |
| 1756 | G10 | Q22 |
| 1757 | G11 | Q22 |
| 1758 | G12 | Q22 |
| 1759 | G13 | Q22 |
| 1760 | G14 | Q22 |
| 1761 | G15 | Q22 |
| 1762 | G16 | Q22 |
| 1763 | G17 | Q22 |
| 1764 | G18 | Q22 |
| 1765 | G19 | Q22 |
| 1766 | G20 | Q22 |
| 1767 | G21 | Q22 |
| 1768 | G22 | Q22 |
| 1769 | G23 | Q22 |
| 1770 | G24 | Q22 |
| 1771 | G25 | Q22 |
| 1772 | G26 | Q22 |
| 1773 | G27 | Q22 |
| 1774 | G28 | Q22 |
| 1775 | G29 | Q22 |
| 1776 | G30 | Q22 |
| 1777 | G31 | Q22 |
| 1778 | G32 | Q22 |
| 1779 | G33 | Q22 |
| 1780 | G34 | Q22 |
| 1781 | G35 | Q22 |
| 1782 | G36 | Q22 |
| 1783 | G37 | Q22 |
| 1784 | G38 | Q22 |
| 1785 | G39 | Q22 |
| 1786 | G40 | Q22 |
| 1787 | G41 | Q22 |
| 1788 | G42 | Q22 |
| 1789 | G43 | Q22 |
| 1790 | G44 | Q22 |
| 1791 | G45 | Q22 |
| 1792 | G46 | Q22 |
| 1793 | G47 | Q22 |
| 1794 | G48 | Q22 |
| 1795 | G49 | Q22 |
| 1796 | G50 | Q22 |
| 1797 | G51 | Q22 |
| 1798 | G52 | Q22 |
| 1799 | G53 | Q22 |
| 1800 | G54 | Q22 |
| 1801 | G55 | Q22 |
| 1802 | G56 | Q22 |
| 1803 | G57 | Q22 |
| 1804 | G58 | Q22 |
| 1805 | G59 | Q22 |
| 1806 | G60 | Q22 |
| 1807 | G61 | Q22 |
| 1808 | G62 | Q22 |
| 1809 | G63 | Q22 |
| 1810 | G64 | Q22 |
| 1811 | G65 | Q22 |
| 1812 | G66 | Q22 |
| 1813 | G67 | Q22 |
| 1814 | G68 | Q22 |
| 1815 | G69 | Q22 |
| 1816 | G70 | Q22 |

-continued

| Ex. | [G⁺] | [X⁻] |
|---|---|---|
| 1817 | G71 | Q22 |
| 1818 | G72 | Q22 |
| 1819 | G73 | Q22 |
| 1820 | G74 | Q22 |
| 1821 | G75 | Q22 |
| 1822 | G76 | Q22 |
| 1823 | G77 | Q22 |
| 1824 | G78 | Q22 |
| 1825 | G79 | Q22 |
| 1826 | G80 | Q22 |
| 1827 | G81 | Q22 |
| 1828 | G82 | Q22 |
| 1829 | G83 | Q22 |
| 1830 | G84 | Q22 |
| 1831 | G85 | Q22 |
| 1832 | G86 | Q22 |
| 1833 | G87 | Q22 |
| 1834 | G1 | Q23 |
| 1835 | G2 | Q23 |
| 1836 | G3 | Q23 |
| 1837 | G4 | Q23 |
| 1838 | G5 | Q23 |
| 1839 | G6 | Q23 |
| 1840 | G7 | Q23 |
| 1841 | G8 | Q23 |
| 1842 | G9 | Q23 |
| 1843 | G10 | Q23 |
| 1844 | G11 | Q23 |
| 1845 | G12 | Q23 |
| 1846 | G13 | Q23 |
| 1847 | G14 | Q23 |
| 1848 | G15 | Q23 |
| 1849 | G16 | Q23 |
| 1850 | G17 | Q23 |
| 1851 | G18 | Q23 |
| 1852 | G19 | Q23 |
| 1853 | G20 | Q23 |
| 1854 | G21 | Q23 |
| 1855 | G22 | Q23 |
| 1856 | G23 | Q23 |
| 1857 | G24 | Q23 |
| 1858 | G25 | Q23 |
| 1859 | G26 | Q23 |
| 1860 | G27 | Q23 |
| 1861 | G28 | Q23 |
| 1862 | G29 | Q23 |
| 1863 | G30 | Q23 |
| 1864 | G31 | Q23 |
| 1865 | G32 | Q23 |
| 1866 | G33 | Q23 |
| 1867 | G34 | Q23 |
| 1868 | G35 | Q23 |
| 1869 | G36 | Q23 |
| 1870 | G37 | Q23 |
| 1871 | G38 | Q23 |
| 1872 | G39 | Q23 |
| 1873 | G40 | Q23 |
| 1874 | G41 | Q23 |
| 1875 | G42 | Q23 |
| 1876 | G43 | Q23 |
| 1877 | G44 | Q23 |
| 1878 | G45 | Q23 |
| 1879 | G46 | Q23 |
| 1880 | G47 | Q23 |
| 1881 | G48 | Q23 |
| 1882 | G49 | Q23 |
| 1883 | G50 | Q23 |
| 1884 | G51 | Q23 |
| 1885 | G52 | Q23 |
| 1886 | G53 | Q23 |
| 1887 | G54 | Q23 |
| 1888 | G55 | Q23 |
| 1889 | G56 | Q23 |
| 1890 | G57 | Q23 |
| 1891 | G58 | Q23 |
| 1892 | G59 | Q23 |
| 1893 | G60 | Q23 |

-continued

| Ex. | [G⁺] | [X⁻] |
|---|---|---|
| 1894 | G61 | Q23 |
| 1895 | G62 | Q23 |
| 1896 | G63 | Q23 |
| 1897 | G64 | Q23 |
| 1898 | G65 | Q23 |
| 1899 | G66 | Q23 |
| 1900 | G67 | Q23 |
| 1901 | G68 | Q23 |
| 1902 | G69 | Q23 |
| 1903 | G70 | Q23 |
| 1904 | G71 | Q23 |
| 1905 | G72 | Q23 |
| 1906 | G73 | Q23 |
| 1907 | G74 | Q23 |
| 1908 | G75 | Q23 |
| 1909 | G76 | Q23 |
| 1910 | G77 | Q23 |
| 1911 | G78 | Q23 |
| 1912 | G79 | Q23 |
| 1913 | G80 | Q23 |
| 1914 | G81 | Q23 |
| 1915 | G82 | Q23 |
| 1916 | G83 | Q23 |
| 1917 | G84 | Q23 |
| 1918 | G85 | Q23 |
| 1919 | G86 | Q23 |
| 1920 | G87 | Q23 |
| 1921 | G1 | Q24 |
| 1922 | G2 | Q24 |
| 1923 | G3 | Q24 |
| 1924 | G4 | Q24 |
| 1925 | G5 | Q24 |
| 1926 | G6 | Q24 |
| 1927 | G7 | Q24 |
| 1928 | G8 | Q24 |
| 1929 | G9 | Q24 |
| 1930 | G10 | Q24 |
| 1931 | G11 | Q24 |
| 1932 | G12 | Q24 |
| 1933 | G13 | Q24 |
| 1934 | G14 | Q24 |
| 1935 | G15 | Q24 |
| 1936 | G16 | Q24 |
| 1937 | G17 | Q24 |
| 1938 | G18 | Q24 |
| 1939 | G19 | Q24 |
| 1940 | G20 | Q24 |
| 1941 | G21 | Q24 |
| 1942 | G22 | Q24 |
| 1943 | G23 | Q24 |
| 1944 | G24 | Q24 |
| 1945 | G25 | Q24 |
| 1946 | G26 | Q24 |
| 1947 | G27 | Q24 |
| 1948 | G28 | Q24 |
| 1949 | G29 | Q24 |
| 1950 | G30 | Q24 |
| 1951 | G31 | Q24 |
| 1952 | G32 | Q24 |
| 1953 | G33 | Q24 |
| 1954 | G34 | Q24 |
| 1955 | G35 | Q24 |
| 1956 | G36 | Q24 |
| 1957 | G37 | Q24 |
| 1958 | G38 | Q24 |
| 1959 | G39 | Q24 |
| 1960 | G40 | Q24 |
| 1961 | G41 | Q24 |
| 1962 | G42 | Q24 |
| 1963 | G43 | Q24 |
| 1964 | G44 | Q24 |
| 1965 | G45 | Q24 |
| 1966 | G46 | Q24 |
| 1967 | G47 | Q24 |
| 1968 | G48 | Q24 |
| 1969 | G49 | Q24 |
| 1970 | G50 | Q24 |

-continued

| Ex. | [G⁺] | [X⁻] |
|---|---|---|
| 1971 | G51 | Q24 |
| 1972 | G52 | Q24 |
| 1973 | G53 | Q24 |
| 1974 | G54 | Q24 |
| 1975 | G55 | Q24 |
| 1976 | G56 | Q24 |
| 1977 | G57 | Q24 |
| 1978 | G58 | Q24 |
| 1979 | G59 | Q24 |
| 1980 | G60 | Q24 |
| 1981 | G61 | Q24 |
| 1982 | G62 | Q24 |
| 1983 | G63 | Q24 |
| 1984 | G64 | Q24 |
| 1985 | G65 | Q24 |
| 1986 | G66 | Q24 |
| 1987 | G67 | Q24 |
| 1988 | G68 | Q24 |
| 1989 | G69 | Q24 |
| 1990 | G70 | Q24 |
| 1991 | G71 | Q24 |
| 1992 | G72 | Q24 |
| 1993 | G73 | Q24 |
| 1994 | G74 | Q24 |
| 1995 | G75 | Q24 |
| 1996 | G76 | Q24 |
| 1997 | G77 | Q24 |
| 1998 | G78 | Q24 |
| 1999 | G79 | Q24 |
| 2000 | G80 | Q24 |
| 2001 | G81 | Q24 |
| 2002 | G82 | Q24 |
| 2003 | G83 | Q24 |
| 2004 | G84 | Q24 |
| 2005 | G85 | Q24 |
| 2006 | G86 | Q24 |
| 2007 | G87 | Q24 |
| 2008 | G1 | Q25 |
| 2009 | G2 | Q25 |
| 2010 | G3 | Q25 |
| 2011 | G4 | Q25 |
| 2012 | G5 | Q25 |
| 2013 | G6 | Q25 |
| 2014 | G7 | Q25 |
| 2015 | G8 | Q25 |
| 2016 | G9 | Q25 |
| 2017 | G10 | Q25 |
| 2018 | G11 | Q25 |
| 2019 | G12 | Q25 |
| 2020 | G13 | Q25 |
| 2021 | G14 | Q25 |
| 2022 | G15 | Q25 |
| 2023 | G16 | Q25 |
| 2024 | G17 | Q25 |
| 2025 | G18 | Q25 |
| 2026 | G19 | Q25 |
| 2027 | G20 | Q25 |
| 2028 | G21 | Q25 |
| 2029 | G22 | Q25 |
| 2030 | G23 | Q25 |
| 2031 | G24 | Q25 |
| 2032 | G25 | Q25 |
| 2033 | G26 | Q25 |
| 2034 | G27 | Q25 |
| 2035 | G28 | Q25 |
| 2036 | G29 | Q25 |
| 2037 | G30 | Q25 |
| 2038 | G31 | Q25 |
| 2039 | G32 | Q25 |
| 2040 | G33 | Q25 |
| 2041 | G34 | Q25 |
| 2042 | G35 | Q25 |
| 2043 | G36 | Q25 |
| 2044 | G37 | Q25 |
| 2045 | G38 | Q25 |
| 2046 | G39 | Q25 |
| 2047 | G40 | Q25 |

| Ex. | [G$^+$] | [X$^-$] |
|---|---|---|
| 2048 | G41 | Q25 |
| 2049 | G42 | Q25 |
| 2050 | G43 | Q25 |
| 2051 | G44 | Q25 |
| 2052 | G45 | Q25 |
| 2053 | G46 | Q25 |
| 2054 | G47 | Q25 |
| 2055 | G48 | Q25 |
| 2056 | G49 | Q25 |
| 2057 | G50 | Q25 |
| 2058 | G51 | Q25 |
| 2059 | G52 | Q25 |
| 2060 | G53 | Q25 |
| 2061 | G54 | Q25 |
| 2062 | G55 | Q25 |
| 2063 | G56 | Q25 |
| 2064 | G57 | Q25 |
| 2065 | G58 | Q25 |
| 2066 | G59 | Q25 |
| 2067 | G60 | Q25 |
| 2068 | G61 | Q25 |
| 2069 | G62 | Q25 |
| 2070 | G63 | Q25 |
| 2071 | G64 | Q25 |
| 2072 | G65 | Q25 |
| 2073 | G66 | Q25 |
| 2074 | G67 | Q25 |
| 2075 | G68 | Q25 |
| 2076 | G69 | Q25 |
| 2077 | G70 | Q25 |
| 2078 | G71 | Q25 |
| 2079 | G72 | Q25 |
| 2080 | G73 | Q25 |
| 2081 | G74 | Q25 |
| 2082 | G75 | Q25 |
| 2083 | G76 | Q25 |
| 2084 | G77 | Q25 |
| 2085 | G78 | Q25 |
| 2086 | G79 | Q25 |
| 2087 | G80 | Q25 |
| 2088 | G81 | Q25 |
| 2089 | G82 | Q25 |
| 2090 | G83 | Q25 |
| 2091 | G84 | Q25 |
| 2092 | G85 | Q25 |
| 2093 | G86 | Q25 |
| 2094 | G87 | Q25 |

EXAMPLES 2095–2442

The procedure is as in Examples 7–9, but the following compounds of formula [G$^+$]·[X$^{m-}$]$_p$·[Y$^{n+}$]$_q$ (XI), which can be prepared analogously to Examples 1–6, are used:

| Ex. | G$^+$ | X$^{m-}$ | p | Y$^{n+}$ | q |
|---|---|---|---|---|---|
| 2095 | G1 | Q1 | ½ | | 0 |
| 2096 | G2 | Q1 | ½ | | 0 |
| 2097 | G3 | Q1 | ½ | | 0 |
| 2098 | G4 | Q1 | ½ | | 0 |
| 2099 | G5 | Q1 | ½ | | 0 |
| 2100 | G6 | Q1 | ½ | | 0 |
| 2101 | G7 | Q1 | ½ | | 0 |
| 2102 | G8 | Q1 | ½ | | 0 |
| 2103 | G9 | Q1 | ½ | | 0 |
| 2104 | G10 | Q1 | ½ | | 0 |
| 2105 | G11 | Q1 | ½ | | 0 |
| 2106 | G12 | Q1 | ½ | | 0 |
| 2107 | G13 | Q1 | ½ | | 0 |
| 2108 | G14 | Q1 | ½ | | 0 |
| 2109 | G15 | Q1 | ½ | | 0 |
| 2110 | G16 | Q1 | ½ | | 0 |
| 2111 | G17 | Q1 | ½ | | 0 |
| 2112 | G18 | Q1 | ½ | | 0 |
| 2113 | G19 | Q1 | ½ | | 0 |
| 2114 | G20 | Q1 | ½ | | 0 |
| 2115 | G21 | Q1 | ½ | | 0 |
| 2116 | G22 | Q1 | ½ | | 0 |
| 2117 | G23 | Q1 | ½ | | 0 |
| 2118 | G24 | Q1 | ½ | | 0 |
| 2119 | G25 | Q1 | ½ | | 0 |
| 2120 | G26 | Q1 | ½ | | 0 |
| 2121 | G27 | Q1 | ½ | | 0 |
| 2122 | G28 | Q1 | ½ | | 0 |
| 2123 | G29 | Q1 | ½ | | 0 |
| 2124 | G30 | Q1 | ½ | | 0 |
| 2125 | G31 | Q1 | ½ | | 0 |
| 2126 | G32 | Q1 | ½ | | 0 |
| 2127 | G33 | Q1 | ½ | | 0 |
| 2128 | G34 | Q1 | ½ | | 0 |
| 2129 | G35 | Q1 | ½ | | 0 |
| 2130 | G36 | Q1 | ½ | | 0 |
| 2131 | G37 | Q1 | ½ | | 0 |
| 2132 | G38 | Q1 | ½ | | 0 |
| 2133 | G39 | Q1 | ½ | | 0 |
| 2134 | G40 | Q1 | ½ | | 0 |
| 2135 | G41 | Q1 | ½ | | 0 |
| 2136 | G42 | Q1 | ½ | | 0 |
| 2137 | G43 | Q1 | ½ | | 0 |
| 2138 | G44 | Q1 | ½ | | 0 |
| 2139 | G45 | Q1 | ½ | | 0 |
| 2140 | G46 | Q1 | ½ | | 0 |
| 2141 | G47 | Q1 | ½ | | 0 |
| 2142 | G48 | Q1 | ½ | | 0 |
| 2143 | G49 | Q1 | ½ | | 0 |
| 2144 | G50 | Q1 | ½ | | 0 |
| 2145 | G51 | Q1 | ½ | | 0 |
| 2146 | G52 | Q1 | ½ | | 0 |
| 2147 | G53 | Q1 | ½ | | 0 |
| 2148 | G54 | Q1 | ½ | | 0 |
| 2149 | G55 | Q1 | ½ | | 0 |
| 2150 | G56 | Q1 | ½ | | 0 |
| 2151 | G57 | Q1 | ½ | | 0 |
| 2152 | G58 | Q1 | ½ | | 0 |
| 2153 | G59 | Q1 | ½ | | 0 |
| 2154 | G60 | Q1 | ½ | | 0 |
| 2155 | G61 | Q1 | ½ | | 0 |
| 2156 | G62 | Q1 | ½ | | 0 |
| 2157 | G63 | Q1 | ½ | | 0 |
| 2158 | G64 | Q1 | ½ | | 0 |
| 2159 | G65 | Q1 | ½ | | 0 |
| 2160 | G66 | Q1 | ½ | | 0 |
| 2161 | G67 | Q1 | ½ | | 0 |
| 2162 | G68 | Q1 | ½ | | 0 |
| 2163 | G69 | Q1 | ½ | | 0 |
| 2164 | G70 | Q1 | ½ | | 0 |
| 2165 | G71 | Q1 | ½ | | 0 |
| 2166 | G72 | Q1 | ½ | | 0 |
| 2167 | G73 | Q1 | ½ | | 0 |
| 2168 | G74 | Q1 | ½ | | 0 |
| 2169 | G75 | Q1 | ½ | | 0 |
| 2170 | G76 | Q1 | ½ | | 0 |
| 2171 | G77 | Q1 | ½ | | 0 |
| 2172 | G78 | Q1 | ½ | | 0 |
| 2173 | G79 | Q1 | ½ | | 0 |
| 2174 | G80 | Q1 | ½ | | 0 |
| 2175 | G81 | Q1 | ½ | | 0 |
| 2176 | G82 | Q1 | ½ | | 0 |
| 2177 | G83 | Q1 | ½ | | 0 |
| 2178 | G84 | Q1 | ½ | | 0 |
| 2179 | G85 | Q1 | ½ | | 0 |
| 2180 | G86 | Q1 | ½ | | 0 |
| 2181 | G87 | Q1 | ½ | | 0 |
| 2182 | G1 | Q26 | ½ | | 0 |
| 2183 | G2 | Q26 | ½ | | 0 |
| 2184 | G3 | Q26 | ½ | | 0 |
| 2185 | G4 | Q26 | ½ | | 0 |
| 2186 | G5 | Q26 | ½ | | 0 |

-continued

| Ex. | G+ | X^m− | p | Y^n+ | q |
|---|---|---|---|---|---|
| 2187 | G6 | Q26 | ½ | | 0 |
| 2188 | G7 | Q26 | ½ | | 0 |
| 2189 | G8 | Q26 | ½ | | 0 |
| 2190 | G9 | Q26 | ½ | | 0 |
| 2191 | G10 | Q26 | ½ | | 0 |
| 2192 | G11 | Q26 | ½ | | 0 |
| 2193 | G12 | Q26 | ½ | | 0 |
| 2194 | G13 | Q26 | ½ | | 0 |
| 2195 | G14 | Q26 | ½ | | 0 |
| 2196 | G15 | Q26 | ½ | | 0 |
| 2197 | G16 | Q26 | ½ | | 0 |
| 2198 | G17 | Q26 | ½ | | 0 |
| 2199 | G18 | Q26 | ½ | | 0 |
| 2200 | G19 | Q26 | ½ | | 0 |
| 2201 | G20 | Q26 | ½ | | 0 |
| 2202 | G21 | Q26 | ½ | | 0 |
| 2203 | G22 | Q26 | ½ | | 0 |
| 2204 | G23 | Q26 | ½ | | 0 |
| 2205 | G24 | Q26 | ½ | | 0 |
| 2206 | G25 | Q26 | ½ | | 0 |
| 2207 | G26 | Q26 | ½ | | 0 |
| 2208 | G27 | Q26 | ½ | | 0 |
| 2209 | G28 | Q26 | ½ | | 0 |
| 2210 | G29 | Q26 | ½ | | 0 |
| 2211 | G30 | Q26 | ½ | | 0 |
| 2212 | G31 | Q26 | ½ | | 0 |
| 2213 | G32 | Q26 | ½ | | 0 |
| 2214 | G33 | Q26 | ½ | | 0 |
| 2215 | G34 | Q26 | ½ | | 0 |
| 2216 | G35 | Q26 | ½ | | 0 |
| 2217 | G36 | Q26 | ½ | | 0 |
| 2218 | G37 | Q26 | ½ | | 0 |
| 2219 | G38 | Q26 | ½ | | 0 |
| 2220 | G39 | Q26 | ½ | | 0 |
| 2221 | G40 | Q26 | ½ | | 0 |
| 2222 | G41 | Q26 | ½ | | 0 |
| 2223 | G42 | Q26 | ½ | | 0 |
| 2224 | G43 | Q26 | ½ | | 0 |
| 2225 | G44 | Q26 | ½ | | 0 |
| 2226 | G45 | Q26 | ½ | | 0 |
| 2227 | G46 | Q26 | ½ | | 0 |
| 2228 | G47 | Q26 | ½ | | 0 |
| 2229 | G48 | Q26 | ½ | | 0 |
| 2230 | G49 | Q26 | ½ | | 0 |
| 2231 | G50 | Q26 | ½ | | 0 |
| 2232 | G51 | Q26 | ½ | | 0 |
| 2233 | G52 | Q26 | ½ | | 0 |
| 2234 | G53 | Q26 | ½ | | 0 |
| 2235 | G54 | Q26 | ½ | | 0 |
| 2236 | G55 | Q26 | ½ | | 0 |
| 2237 | G56 | Q26 | ½ | | 0 |
| 2238 | G57 | Q26 | ½ | | 0 |
| 2239 | G58 | Q26 | ½ | | 0 |
| 2240 | G59 | Q26 | ½ | | 0 |
| 2241 | G60 | Q26 | ½ | | 0 |
| 2242 | G61 | Q26 | ½ | | 0 |
| 2243 | G62 | Q26 | ½ | | 0 |
| 2244 | G63 | Q26 | ½ | | 0 |
| 2245 | G64 | Q26 | ½ | | 0 |
| 2246 | G65 | Q26 | ½ | | 0 |
| 2247 | G66 | Q26 | ½ | | 0 |
| 2248 | G67 | Q26 | ½ | | 0 |
| 2249 | G68 | Q26 | ½ | | 0 |
| 2250 | G69 | Q26 | ½ | | 0 |
| 2251 | G70 | Q26 | ½ | | 0 |
| 2252 | G71 | Q26 | ½ | | 0 |
| 2253 | G72 | Q26 | ½ | | 0 |
| 2254 | G73 | Q26 | ½ | | 0 |
| 2255 | G74 | Q26 | ½ | | 0 |
| 2256 | G75 | Q26 | ½ | | 0 |
| 2257 | G76 | Q26 | ½ | | 0 |
| 2258 | G77 | Q26 | ½ | | 0 |
| 2259 | G78 | Q26 | ½ | | 0 |
| 2260 | G79 | Q26 | ½ | | 0 |
| 2261 | G80 | Q26 | ½ | | 0 |
| 2262 | G81 | Q26 | ½ | | 0 |
| 2263 | G82 | Q26 | ½ | | 0 |
| 2264 | G83 | Q26 | ½ | | 0 |
| 2265 | G84 | Q26 | ½ | | 0 |
| 2266 | G85 | Q26 | ½ | | 0 |
| 2267 | G86 | Q26 | ½ | | 0 |
| 2268 | G87 | Q26 | ½ | | 0 |
| 2269 | G1 | Q1 | 1 | $NH_4^+$ | 1 |
| 2270 | G2 | Q1 | 1 | $NH_4^+$ | 1 |
| 2271 | G3 | Q1 | 1 | $NH_4^+$ | 1 |
| 2272 | G4 | Q1 | 1 | $NH_4^+$ | 1 |
| 2273 | G5 | Q1 | 1 | $NH_4^+$ | 1 |
| 2274 | G6 | Q1 | 1 | $NH_4^+$ | 1 |
| 2275 | G7 | Q1 | 1 | $NH_4^+$ | 1 |
| 2276 | G8 | Q1 | 1 | $NH_4^+$ | 1 |
| 2277 | G9 | Q1 | 1 | $NH_4^+$ | 1 |
| 2278 | G10 | Q1 | 1 | $NH_4^+$ | 1 |
| 2279 | G11 | Q1 | 1 | $NH_4^+$ | 1 |
| 2280 | G12 | Q1 | 1 | $NH_4^+$ | 1 |
| 2281 | G13 | Q1 | 1 | $NH_4^+$ | 1 |
| 2282 | G14 | Q1 | 1 | $NH_4^+$ | 1 |
| 2283 | G15 | Q1 | 1 | $NH_4^+$ | 1 |
| 2284 | G16 | Q1 | 1 | $NH_4^+$ | 1 |
| 2285 | G17 | Q1 | 1 | $NH_4^+$ | 1 |
| 2286 | G18 | Q1 | 1 | $NH_4^+$ | 1 |
| 2287 | G19 | Q1 | 1 | $NH_4^+$ | 1 |
| 2288 | G20 | Q1 | 1 | $NH_4^+$ | 1 |
| 2289 | G21 | Q1 | 1 | $NH_4^+$ | 1 |
| 2290 | G22 | Q1 | 1 | $NH_4^+$ | 1 |
| 2291 | G23 | Q1 | 1 | $NH_4^+$ | 1 |
| 2292 | G24 | Q1 | 1 | $NH_4^+$ | 1 |
| 2293 | G25 | Q1 | 1 | $NH_4^+$ | 1 |
| 2294 | G26 | Q1 | 1 | $NH_4^+$ | 1 |
| 2295 | G27 | Q1 | 1 | $NH_4^+$ | 1 |
| 2296 | G28 | Q1 | 1 | $NH_4^+$ | 1 |
| 2297 | G29 | Q1 | 1 | $NH_4^+$ | 1 |
| 2298 | G30 | Q1 | 1 | $NH_4^+$ | 1 |
| 2299 | G31 | Q1 | 1 | $NH_4^+$ | 1 |
| 2300 | G32 | Q1 | 1 | $NH_4^+$ | 1 |
| 2301 | G33 | Q1 | 1 | $NH_4^+$ | 1 |
| 2302 | G34 | Q1 | 1 | $NH_4^+$ | 1 |
| 2303 | G35 | Q1 | 1 | $NH_4^+$ | 1 |
| 2304 | G36 | Q1 | 1 | $NH_4^+$ | 1 |
| 2305 | G37 | Q1 | 1 | $NH_4^+$ | 1 |
| 2306 | G38 | Q1 | 1 | $NH_4^+$ | 1 |
| 2307 | G39 | Q1 | 1 | $NH_4^+$ | 1 |
| 2308 | G40 | Q1 | 1 | $NH_4^+$ | 1 |
| 2309 | G41 | Q1 | 1 | $NH_4^+$ | 1 |
| 2310 | G42 | Q1 | 1 | $NH_4^+$ | 1 |
| 2311 | G43 | Q1 | 1 | $NH_4^+$ | 1 |
| 2312 | G44 | Q1 | 1 | $NH_4^+$ | 1 |
| 2313 | G45 | Q1 | 1 | $NH_4^+$ | 1 |
| 2314 | G46 | Q1 | 1 | $NH_4^+$ | 1 |
| 2315 | G47 | Q1 | 1 | $NH_4^+$ | 1 |
| 2316 | G48 | Q1 | 1 | $NH_4^+$ | 1 |
| 2317 | G49 | Q1 | 1 | $NH_4^+$ | 1 |
| 2318 | G50 | Q1 | 1 | $NH_4^+$ | 1 |
| 2319 | G51 | Q1 | 1 | $NH_4^+$ | 1 |
| 2320 | G52 | Q1 | 1 | $NH_4^+$ | 1 |
| 2321 | G53 | Q1 | 1 | $NH_4^+$ | 1 |
| 2322 | G54 | Q1 | 1 | $NH_4^+$ | 1 |
| 2323 | G55 | Q1 | 1 | $NH_4^+$ | 1 |
| 2324 | G56 | Q1 | 1 | $NH_4^+$ | 1 |
| 2325 | G57 | Q1 | 1 | $NH_4^+$ | 1 |
| 2326 | G58 | Q1 | 1 | $NH_4^+$ | 1 |
| 2327 | G59 | Q1 | 1 | $NH_4^+$ | 1 |
| 2328 | G60 | Q1 | 1 | $NH_4^+$ | 1 |
| 2329 | G61 | Q1 | 1 | $NH_4^+$ | 1 |
| 2330 | G62 | Q1 | 1 | $NH_4^+$ | 1 |
| 2331 | G63 | Q1 | 1 | $NH_4^+$ | 1 |
| 2332 | G64 | Q1 | 1 | $NH_4^+$ | 1 |
| 2333 | G65 | Q1 | 1 | $NH_4^+$ | 1 |
| 2334 | G66 | Q1 | 1 | $NH_4^+$ | 1 |
| 2335 | G67 | Q1 | 1 | $NH_4^+$ | 1 |
| 2336 | G68 | Q1 | 1 | $NH_4^+$ | 1 |
| 2337 | G69 | Q1 | 1 | $NH_4^+$ | 1 |
| 2338 | G70 | Q1 | 1 | $NH_4^+$ | 1 |
| 2339 | G71 | Q1 | 1 | $NH_4^+$ | 1 |
| 2340 | G72 | Q1 | 1 | $NH_4^+$ | 1 |

-continued

| Ex. | G+ | X^{m−} | p | Y^{n+} | q |
|---|---|---|---|---|---|
| 2341 | G73 | Q1 | 1 | $NH_4^+$ | 1 |
| 2342 | G74 | Q1 | 1 | $NH_4^+$ | 1 |
| 2343 | G75 | Q1 | 1 | $NH_4^+$ | 1 |
| 2344 | G76 | Q1 | 1 | $NH_4^+$ | 1 |
| 2345 | G77 | Q1 | 1 | $NH_4^+$ | 1 |
| 2346 | G78 | Q1 | 1 | $NH_4^+$ | 1 |
| 2347 | G79 | Q1 | 1 | $NH_4^+$ | 1 |
| 2348 | G80 | Q1 | 1 | $NH_4^+$ | 1 |
| 2349 | G81 | Q1 | 1 | $NH_4^+$ | 1 |
| 2350 | G82 | Q1 | 1 | $NH_4^+$ | 1 |
| 2351 | G83 | Q1 | 1 | $NH_4^+$ | 1 |
| 2352 | G84 | Q1 | 1 | $NH_4^+$ | 1 |
| 2353 | G85 | Q1 | 1 | $NH_4^+$ | 1 |
| 2354 | G86 | Q1 | 1 | $NH_4^+$ | 1 |
| 2355 | G87 | Q1 | 1 | $NH_4^+$ | 1 |
| 2356 | G1 | Q26 | 1 | $NH_4^+$ | 1 |
| 2357 | G2 | Q26 | 1 | $NH_4^+$ | 1 |
| 2358 | G3 | Q26 | 1 | $NH_4^+$ | 1 |
| 2359 | G4 | Q26 | 1 | $NH_4^+$ | 1 |
| 2360 | G5 | Q26 | 1 | $NH_4^+$ | 1 |
| 2361 | G6 | Q26 | 1 | $NH_4^+$ | 1 |
| 2362 | G7 | Q26 | 1 | $NH_4^+$ | 1 |
| 2363 | G8 | Q26 | 1 | $NH_4^+$ | 1 |
| 2364 | G9 | Q26 | 1 | $NH_4^+$ | 1 |
| 2365 | G10 | Q26 | 1 | $NH_4^+$ | 1 |
| 2366 | G11 | Q26 | 1 | $NH_4^+$ | 1 |
| 2367 | G12 | Q26 | 1 | $NH_4^+$ | 1 |
| 2368 | G13 | Q26 | 1 | $NH_4^+$ | 1 |
| 2369 | G14 | Q26 | 1 | $NH_4^+$ | 1 |
| 2370 | G15 | Q26 | 1 | $NH_4^+$ | 1 |
| 2371 | G16 | Q26 | 1 | $NH_4^+$ | 1 |
| 2372 | G17 | Q26 | 1 | $NH_4^+$ | 1 |
| 2373 | G18 | Q26 | 1 | $NH_4^+$ | 1 |
| 2374 | G19 | Q26 | 1 | $NH_4^+$ | 1 |
| 2375 | G20 | Q26 | 1 | $NH_4^+$ | 1 |
| 2376 | G21 | Q26 | 1 | $NH_4^+$ | 1 |
| 2377 | G22 | Q26 | 1 | $NH_4^+$ | 1 |
| 2378 | G23 | Q26 | 1 | $NH_4^+$ | 1 |
| 2379 | G24 | Q26 | 1 | $NH_4^+$ | 1 |
| 2380 | G25 | Q26 | 1 | $NH_4^+$ | 1 |
| 2381 | G26 | Q26 | 1 | $NH_4^+$ | 1 |
| 2382 | G27 | Q26 | 1 | $NH_4^+$ | 1 |
| 2383 | G28 | Q26 | 1 | $NH_4^+$ | 1 |
| 2384 | G29 | Q26 | 1 | $NH_4^+$ | 1 |
| 2385 | G30 | Q26 | 1 | $NH_4^+$ | 1 |
| 2386 | G31 | Q26 | 1 | $NH_4^+$ | 1 |
| 2387 | G32 | Q26 | 1 | $NH_4^+$ | 1 |
| 2388 | G33 | Q26 | 1 | $NH_4^+$ | 1 |
| 2389 | G34 | Q26 | 1 | $NH_4^+$ | 1 |
| 2390 | G35 | Q26 | 1 | $NH_4^+$ | 1 |
| 2391 | G36 | Q26 | 1 | $NH_4^+$ | 1 |
| 2392 | G37 | Q26 | 1 | $NH_4^+$ | 1 |
| 2393 | G38 | Q26 | 1 | $NH_4^+$ | 1 |
| 2394 | G39 | Q26 | 1 | $NH_4^+$ | 1 |
| 2395 | G40 | Q26 | 1 | $NH_4^+$ | 1 |
| 2396 | G41 | Q26 | 1 | $NH_4^+$ | 1 |
| 2397 | G42 | Q26 | 1 | $NH_4^+$ | 1 |
| 2398 | G43 | Q26 | 1 | $NH_4^+$ | 1 |
| 2399 | G44 | Q26 | 1 | $NH_4^+$ | 1 |
| 2400 | G45 | Q26 | 1 | $NH_4^+$ | 1 |
| 2401 | G46 | Q26 | 1 | $NH_4^+$ | 1 |
| 2402 | G47 | Q26 | 1 | $NH_4^+$ | 1 |
| 2403 | G48 | Q26 | 1 | $NH_4^+$ | 1 |
| 2404 | G49 | Q26 | 1 | $NH_4^+$ | 1 |
| 2405 | G50 | Q26 | 1 | $NH_4^+$ | 1 |
| 2406 | G51 | Q26 | 1 | $NH_4^+$ | 1 |
| 2407 | G52 | Q26 | 1 | $NH_4^+$ | 1 |
| 2408 | G53 | Q26 | 1 | $NH_4^+$ | 1 |
| 2409 | G54 | Q26 | 1 | $NH_4^+$ | 1 |
| 2410 | G55 | Q26 | 1 | $NH_4^+$ | 1 |
| 2411 | G56 | Q26 | 1 | $NH_4^+$ | 1 |
| 2412 | G57 | Q26 | 1 | $NH_4^+$ | 1 |
| 2413 | G58 | Q26 | 1 | $NH_4^+$ | 1 |
| 2414 | G59 | Q26 | 1 | $NH_4^+$ | 1 |
| 2415 | G60 | Q26 | 1 | $NH_4^+$ | 1 |
| 2416 | G61 | Q26 | 1 | $NH_4^+$ | 1 |
| 2417 | G62 | Q26 | 1 | $NH_4^+$ | 1 |
| 2418 | G63 | Q26 | 1 | $NH_4^+$ | 1 |
| 2419 | G64 | Q26 | 1 | $NH_4^+$ | 1 |
| 2420 | G65 | Q26 | 1 | $NH_4^+$ | 1 |
| 2421 | G66 | Q26 | 1 | $NH_4^+$ | 1 |
| 2422 | G67 | Q26 | 1 | $NH_4^+$ | 1 |
| 2423 | G68 | Q26 | 1 | $NH_4^+$ | 1 |
| 2424 | G69 | Q26 | 1 | $NH_4^+$ | 1 |
| 2425 | G70 | Q26 | 1 | $NH_4^+$ | 1 |
| 2426 | G71 | Q26 | 1 | $NH_4^+$ | 1 |
| 2427 | G72 | Q26 | 1 | $NH_4^+$ | 1 |
| 2428 | G73 | Q26 | 1 | $NH_4^+$ | 1 |
| 2429 | G74 | Q26 | 1 | $NH_4^+$ | 1 |
| 2430 | G75 | Q26 | 1 | $NH_4^+$ | 1 |
| 2431 | G76 | Q26 | 1 | $NH_4^+$ | 1 |
| 2432 | G77 | Q26 | 1 | $NH_4^+$ | 1 |
| 2433 | G78 | Q26 | 1 | $NH_4^+$ | 1 |
| 2434 | G79 | Q26 | 1 | $NH_4^+$ | 1 |
| 2435 | G80 | Q26 | 1 | $NH_4^+$ | 1 |
| 2436 | G81 | Q26 | 1 | $NH_4^+$ | 1 |
| 2437 | G82 | Q26 | 1 | $NH_4^+$ | 1 |
| 2438 | G83 | Q26 | 1 | $NH_4^+$ | 1 |
| 2439 | G84 | Q26 | 1 | $NH_4^+$ | 1 |
| 2440 | G85 | Q26 | 1 | $NH_4^+$ | 1 |
| 2441 | G86 | Q26 | 1 | $NH_4^+$ | 1 |
| 2442 | G87 | Q26 | 1 | $NH_4^+$ | 1 |

EXAMPLE 2443

The procedure is as in Examples 7–9, but the product of formula G89 according to Example 4 is used together with 20% by weight (based on the product according to Example G89) of the product of formula

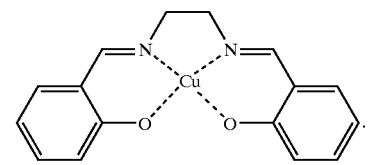

EXAMPLE 2444

The procedure is as in Example 2443, but the product of formula G89 according to Example 4 is used together with 20% by weight (based on the product according to Example G89) of the product of formula

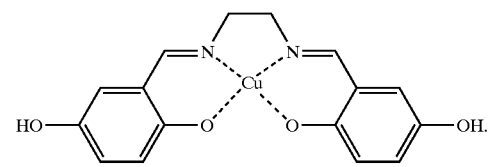

EXAMPLE 2445

The procedure is as in Example 2443, but the product of formula G89 according to Example 4 is used together with 20% by weight (based on the product according to Example G89) of the product of formula

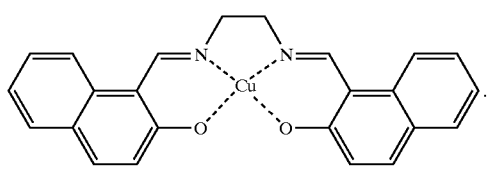

EXAMPLE 2446

The procedure is as in Example 2443, but the product of formula G89 according to Example 4 is used together with 20% by weight (based on the product according to Example G89) of the product of formula

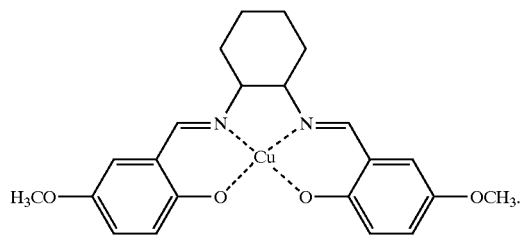

EXAMPLE 2447

The procedure is as in Example 2443, but the product of formula G89 according to Example 4 is used together with 20% by weight (based on the product according to Example G89) of the product of formula

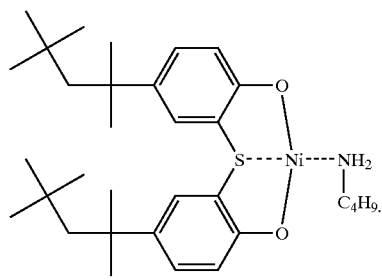

EXAMPLES 2448–2452

The procedure is as in Examples 2443–2447, but the product of formula G90 according to Example 5 is used instead of the product of formula G89 according to Example 4.

EXAMPLE 2453

12.1 g of N-ethylaniline are stirred in 22 ml of 2-chloropropionic acid ethyl ester in the presence of 10.6 ml of sodium carbonate and 0.2 g of potassium iodide until the N-ethylaniline can no longer be detected in thin-layer chromatography. The chloropropionic acid ester is distilled off, and the oil that remains is taken up in ethyl acetate and extracted with water until salt-free. The dried organic phase is concentrated, yielding 20 g of an oily mass of formula:

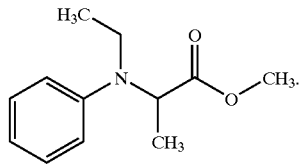

EXAMPLE 2454

7.1 g of the compound according to Example 2453 are introduced into 20 ml of N,N-dimethylformamide and cooled in an ice bath. 3.2 ml of phosphorus oxytrichloride are then slowly added dropwise and the mixture is stirred first at 20° C., and then for a further 4 hours at 60° C. The cooled reaction mass is discharged into a small amount of ice-water and neutralised with dilute sodium hydroxide solution. The resulting oil is taken up in ethyl acetate and washed with sodium chloride solution. The organic phase is dried and concentrated, yielding 6.7 g of the product of formula:

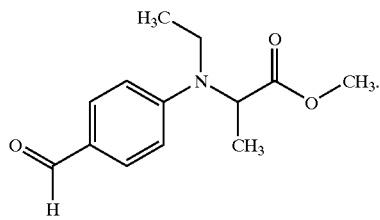

EXAMPLE 2455

6.7 g of the compound according to Example 2454 are dissolved in 50 ml of methanol, and 0.43 g of sodium borohydride is added. After 30 minutes at 20° C., the starting material can no longer be detected. The reaction solution is freed of methanol by distillation and the residue is taken up in ethyl acetate and washed with concentrated sodium chloride solution. The dried ethyl acetate phase is concentrated by evaporation; yielding 4.6 g of an oil of formula

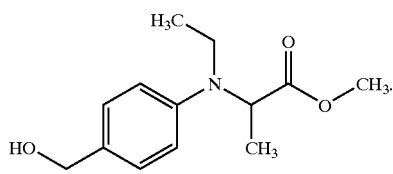

EXAMPLE 2456

4.25 g of the compound according to Example 2455 are dissolved in 25 ml of dichloromethane, and 2.6 ml of 3-isopropenyl-N,N-dimethylaniline are added. While cooling with an ice bath, 16 ml of a 1M boron trichloride solution in dichloromethane are added and the mixture is left to react overnight in the initial ice-bath to complete the reaction. Then, while cooling in an ice bath, 16 ml of concentrated sulfuric acid are added dropwise. The resulting reaction mixture is discharged onto ice, neutralised with sodium hydroxide solution and taken up in dichloromethane. After being washed, the organic phase is dried and the dichloromethane is distilled off, leaving behind 5.8 g of a blue-green, very oxygen-senstive oil of formula

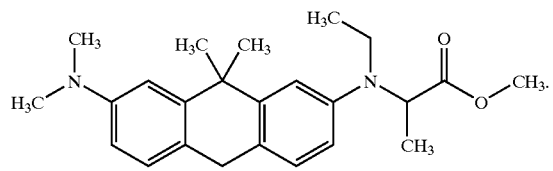

EXAMPLE 2457

5.8 g of the compound according to Example 2456 are dissolved in 40 ml of 100% acetic acid, and 150 drops of 60% perchloric acid are added. 1.65 g of tetrabutylammonium (meta)periodate are added to the resulting mixture. Stirring is carried out for 3 hours at 40° C., and the reaction mass is discharged into 250 ml of water and 25 g of sodium perchlorate monohydrate and the oily mass obtained is treated with a potassium perchlorate solution. After working up, 3.4 g of crude product are obtained. Repeated chromatographic purification of the crude product yields the analytically pure compound of the following formula:

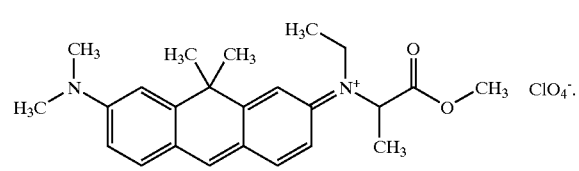

EXAMPLE 2458

1.33 g of analytically pure product according to Example 2457 are dissolved in acetone with 2.78 g of the cobalt complex of structure Q20 and the solution is concentrated by evaporation. The residue is taken up in methylene chloride, extracted by shaking repeatedly with deionised water and, without drying of the organic phase, concentrated to dryness without residue, yielding 3.13 g of compound of formula:

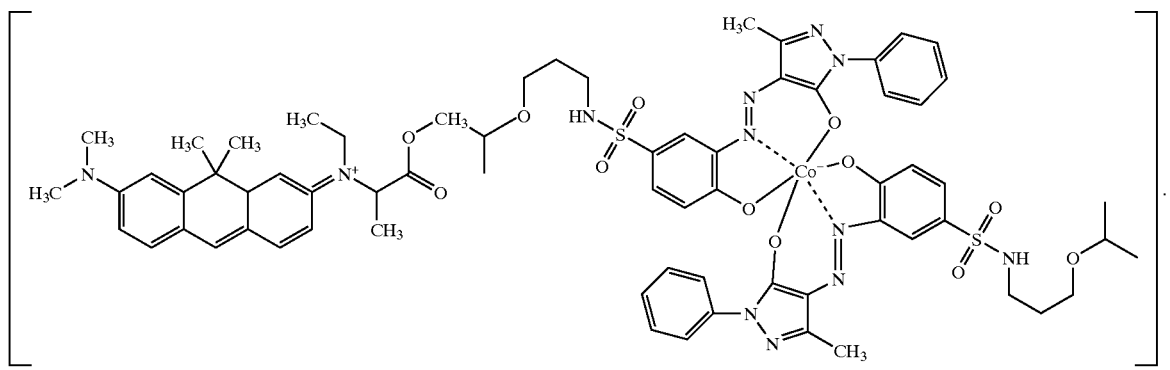

EXAMPLE 2459

The procedure is as in Example 7, but instead of the product according to Example 1 there is used an equal amount of the product according to Example 2458. The absorption maximum of a recording support produced analogously to Example 7 is at 623 nm.

EXAMPLE 2460

2.7 g of 4-fluorobenzaldehyde are stirred at 110° C. in 20 ml of dimethyl sulfoxide with 3.74 g of morpholine and 3 g of potassium carbonate for 6 hours. Customary working-up yields 0.95 g of crystalline product of formula

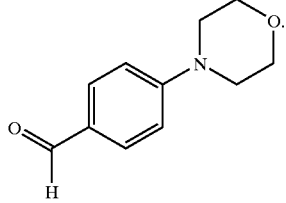

That product is processed further analogously to Examples 2455 to 2458; yielding the compound of formula:

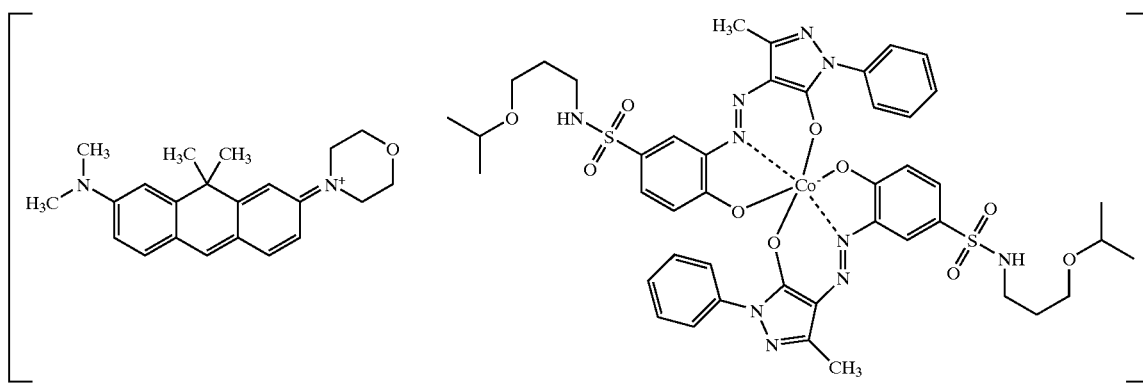

EXAMPLE 2461

The procedure is as in Example 7, but instead of the product according to Example 1 there is used an equal amount of the product according to Example 2460. The absorption maximum of a recording support produced analogously to Example 7 is at 626 nm.

EXAMPLE 2462

The procedure is as in Example 7, but instead of the product according to Example 1 there is used an equal amount of the product according to Example 3. The absorption maximum of the recording support is at 625 nm.

EXAMPLE 2463

The procedure is as in Example 3, but instead of the metal complex of formula Q20 there is used an equimolar amount of the metal complex of formula Q16. The absorption maximum of a recording support produced analogously to Example 7 is at 631 nm.

EXAMPLE 2464

The procedure is as in Example 1, but instead of the sodium salt of the metal complex of formula Q20 there is used the same amount of the product of formula

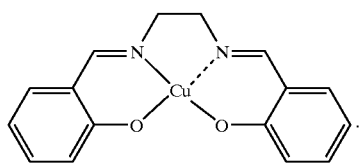

The absorption maximum of a recording support analogous to Example 7 is at about 630 nm.

EXAMPLES 2465–2470

Analogously to Example 7, recording supports are produced using the products of other Examples. The following absorption maxima are obtained:

| Example | Recording support comprising product according to Example: | Absorption maximum |
|---|---|---|
| 2465 | 98 | 623 nm |
| 2466 | 183 | 636 nm |
| 2467 | 1227 | 632 nm |
| 2468 | 1576 | 621 nm |
| 2469 | 1583 | 625 nm |
| 2470 | 1921 | 633 nm |

What is claimed is:
1. An optical recording medium, comprising a substrate and a recording layer, wherein the recording layer comprises a compound of formula (I)

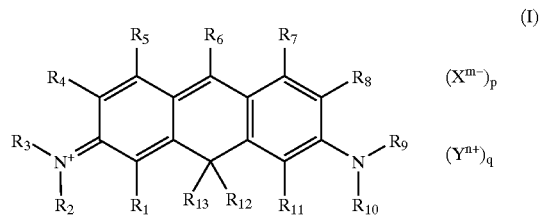

wherein $R_1$, $R_2$, $R_3$, $R_4$, $R_5$, $R_6$, $R_7$, $R_8$, $R_9$, $R_{10}$, $R_{11}$, $R_{12}$ and $R_{13}$ are each independently of the others hydrogen, $G_1$, or $C_1$–$C_{24}$alkyl, $C_2$–$C_{24}$alkenyl, $C_2$–$C_{24}$alkynyl, $C_3$–$C_{24}$cycloalkyl, $C_3$–$C_{24}$cycloalkenyl, $C_7$–$C_{24}$aralkyl, $C_6$–$C_{24}$aryl, $C_4$–$C_{12}$heteroaryl or $C_1$–$C_{12}$heterocycloalkyl, each unsubstituted or substituted by one or more identical or different substituents $G_1$, wherein $R_1$ and $R_2$, $R_1$ and $R_{13}$, $R_2$ and $R_3$, $R_3$ and $R_4$, $R_4$ and $R_5$, $R_5$ and $R_6$, $R_6$ and $R_7$, $R_7$ and $R_8$, $R_8$ and $R_9$, $R_9$ and $R_{10}$, $R_{10}$ and $R_{11}$, $R_{11}$ and $R_{12}$ and/or $R_{12}$ and $R_{13}$ can independently of one another be bonded to one another in pairs separately or, when they contain substitutable sites, via a direct bond or via a —$CH_2$—, —O—, —S—, —NH— or —$NC_1$–$C_{24}$alkyl-bridge in such a manner that, together with the atoms and bonds indicated in formula (I), five- or six-membered, saturated, unsaturated or aromatic, unsubstituted or $G_1$-substituted rings are formed, $G_1$ is any desired substituent, $X^{m-}$ is an inorganic, organic or organometallic anion, $Y^{n+}$ is a proton or a metal, ammonium or phosphonium cation, and m and n are each independently of the other a number from 1 to 5, and p and q are each independently of the other 0 or a number from 0.2 to 6, the ratio of p and q to one another, depending upon m and n and, as applicable, the number of charged $G_1$, being such that in formula (I) there is no excess positive or negative charge.

2. A recording medium according to claim 1, which additionally comprises a reflecting layer.

3. A recording medium according to claim 1, wherein $R_6$ is

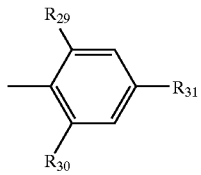

and $R_{29}$, $R_{30}$ and $R_{31}$ are each independently of the others hydrogen, halogen, $COOR_{32}$, $OR_{32}$ or $NR_{32}R_{33}$, wherein $R_{32}$ and $R_{33}$ are each independently of the other hydrogen or $C_1$–$C_{12}$alkyl, $C_2$–$C_{12}$alkenyl, $C_1$–$C_{12}$cycloalkyl, $C_2$–$C_{12}$cycloalkenyl, $C_6$–$C_{12}$aryl or $C_7$–$C_{13}$aralkyl, each unsubstituted or substituted by one or two hydroxy substituents or by a metallocenyl or azo metal complex radical and uninterrupted or interrupted by 1, 2, 3, 4 or 5 oxygen and/or silicon atoms.

4. A recording medium according to claim 1, wherein $R_1$, $R_4$, $R_5$, $R_7$, $R_8$ and $R_{11}$ are hydrogen; $R_2$, $R_3$, $R_9$, $R_{10}$, $R_{12}$ and $R_{13}$ are each independently of the others methyl, ethyl or $R_{14}$, it being possible for $R_2$ and $R_3$, $R_9$ and $R_{10}$, $R_{12}$ and $R_{13}$ and/or $R_9$ and $R_{10}$ also to be bonded together in pairs via a direct bond, methylene, —O— or —N($C_1$–$C_4$alkyl); and $R_6$ is hydrogen or $C_1$–$C_{12}$alkyl, $C_6$–$C_{12}$aryl or $C_7$–$C_{13}$aralkyl, each unsubstituted or mono- to tetra-substituted by halogen, —O$^-$, —OR$_{26}$, —CN, —NR$_{26}$R$_{27}$, —N$^+$R$_{26}$R$_{27}$R$_{28}$, —N(R$_{26}$)COR$_{27}$, —COO$^-$, —COOR$_{26}$, —CONR$_{26}$R$_{27}$, $R_{14}$ or by —N(R$_{26}$)COR$_{27}$R$_{28}$, wherein $R_{26}$, $R_{27}$ and $R_{28}$ are each independently of the others $C_1$–$C_{12}$alkyl, $C_6$–$C_{12}$aryl or $C_7$–$C_{13}$aralkyl.

5. A recording medium according to claim 3, wherein $R_6$ is

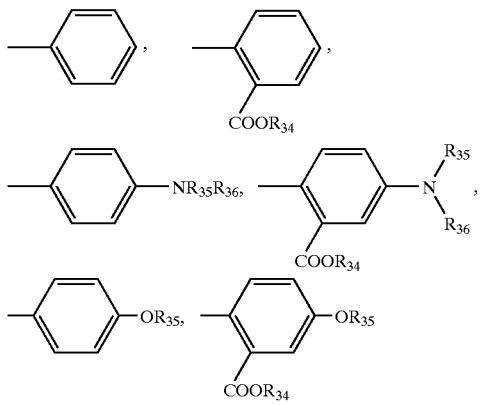

or $R_{37}$, and $R_{34}$, $R_{35}$ and $R_{36}$ are each independently of the others hydrogen or $R_{37}$, $R_{37}$ being alkyl uninterrupted or interrupted by from 1 to 3 oxygen and/or silicon atoms and unsubstituted or substituted by one or two hydroxy substituents or by a metallocenyl or azo metal complex radical.

6. A recording medium according to claim 1, wherein $X^{m-}$ is a metal complex of formula $[(L_1)M_1(L_2)]^{n-}$ (III) or $[(L_3)M_2(L_4)]^-$ (IV), wherein $M_1$ and $M_2$ are a transition metal, m is a number from 1 to 6, $L_1$ and $L_2$ are each independently of the other a ligand of the formula

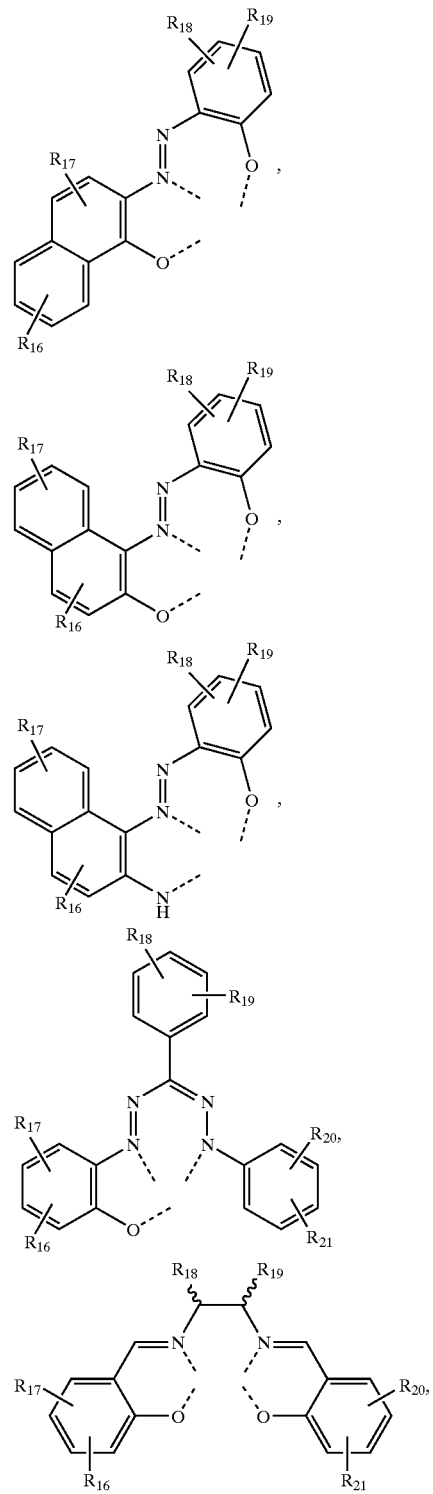

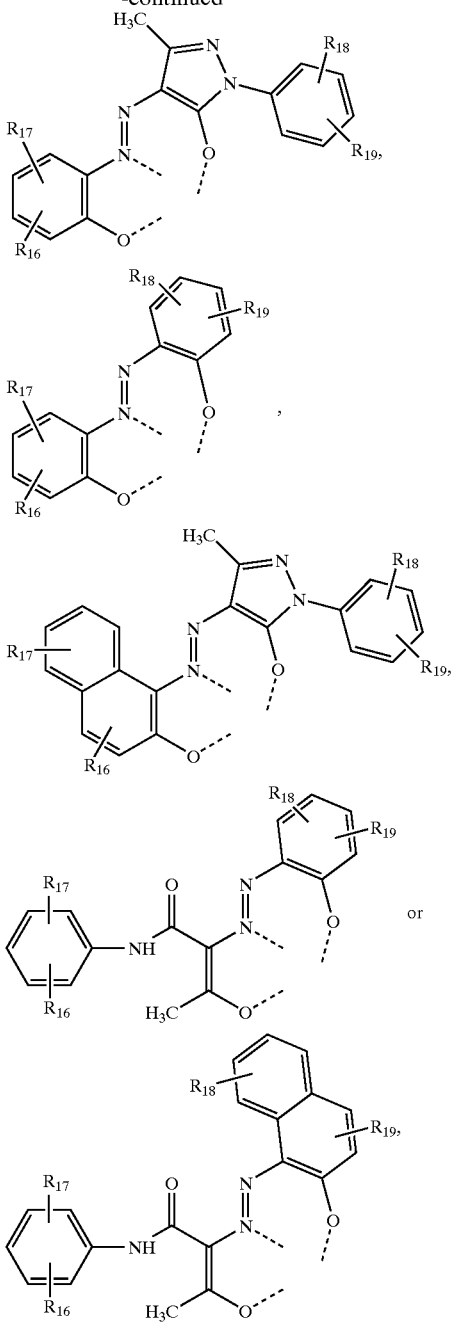

and $L_3$ and $L_4$ are each independently of the other a ligand of formula

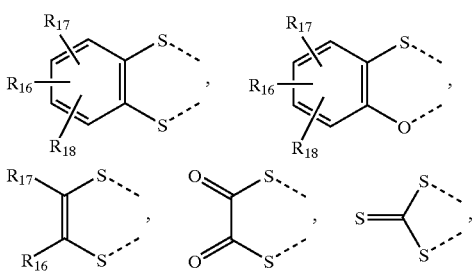

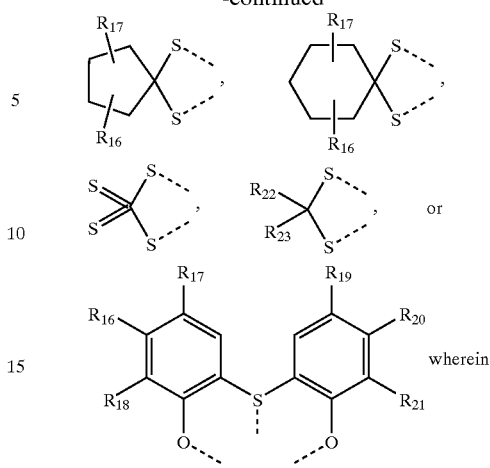

wherein $R_{16}$, $R_{17}$, $R_{18}$, $R_{19}$, $R_{20}$ and $R_{21}$ are each independently of the others hydrogen, halogen, cyano, $R_{24}$, $NO_2$, $NR_{24}R_{25}$, $NHCO-R_{24}$, $NHCOOR_{24}$, $SO_2-R_{24}$, $SO_2NH_2$, $SO_2NHR_{24}$, $SO_2NR_{24}R_{25}$, $SO_3^-$ or $SO_3H$, and $R_{22}$ and $R_{23}$ are each independently of the others CN, $CONH_2$, $CONHR_{24}$, $CONR_{24}R_{25}$, $COOR_{24}$ or $COR_{24}$, wherein $R_{24}$ and $R_{25}$ are each independently of the other $C_1$–$C_{12}$alkyl, $C_1$–$C_{12}$alkoxy-$C_2$–$C_{12}$alkyl, $C_7$–$C_{12}$aralkyl or $C_6$–$C_{12}$aryl, each unsubstituted or substituted by hydroxy, halogen, sulfato, $C_1$–$C_6$alkoxy, $C_1$–$C_6$alkylthio, $C_1$–$C_6$alkylamino or by di-$C_1$–$C_6$alkylamino, or $R_{24}$ and $R_{25}$ together are $C_4$–$C_{10}$heterocycloalkyl; it also being possible for $R_{16}$ and $R_{17}$, $R_{18}$ and $R_{19}$, and/or $R_{20}$ and $R_{21}$ to be bonded together in pairs in such a manner that a 5- or 6-membered ring is formed.

7. A recording medium according to claim 1, wherein $Y^{n+}$ is $[NH_2R_{38}R_{39}]^+$, $R_{38}$ being hydrogen or $C_1$–$C_{12}$alkyl and $R_{39}$ being $C_1$–$C_{24}$alkyl or $C_7$–$C_{24}$aralkyl, and $R_{38}$ and $R_{39}$ together having from 8 to 25 carbon atoms.

8. A recording medium according to claim 1, wherein m and n are each the number 1, p is a number from 1 to 2½, and q is a number from 0 to 1½, the sum of positive charges in formula (I) or (II) being equal to the sum of negative charges.

9. A recording medium according to claim 1, wherein the dye of formula (I) has an absorption maximum at from 540 to 640 nm in ethanolic solution and a refractive index of from 2.0 to 3.0 in the range of from 600 to 700 nm in the solid.

10. A recording medium according to claim 1, wherein the substrate has a transparency of at least 90% and a thickness of from 0.01 to 10 mm, preferably from 0.1 to 5 mm.

11. A recording medium according to claim 2, wherein the reflecting layer consists of aluminium, silver, copper, gold or an alloy thereof and has a reflectivity of at least 45% and thickness of from 10 to 150 nm.

12. A recording medium according to claim 2, wherein the recording layer is located between the transparent substrate and the reflecting layer and has a thickness of from 10 to 1000 nm.

13. A recording medium according to claim 2, the uppermost layer of which is provided with an additional protective layer having a thickness of from 0.1 to 1000 μm to which there may be applied a second substrate layer that is from 0.1 to 5 mm thick and consists of the same material as the support substrate.

14. A recording medium according to claim 1, which has a reflectivity of at least 15%.

15. A recording medium according to claim 2, wherein between the recording layer and the reflecting layer and/or between the recording layer and the substrate there is additionally arranged at least one interference layer consisting of a dielectric material.

16. A method for optical recording, storage and playback of information, which comprises the optical recording, storage and playback of the information from a recording medium according to claim 1.

17. A method according to claim 16, wherein the recording and the playback take place in a wavelength range of from 600 to 700 nm.

18. A process for the production of an optical recording medium, wherein a solution of a compound of formula (I) according claim 1 in an organic solvent is applied to a substrate having pits.

19. A process according to claim 18, wherein the application is carried out by means of spin-coating.

20. A compound of formula (I) according to claim 1.

21. A process for the preparation of a compound of formula (I) according to claim 1, wherein a compound of structure

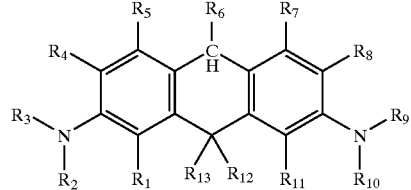

(X)

is oxidised in the presence of a $C_1$–$C_{18}$ carboxylic acid.

22. A process according to claim 21, wherein (meta) periodate is used as oxidising agent.

* * * * *